(12) United States Patent
Rhoads et al.

(10) Patent No.: US 7,397,427 B1
(45) Date of Patent: Jul. 8, 2008

(54) PHASE EVENT DETECTION AND DIRECTION OF ARRIVAL ESTIMATION

(75) Inventors: Kevin G. Rhoads, Lyme, NH (US); Leonore Katz-Rhoads, Lyme, NH (US)

(73) Assignee: Kevin G. Rhoads Engineering, Inc., Lyme, NH (US)

( * ) Notice: Subject to any disclaimer, the term of this patent is extended or adjusted under 35 U.S.C. 154(b) by 0 days.

(21) Appl. No.: 11/529,701

(22) Filed: Sep. 28, 2006

Related U.S. Application Data

(60) Provisional application No. 60/721,285, filed on Sep. 28, 2005.

(51) Int. Cl.
*G01S 5/04* (2006.01)

(52) U.S. Cl. .......................... 342/442; 342/56

(58) Field of Classification Search ............ 342/56, 342/113, 417, 433, 442–444
See application file for complete search history.

(56) References Cited

U.S. PATENT DOCUMENTS

| | | | |
|---|---|---|---|
| 3,787,862 A * | 1/1974 | Jacobson | 342/418 |
| 3,852,753 A | 12/1974 | Blakemore | |
| 3,936,831 A | 2/1976 | Jones | |
| 4,054,862 A * | 10/1977 | Backman, Jr. | 367/100 |
| 4,520,402 A * | 5/1985 | Hurst, Jr. | 386/17 |
| 4,622,657 A | 11/1986 | Clare | |
| 4,631,710 A * | 12/1986 | Yamaguchi et al. | 367/103 |
| 4,797,679 A | 1/1989 | Cusdin et al. | |
| 5,549,111 A * | 8/1996 | Wright et al. | 600/443 |
| 5,724,047 A | 3/1998 | Lioio et al. | |
| 6,573,865 B1 * | 6/2003 | Baghdady | 342/437 |

OTHER PUBLICATIONS

Hughes, J. M., et al., "A Medium-Frequency Interferometer for Studying Auroral Radio Emissions," *Review of Scientific Instruments*, 71(8): 3200-3206 (2000).

Howe, D. A., et al., "Properties of Signal Sources and Measurement Methods," Proc. 35th Annual Frequency Control Symposium, USAERADCOM, 669-716 (May 1981).

* cited by examiner

*Primary Examiner*—Dao L Phan
(74) *Attorney, Agent, or Firm*—Hamilton, Brook, Smith & Reynolds, P.C.

(57) ABSTRACT

In one embodiment, a system includes at least two detector devices, each detector device for independently detecting a phase event of a composite signal comprising one or more traveling wave signals to provide phase event information. The system further includes a processor configured to receive the phase event information from each detector device and to estimate a direction of arrival of at least one of the traveling wave signals based on the phase event information.

26 Claims, 46 Drawing Sheets

HARDWARE
Field Devices are Deployed According to Guidelines

Detect, Digitize and Transfer Field Data to One Computer

SOFTWARE
Store Data in Computer * Time of Detected Phase Event

Figure 2

HARDWARE
Field Devices are Deployed According to Guidelines

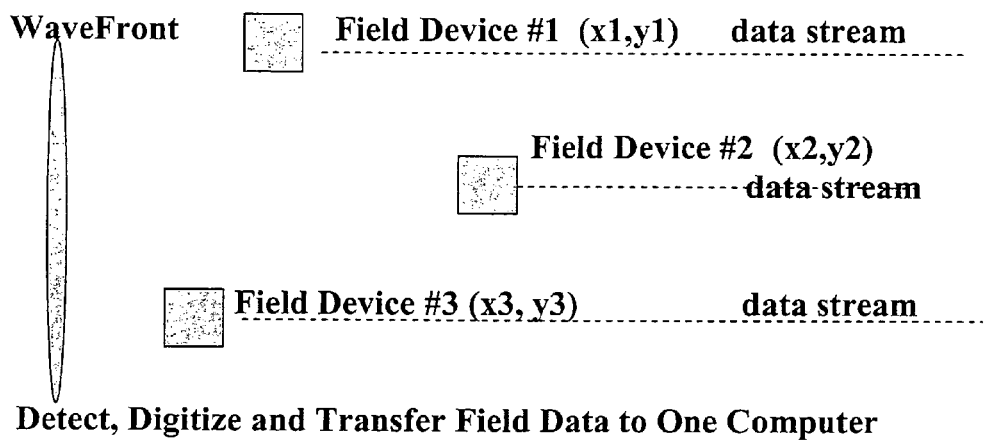

Detect, Digitize and Transfer Field Data to One Computer

---

SOFTWARE
Store Data in Computer * Time of Detected Phase Event

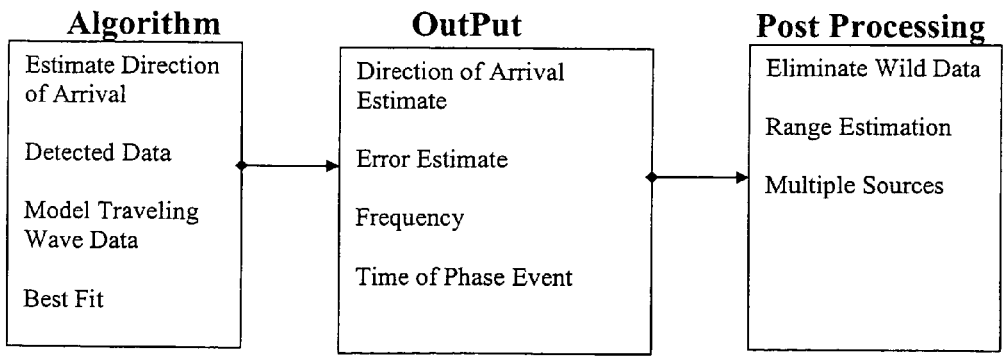

| Algorithm | OutPut | Post Processing |
|---|---|---|
| Estimate Direction of Arrival | Direction of Arrival Estimate | Eliminate Wild Data |
| Detected Data | Error Estimate | Range Estimation |
| Model Traveling Wave Data | Frequency | Multiple Sources |
| Best Fit | Time of Phase Event | |

Figure 3
Preferred Embodiment Phase Event Hardware Detection
Single Wavefront
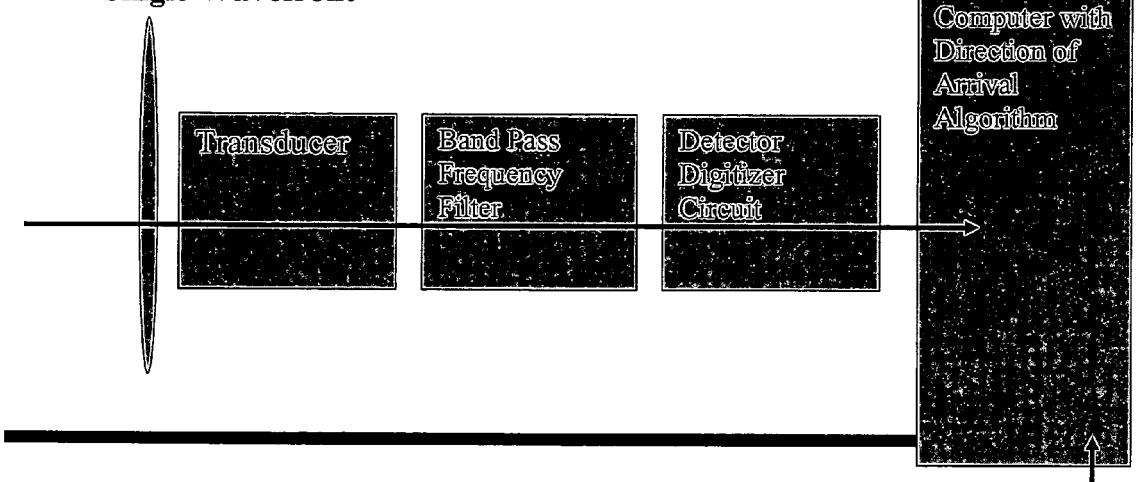
Phase Event Detection Software
Retrofit to Standard Sensors
Single Wavefront
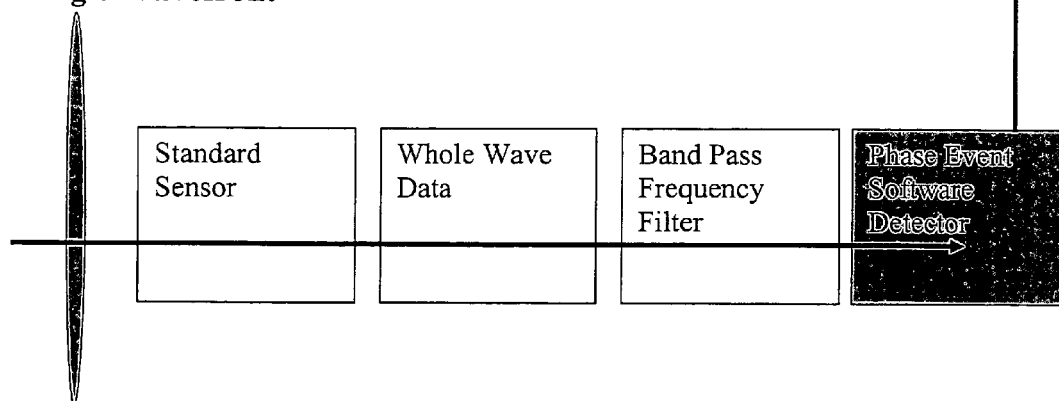

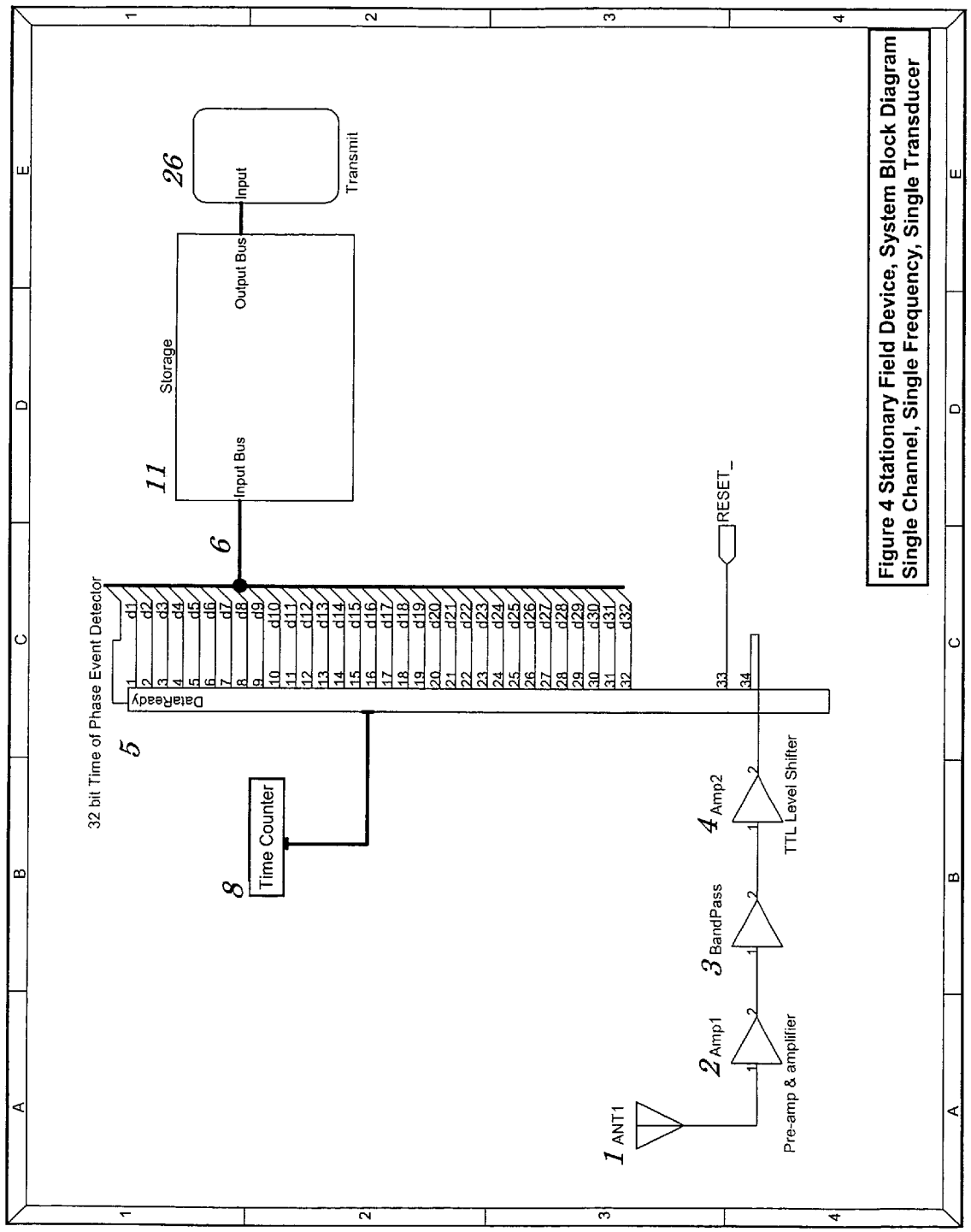

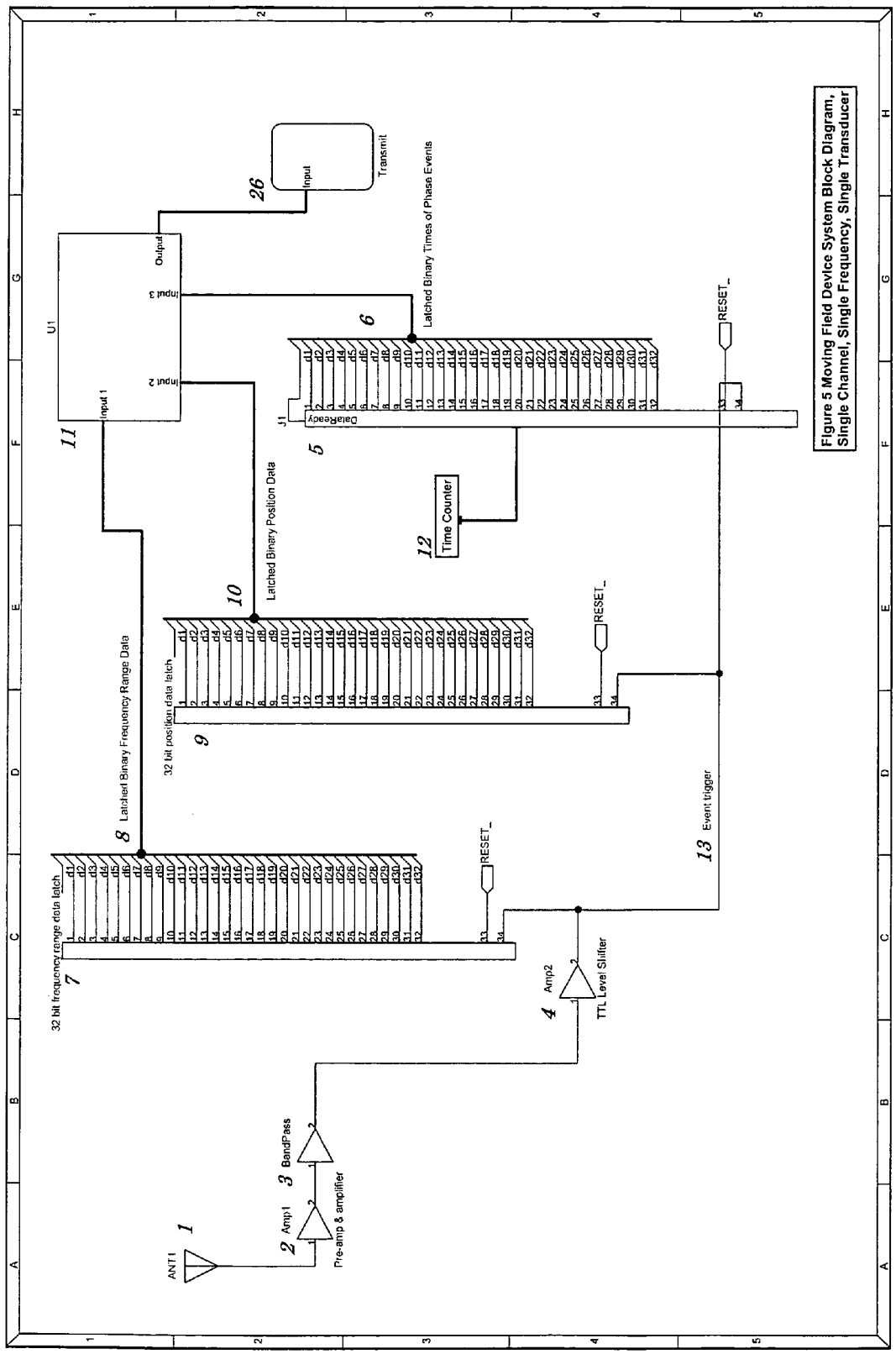

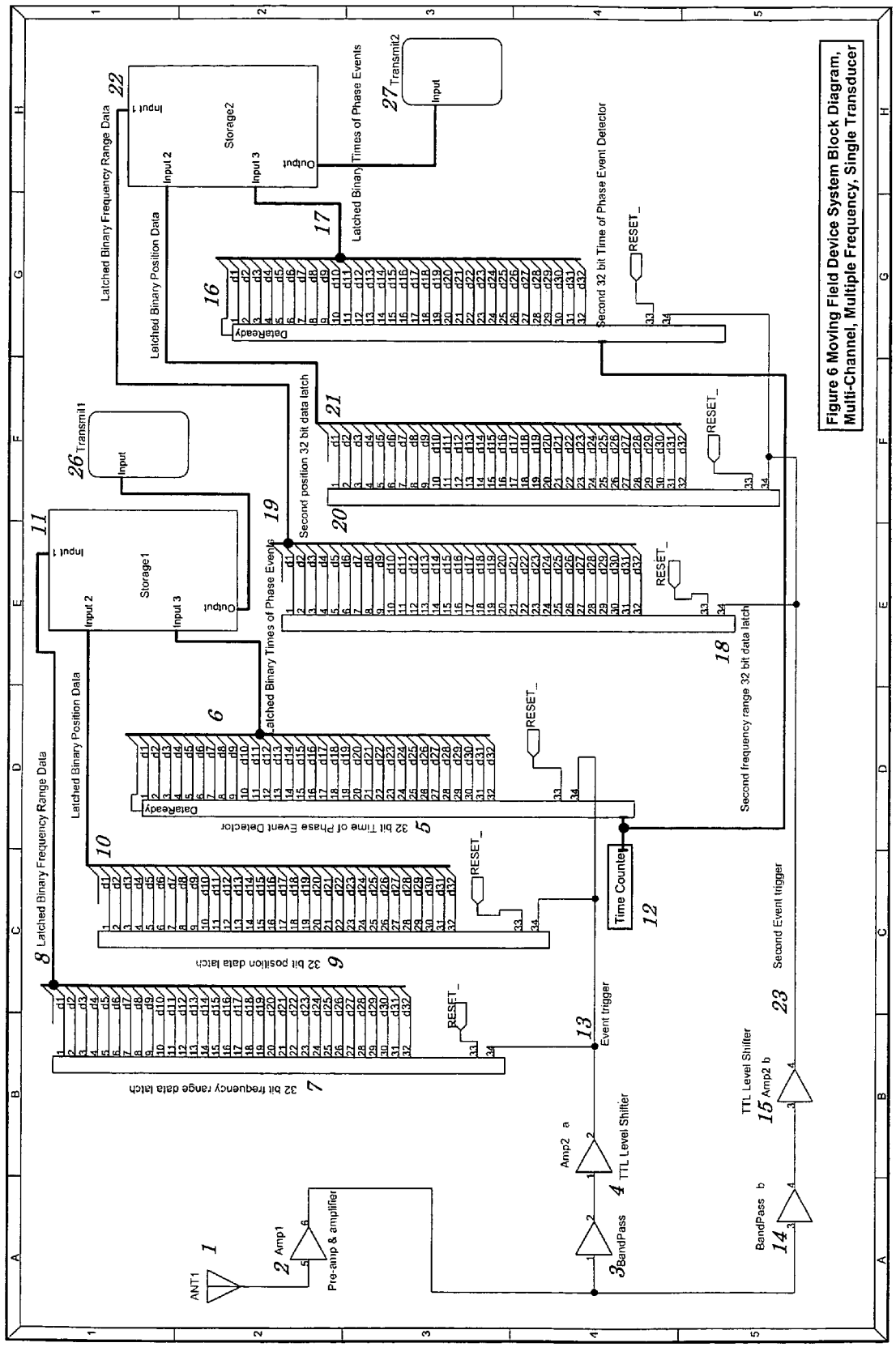

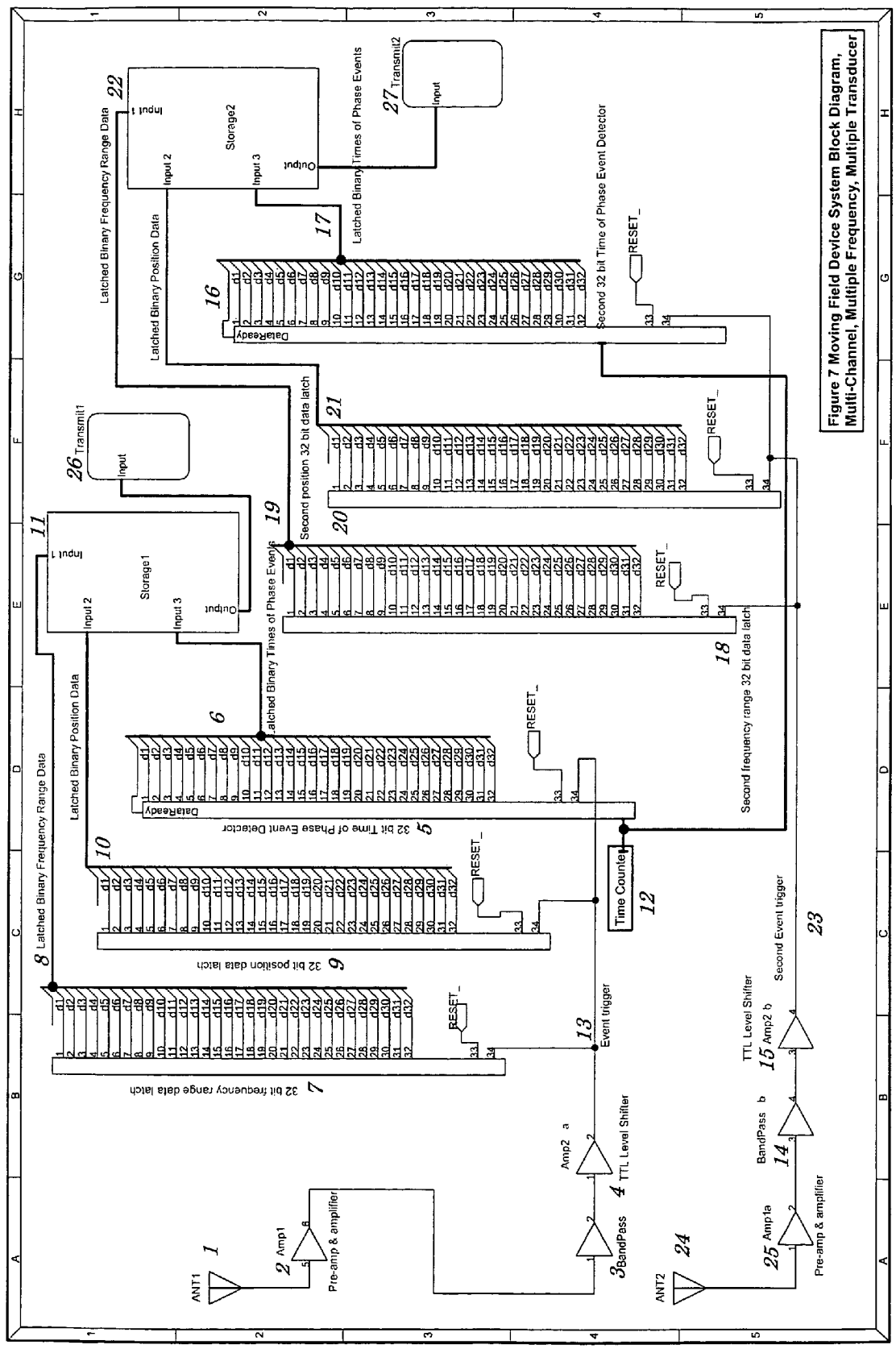

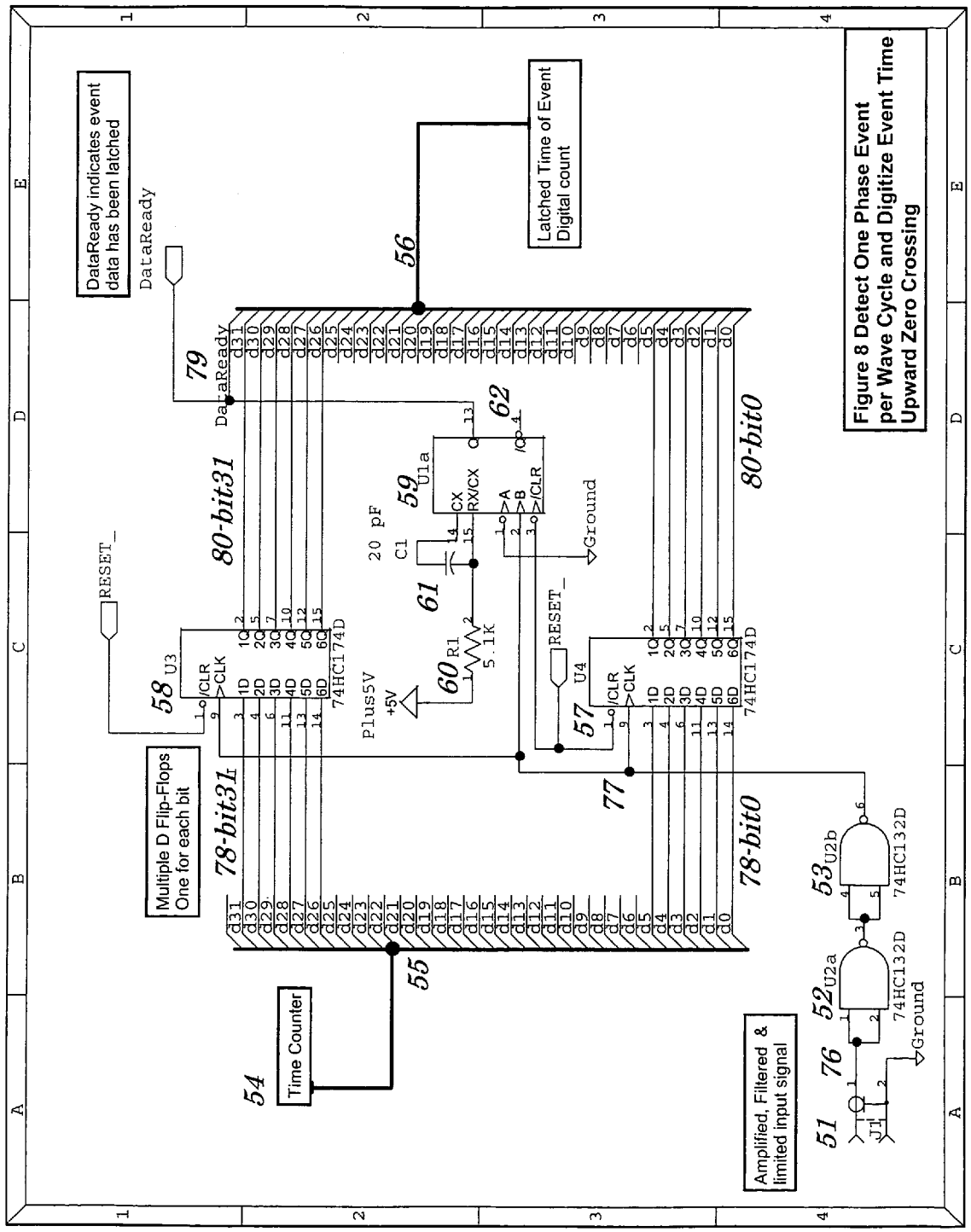

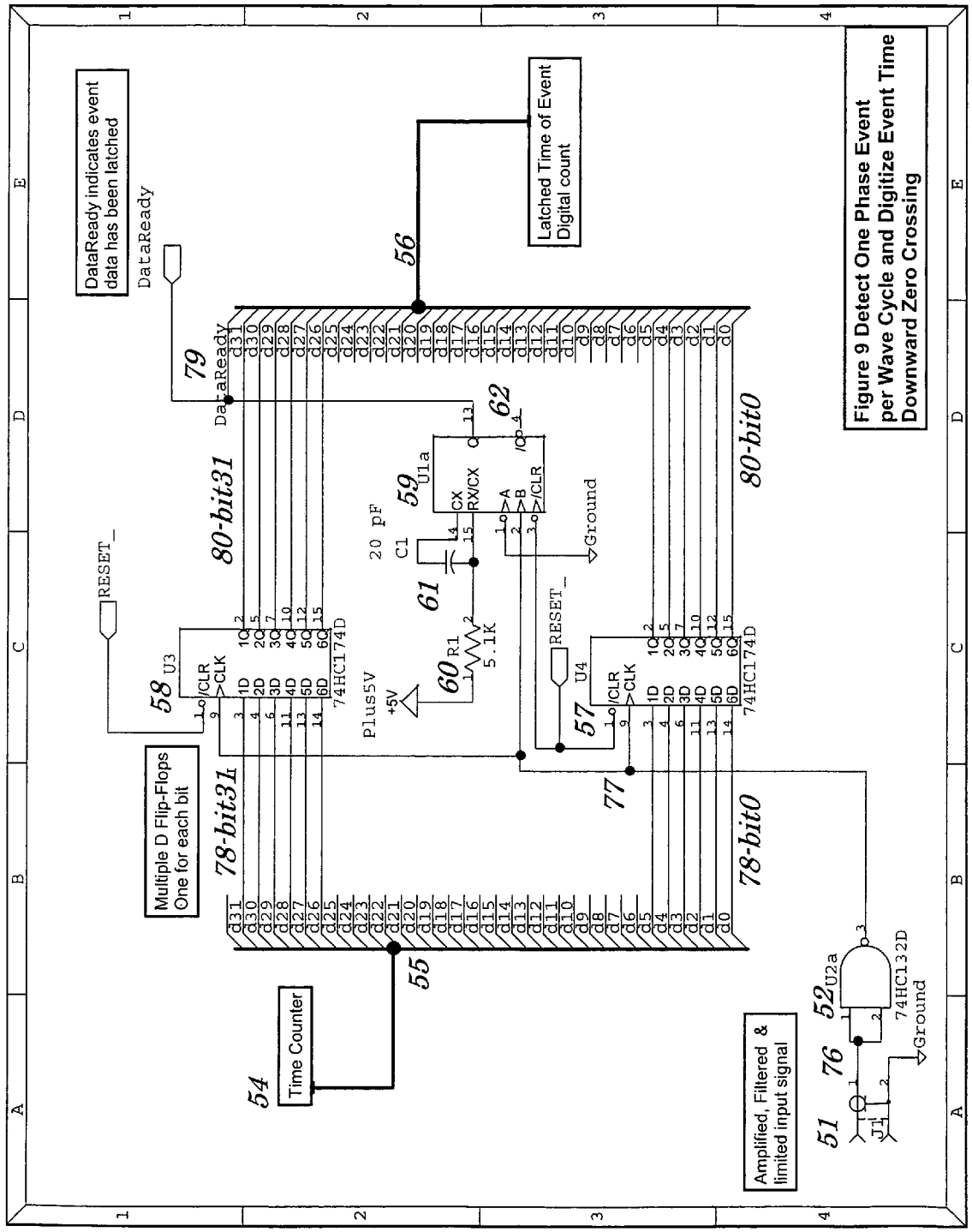

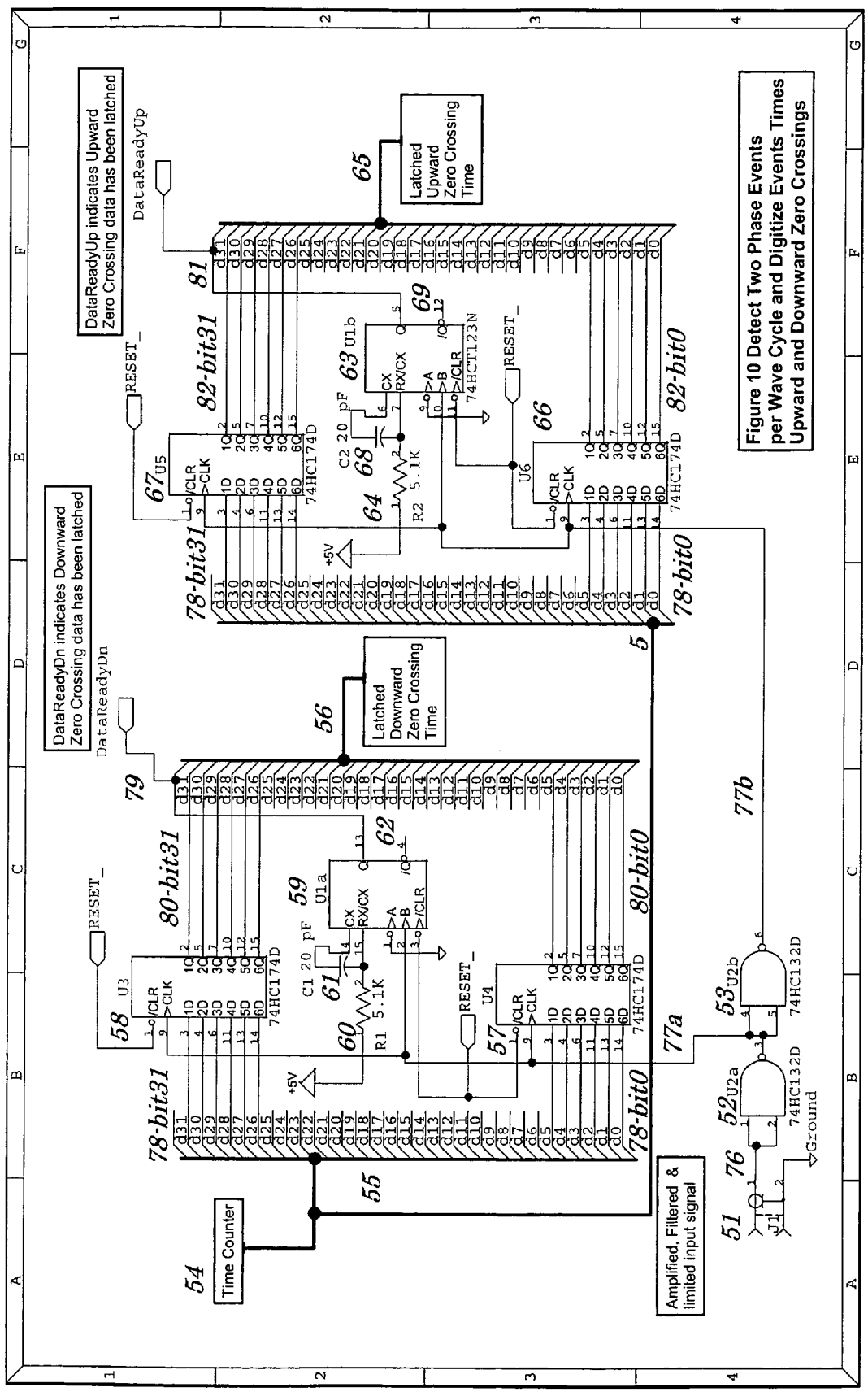

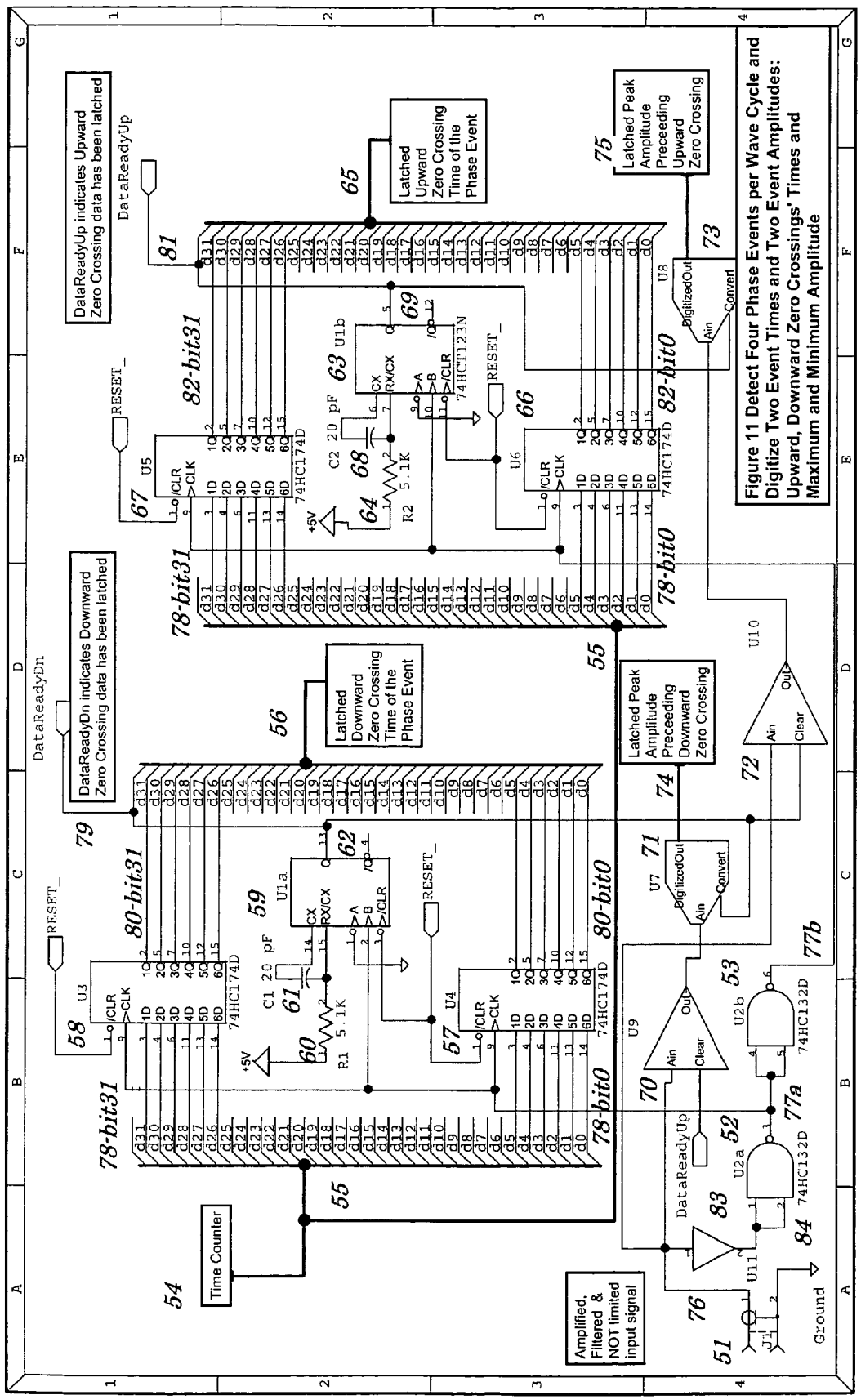

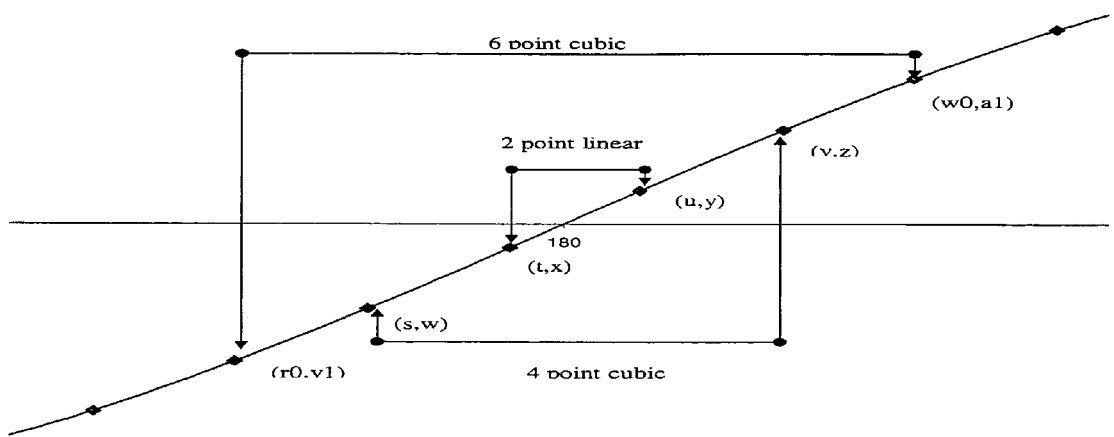
Figure 12 Software Detector interpolation

Figure 13-1

Field Devices are Deployed and One Wavefront Passes

Single WaveFront  Field Device #1 (x1,y1)

 Field Device #2 (x2,y2)

 Field Device #3 (x3, y3)

Detects, Digitize and Transfer Field Data to One Computer

Computer Models One Wavefront Passing "Devices" with the Same Relative Positions as Deployed Field Devices Model One WaveFront  Model Device #1 (x1,y1)

 Model Device #2 (x2,y2)

 Model Device #3 (x3, y3)

Model Compute Time of Phase Event for One Cycle of the Modeled Wave for All Possible Sources

Figure 13-2

Computer Manipulates <u>Detected Data</u> Prior to Analysis

| One <u>Row</u> of <u>Detected</u> Pairwise Time Differences from 3 Field Devices and One Phase Wavefront | Times of One Phase Event/Cycle as Detected by Multiple Field Devices |

| FD #1-#2 | FD #2-#3 | FD #1-#3 |
|---|---|---|
| Time 1-2 | Time 2-3 | Time 1-3 |

---

Computer Calculate <u>Model Data</u> Prior to Analysis

| One <u>Array</u> where Each Row is <u>Computed</u> Pairwise Time Differences Modeled for Wave Source Angles 0 to 360 Degrees | Wave Motion is Modeled For Multiple "Devices" and Multiple Wave Sources |

| Angles | Model #1-#2 | Model #2-#3 | Model #1-#3 |
|---|---|---|---|
| 0 Degrees | Time 1-2 | Time 2-3 | Time 1-3 |
| Degrees | Time 1-2 | Time 2-3 | Time 1-3 |
| Degrees | Time 1-2 | Time 2-3 | Time 1-3 |
| Degrees | Time 1-2 | Time 2-3 | Time 1-3 |
| Degrees | Time 1-2 | Time 2-3 | Time 1-3 |
| Degrees | Time 1-2 | Time 2-3 | Time 1-3 |
| Degrees | Time 1-2 | Time 2-3 | Time 1-3 |
| Degrees | Time 1-2 | Time 2-3 | Time 1-3 |
| 360 Degrees | Time 1-2 | Time 2-3 | Time 1-3 |

Figure 13-3

Compute the Root Mean Squared Error
Using One Set of Detected Data and Multiple Sets of Modeled
Data Detected Data for one Phase event

| FD #1-2 | FD #2-3 | FD#1-3 |
|---|---|---|
| Time 1-2 | Time 2-3 | Time 1-3 |

Modeled Data Array

| Angles | Model #1-2 | Model #2-3 | Model #1-3 | RMS Error |
|---|---|---|---|---|
| 0 Degrees | Time 1-2 | Time 2-3 | Time 1-3 | |
| Degrees | | | | |
| | | | | |
| | | | | |
| DOA Est | | | | Smallest |
| | | | | |
| | | | | |
| | | | | |
| 360 Degrees | | | | |

The Smallest RMS Estimate is the Error Estimate
The Angle with the Smallest RMS Error is the DOA Estimate
The Time of the Phase Event is the Time

Figure 19 -- BEFORE

Example Direction of Arrival Estimates  Before rejection of high error points

Figure 20 -- AFTER

Example Direction of Arrival Estimates    After rejection of high error points

PHASE EVENT DETECTION AND DIRECTION OF ARRIVAL ESTIMATION

RELATED APPLICATION

This application claims the benefit of U.S. Provisional Application No. 60/721,285, filed on Sep. 28, 2005. The entire teachings of the above application are incorporated herein by reference.

BACKGROUND

Traveling Waves are continuous in amplitude, in space and time. A transducer located in space samples every wave passing it, producing a composite continuous amplitude function of continuous time, thereby "capturing" the whole wave. In addition to a transducer or antenna, field deployed sensors typically include signal processing capability.

In order to measure phase, a reference is required. The reference may be a reference signal, as occurs in phase detectors, or time as used in Global Positioning Systems. The reference may be located at each sensor or at a central processing site. If the reference is deployed in the field, all the sensors use of the references must be synchronized. Typically, this would be accomplished by transmitting synchronization from a central site to the field. Later, the sensed signals are shipped from the field to the central site. Often to save synchronization cost, the whole wave is shipped from multiple field sensors to a central site, where the sensed signal is compared to a reference signal, eliminating the need for synchronization in the field. The price of shipping the whole wave from the field is usually the need for wide bandwidth transmission. Sensed signals may be shipped in analog or digitized form prior to being sent back.

In most prior art signal processing, computation aggregates all or parts of the signal over several wave cycles by, for example, frequency shifting, phase shifting and summing, heterodyning, time-domain low pass filtering, integration, cumulation, box car integrating, running mean, time sequence smoothing, trend line/curve fitting, or averaging of the signal. Aggregating the signal for several cycles requires the group of sensors remain relatively stationary during the cycles being combined.

Time Delay of Arrival (TDOA) is a generalization of radar ranging. Typically, a modulation structure is introduced by, for example, transmission of a pulse. By comparing the times of arrival of the modulation structure at multiple receiving sensors, the direction of the wave can be computed.

One important area where prior art has not engineered practical solutions is in providing flexible, low cost, light weight, directional reception of low frequency, long wave length signals. The use of antennae or transducers to determine wave vector direction is limited by the directionality of the transducer. The directionality of the transducer is limited by the size of the transducer compared to the longest wavelength of the wave being transduced. This leads to practical limitations in the case of low frequencies with correspondingly long wavelengths. Fundamental and practical limits arising from the physics and mathematics of waves dictate that significant directionality is only achieved when size of the entire antenna structure is significantly larger than the wavelength being received.

That the wavelength sets the natural geometric scale for the antenna or transducer array is discussed in Radar System Engineering, MIT Radiation Laboratory Series Volume 1 section 9-1 on page 271: " . . . . Another advantage of large antennas, having to do with the resolution of the radar set, is that the beamwidth varies inversely as the linear dimension of the antenna. Mathematically, the beamwidth $\Theta$ (degrees) is usually related to the width D of the antenna and the wavelength $\lambda$ of the radiation by the approximate formula $\Theta \approx 70\lambda/D$ if D and lambda are in the same units." This relationship provides a rule of thumb for estimating the directionality that can be achieved when the size of an antenna system is known, or to estimate the size of antenna system needed if directionality is specified.

Freely propagating waves are used for many purposes, such as radio and TV broadcasts, microwave communications links, RADAR, SONAR, geophysical prospecting, earthquake mapping, ultrasonic imaging, satellite communications, cell phones and wireless networking.

SUMMARY

A system includes at least two detector devices, each detector device for independently detecting a phase event of a composite signal comprising one or more traveling wave signals to provide phase event information. The system further includes a processor configured to receive the phase event information from each detector device and to estimate a direction of arrival of at least one of the traveling wave signals based on the phase event information. The detector device may detect one or more phase events per cycle of the traveling wave signal.

The processor may be further configured to estimate the direction of arrival by computing a traveling wave propagation model, computing error estimates between the computed model and the phase event information, and deriving the direction of arrival from a best fit comparison of the error estimates.

A detector device comprises a transducer for detecting a composite signal comprising one or more traveling wave signals; a bandpass filter coupled to the output of the transducer for filtering the detected composite signal; and a phase event detector coupled to the output of the bandpass filter for detecting a phase event from the filtered composite signal to provide phase event information for at least one of the traveling wave signals.

A method comprises detecting a phase event of a composite signal comprising one or more traveling wave signals independently at two or more positions to provide phase event information. The method further includes estimating a direction of arrival of at least one of the traveling wave signals based on the phase event information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 illustrates a System Hardware and Software Block Diagram.

FIG. 3 illustrates a Detection System Block Diagram.

FIG. 4 illustrates a Stationary Field Device System Block Diagram Single Channel Single Frequency Single Transducer.

FIG. 5 illustrates a Moving Field Device System Block Diagram Single Channel Single Frequency Single Transducer.

FIG. 6 illustrates a Moving Field Device System Block Diagram Multi-Channel Multi-Frequency Single Transducer.

FIG. 7 illustrates a Moving Field Device System Block Diagram Multi-Channel Multi-Frequency Multi-Transducer.

FIG. 8 illustrates a Detector Circuit for One Phase Event per Wave Cycle and Digitize Event times for Upward Zero Crossings.

FIG. 9 illustrates a Detector Circuit for One Phase Event per Wave Cycle and Digitize Event times for Downward Zero Crossings.

FIG. 10 illustrates a Detector Circuit for Two Phase Events per Wave Cycle and Digitize Event times for Upward and Downward Zero Crossings.

FIG. 11 illustrates a Detector Circuit for Four Phase Events per Wave Cycle and Digitize Two Event times for Upward and Downward Zero Crossings and Digitize Two Event Amplitudes for Maximum and Minimum.

FIG. 12 illustrates a Software Detector Use of Interpolation.

FIGS. 12A-1-12A-3 illustrate a Software Detector Upward Flow Chart.

FIGS. 12B-1-12B-5 illustrate a Software Detector Subroutine cubesoln Flow Chart.

FIGS. 12C-1-12C-2 illustrate a Software Detector Subroutine pickroot Flow Chart.

FIGS. 13-1-13-4 illustrate a Direction of Arrival Algorithm Block Diagram.

FIGS. 13A-1-13A-2 illustrate a DOA Algorithm Flow Chart.

FIGS. 13C-1-13C-2 illustrate a DOA SubroutineAverage_Delta Flow Chart.

FIGS. 13D-1-13D-3 illustrate a DOA Subroutine Compute_Errors Flow Chart.

FIGS. 14-1-14-4 illustrate a Global Synchronization Flow Chart.

DETAILED DESCRIPTION OF EXAMPLE EMBODIMENTS

Detailed Description

System Overview

Embodiments of the present approach detect an instantaneous physical event and provide a direction of arrival estimate for that detected event. For example, one traveling wave phase event crossing a set of field device sensors produces one set of phase event detections, from which one direction of arrival estimate can be derived. If two kinds of phase events, e.g., upward and downward zero crossings, are detected at the field devices for each cycle of the traveling wave, then two direction of arrival estimates can be derived for each cycle.

Figure 1:
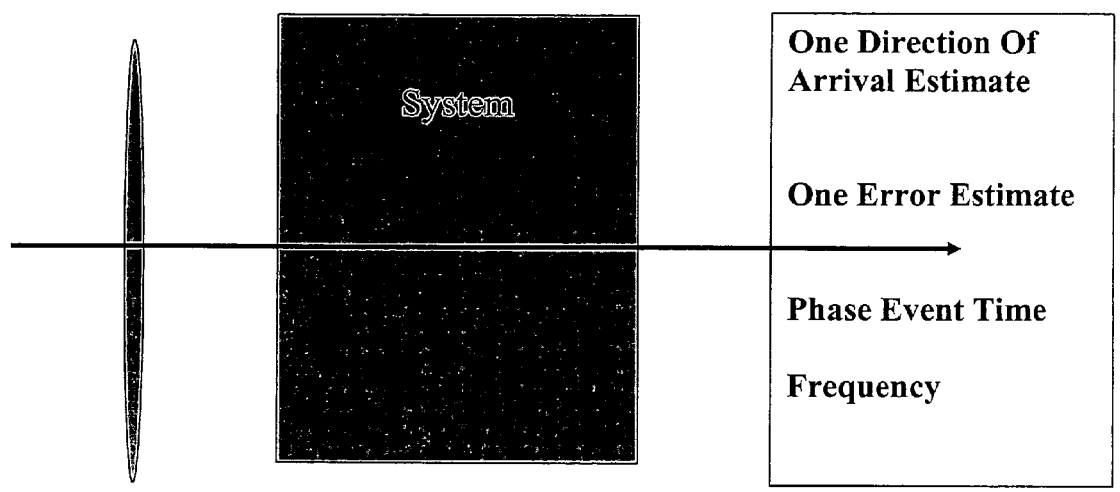
FIG. 1 illustrates a Time of One Phase Event Block Diagram.
Figures 1, 12A:
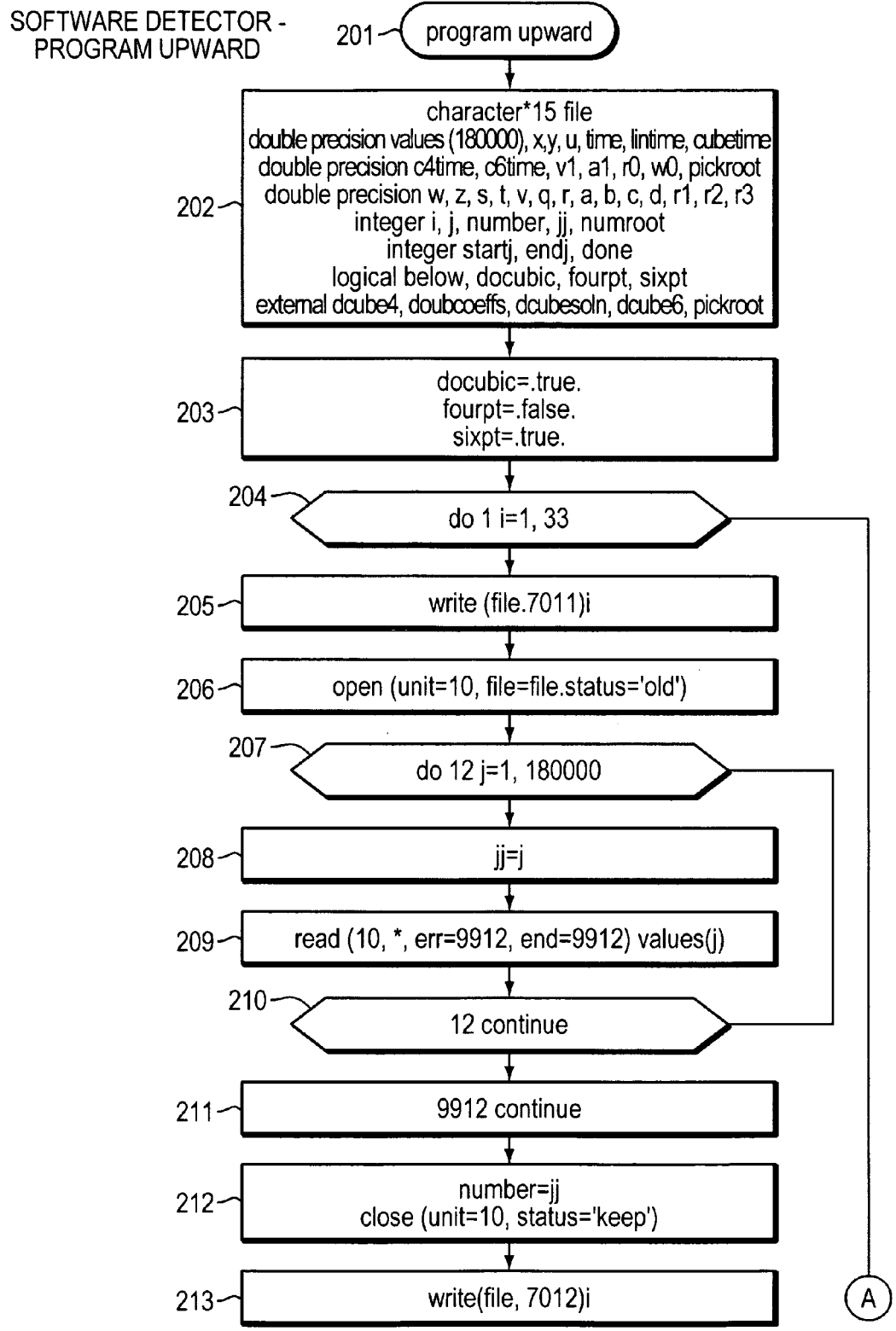
Figures 2, 12A:
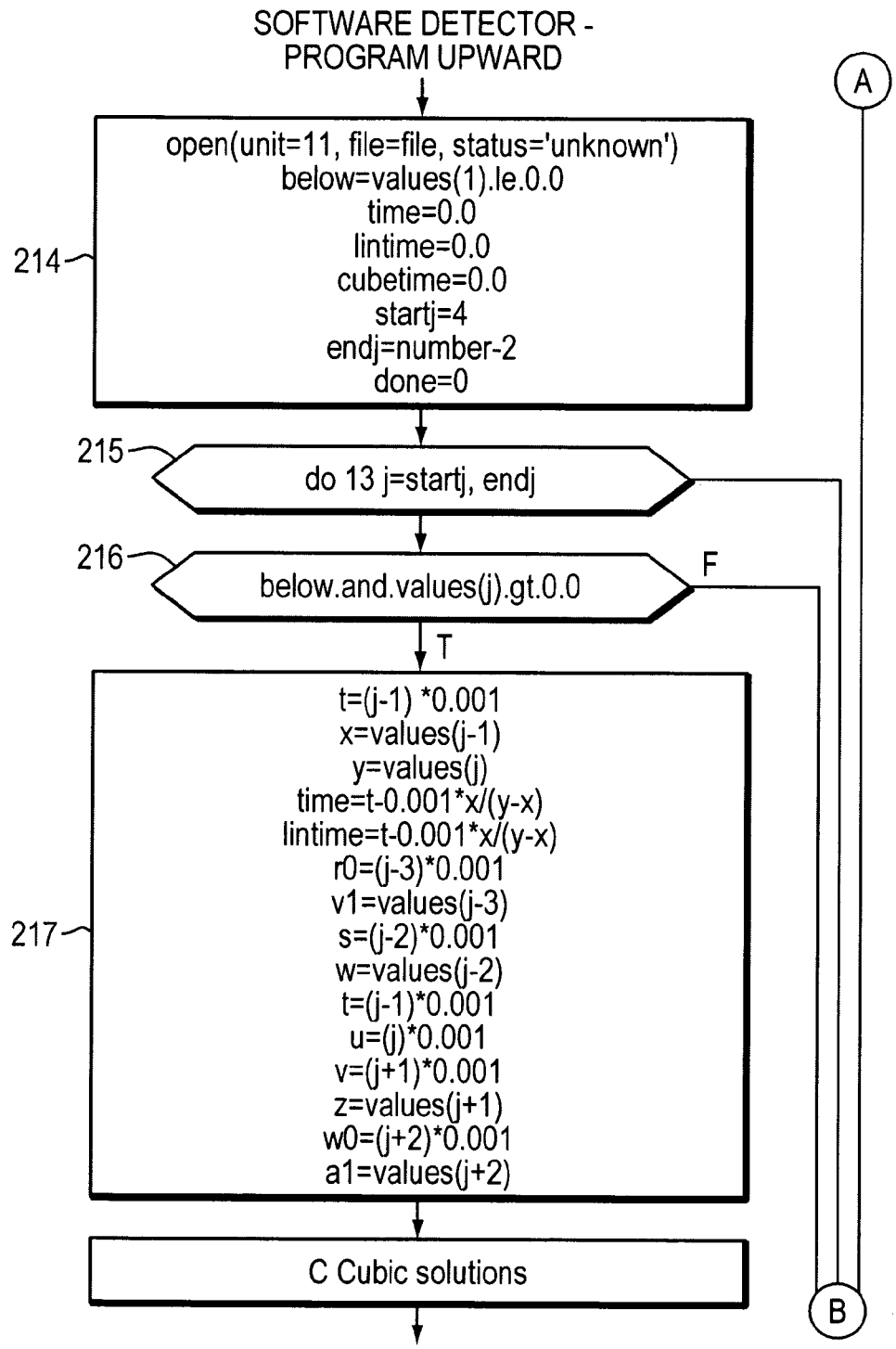

FIG. 1 illustrates a Time of One Phase Event Block Diagram, presenting a focus of a system which detects and exploits the times of single phase events. In FIG. 2, referred to as System Hardware and Software Block Diagram, one traveling wave phase wave front crosses a set of field device sensors, and the times of the phase event crossings are detected at each device. This data, as part of digital data streams, are sent to a processor, e.g., desktop computer, configured to join the data into a set and a direction of arrival algorithm derives one direction of arrival estimate, per one phase wave front crossing.

In one demonstration, a traditional system using standard sensors and a Minimum Variance Distortionless Response (MVDR) algorithm sampled 1000 points per second for 180 seconds. That dataset was processed by the MVDR algorithm, which aggregated the data and output 180 DOA estimates. Using the same dataset, an embodiment (described in further detail with respect to FIGS. 12A-1,2,3) eliminated 96% of the data, retaining only the upward zero crossings at 40 points per second, for 180 seconds. That reduced dataset of upward zero crossings and sensor positions was processed using a Direction Of Arrival algorithm described further herein and output 7,230 DOA estimates. Both algorithms output comparable results for moderately complex (hills, wind gusts, variable power) real world conditions. The present embodiment used a relatively narrower band width and was effective at lower frequency and lower power levels.

Referring again to FIG. 2, embodiments of the present approach enable significant improvement in analysis flexibility. Device groups selected for DOA analysis need not be viewed as only physical devices; rather they can be viewed and are multiple digital data streams with specified position data. Ad hoc analysis groups may be formed from these digital datasets using position data that satisfies certain guidelines described further herein, at the frequency of interest, using real time and stored detected times of phase event data streams. In this manner, a single deployed field device may be providing a data stream that is selected for use by none, one or many DOA analysis processes.

Significant improvements in information quality can be achieved, during post processing (FIG. 2) because System output, which represents a sequence of physical and meaningful instants, is also copious and disaggregated in form. When input later for Post Processing analysis, the disaggregate copious data enables application of the full power of sophisticated robust and non-parametric statistics, for example, order based filtering.

The Information System is a practical tool which can be applied to identifying and direction finding of multiple targets by a) using narrow band frequency diversity to differentially detect target signal and estimate direction, and/or b) using multiple narrow band frequency diversity to differentially detect, several frequencies, a target signature, and estimate direction and/or c) by iteratively estimating target direction and moving field device group(s) in the estimated direction and iterating again and/or d) adding post processing to for example, eliminate wild points e) and combinations of all of these.

System Overview Hardware and Software

Figures 3, 12A:
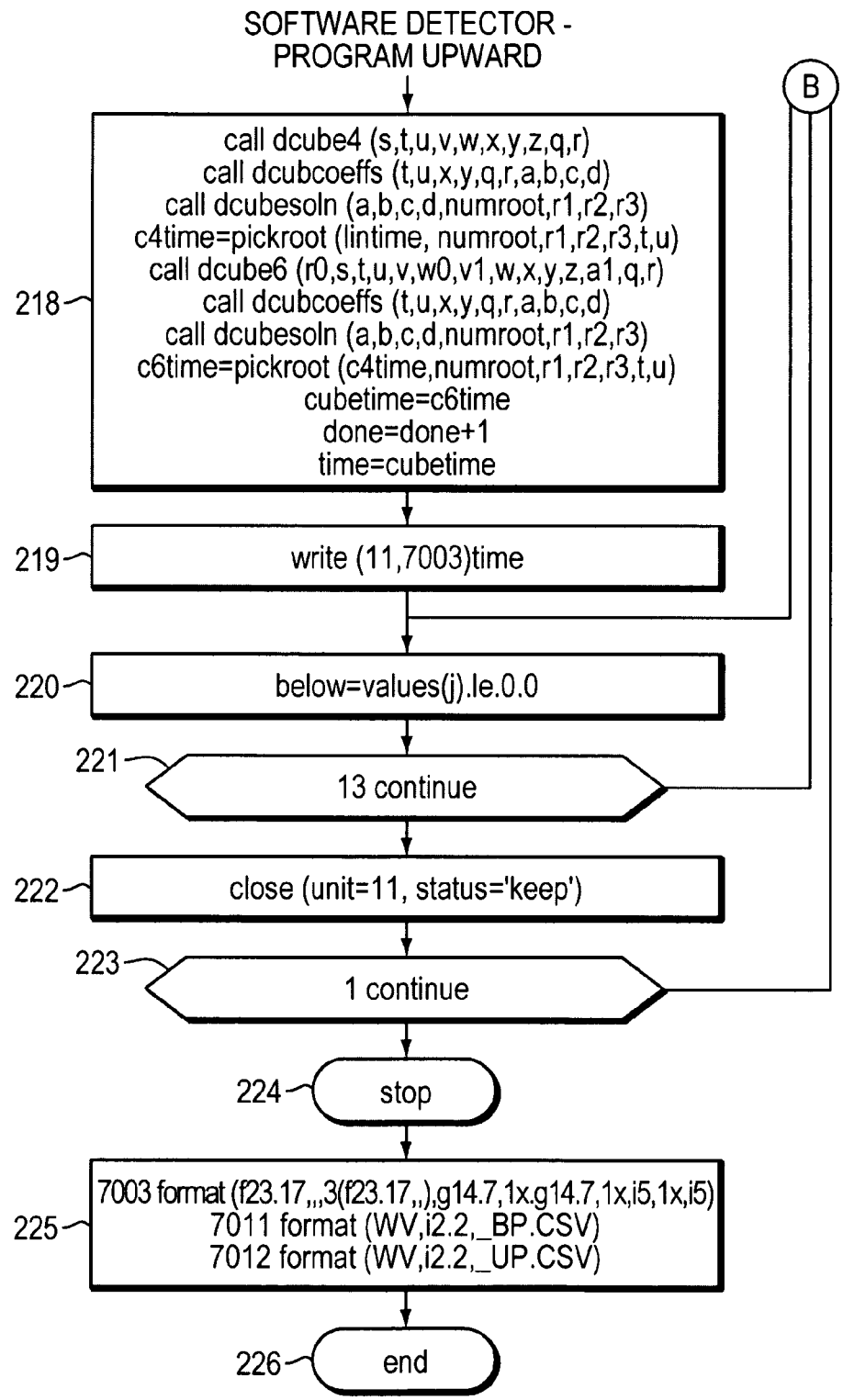
Figures 1, 12B:
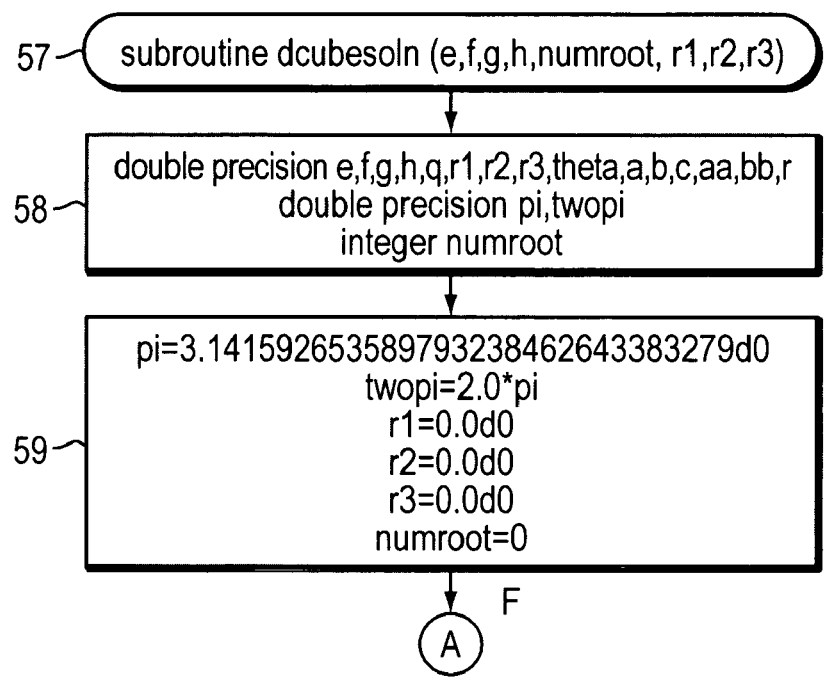
Figures 2, 12B:
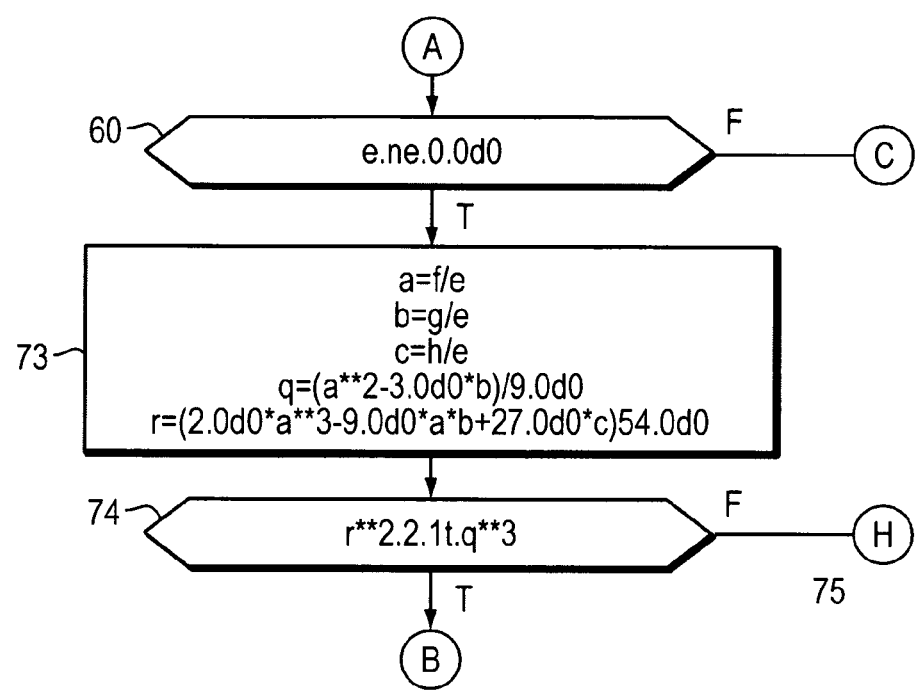
Figures 3, 12B:
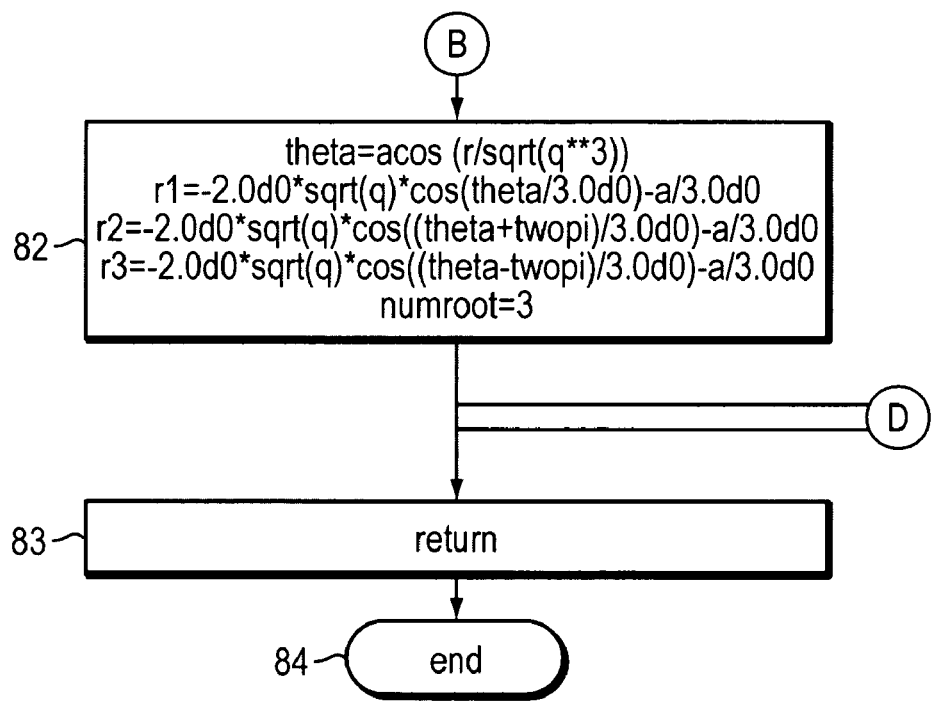

FIG. 2 System Hardware and Software Block Diagram can also be discussed as hardware, signal processing and software modules. Field Devices are devices which sense the traveling and processes the resulting signals. FIG. 3 Detection System Block Diagram, upper portion, depicts the essential functions implemented as hardware components. The transducer senses the composite effect of all traveling waves impinging on the field device. The band pass filter selects a frequency range for detection. The detector digitizer circuit detects phase events of one or more kinds and digitizes the times of the phase events and related data. These data are passed to a computer for use in DOA analysis. FIG. 3 Detection System Block Diagram, lower portion, depicts the essential function implements as existing hardware/software sensors systems and retrofit phase event detection software. The existing transducer senses the composite effect of all traveling waves impinging on the existing sensor system. The band pass filter selects a frequency range for detection. The phase event detector software is presented in FIGS. 12, 12A-1, 12A-2, 12A-3. Data output from the software detector are passed to a computer for use in DOA analysis.

Geometry Guidelines for Field Device Deployment Geometry

These guidelines provides a rule of thumb for estimating the distances needed between field devices if wavelength to be received is specified. Two, preferred three field devices, with appropriate geometry can achieve directional reception for any size wavelength.

Field Device Positions occurs in two forms:
a) Physical position of an actual field device at the time it detects each phase event.
b) Digital data set of position, time of the phase event (x,y,z,t) and associated digital data elements, such as field device unique identification.

Physical position constraints can be specified in several ways a) the distance between pairs of two field devices and b) the diameter of the scatter of devices and c) the geometric shape of a set of field devices and d) the set of vectors between field devices and a base point which is chosen to be one of the field devices in the set.

For the case of a set of 3 field devices in a plane, the physical position constraints are a) the distance between pairs of two field devices must be ½ wavelength or less, b) the diameters are the distances between pairs, c) the geometric shape of a set of 3 field devices must be a non-degenerate triangle, and d) the pair of vectors are linearly independent.

For the case of 4 field devices in a 3 space, the physical position constraints are a) the distance between pairs of two field devices must be ½ wavelength or less, b) the diameters of the scatter of devices are the distances between pairs and should be as large as possible (while still satisfying (a)), c) the geometric shape of set of 4 field devices in a three space is a non-degenerate tetrahedron and d) the set of three vectors are linearly independent.

For the case of more than three field devices in a plane, the physical position constraints are a) the distance between nearest neighbor field device pairs must be ½ wavelength or less, b) a nearly constant diameter in all directions, c) the geometric shape would ideally be a non-degenerate triangle which is composed of three element non-degenerate sub-triangles. The sub-triangles would meet all four constraints for the three field devices in a plane case, in particularly, d) within each sub-triangle, the set of vectors are linearly independent.

For the case of 4 field devices in a 3 space, the physical position constraints are a) the distance between nearest neighbor field device pairs must be ½ wavelength or less, b) a nearly constant diameter in all directions, c) the geometric shape would ideally be a non-degenerate tetrahedron which is composed of four element non-degenerate sub-tetrahedra. d) Within each sub-tetrahedra, the set of vectors are linearly independent.

Field Devices

Embodiments of Field Devices may have transducer(s), frequency filter(s), detector circuit(s) and output a series of digital data. Field Devices do not require a reference signal.

The data reported by a field device may include the time of an instantaneous phase event and the position of the field device when the phase event is detected. This detection/output process is repeated for each wave cycle. One embodiment of a field device is a single channel, single frequency, single transducer field device which does not move and for which the frequency and bandwidth are fixed while operating. Variations include a single channel, single frequency, single transducer field device which can move while operating and for which the frequency and bandwidth can be changed during operation; a multiple channel field device which can move while operating and for which the frequencies and bandwidths can be changed on the fly for any and all channels; and a multiple input, multiple channel multiple frequency field device which can move while operating and for which the frequencies and bandwidths can be changed during operation for any or all channels.

This section describes the field device hardware. The time and position of at least one traveling wave phase event are reported for each cycle.

Figures 4, 12B:
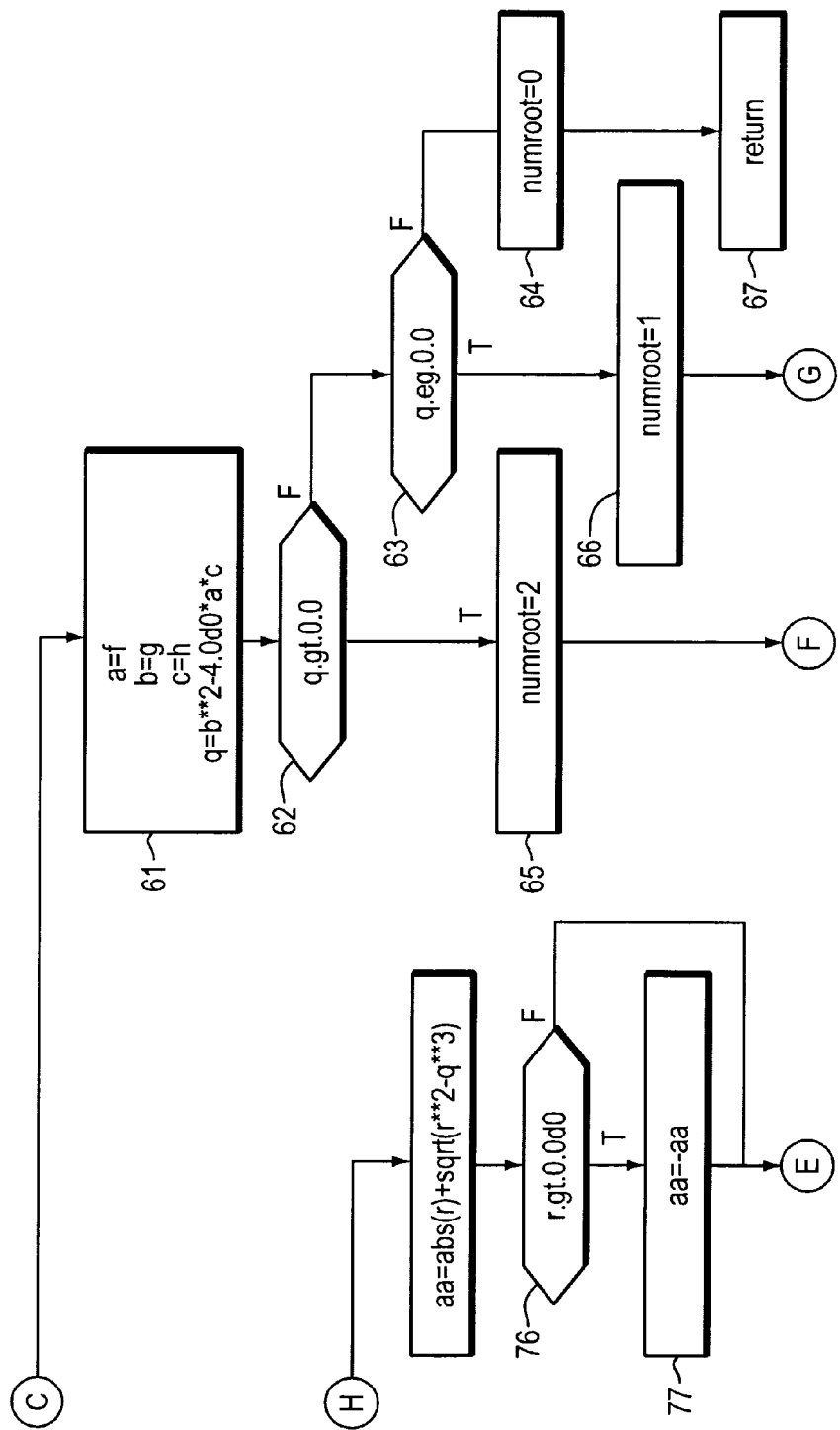

FIG. 4 is the block diagram for a single channel, single frequency, single transducer field device which does not move and for which the frequency and bandwidth are fixed while operating.

Antenna or other transducer 1 (e.g., directional or non-directional antennae, hydrophones, geophones, piezoelectrics, ferroelectrics, magnetic actuators, and microphones). Field Devices that provide data for a single analysis may have matched transducers with matching frequency/phase responses over the operating frequency ranges. The easiest way to achieve this is to deploy Field Devices with the same model and transducer specification. Non-directional or directional transducers can be used.

Pre-amplifier and amplifiers 2 boost signals to levels sufficient to avoid noise pickup during signal processing.

Band-pass filter 3 Minimal phase filters are preferred. Any type filter is acceptable when All field devices that provide data for a single analysis have matched filters with matched phase responses.

Amplifier & level-shifter 4. This amplifies and converts signal levels to TTL compatible 0-5 v. A comparator with the compare level at zero volts (0V) is acceptable.

Phase event detector 5 with a 32 bit is shown. A wider/narrower bus, as appropriate, is acceptable. Any of the detectors described in FIGS. 4-7, with appropriate bus width, can be used.

Latched time of phase event bus 6. The phase events latched will be those detected by the detector (5). A Data-Ready strobe is provided to trigger the storage and transmission circuitry (11, 26).

A digital time counter 8 is used to provide a multi-bit time value bus. In this Field Device, a 32 bit time counter is used. Time counters at all the field detectors that provide data for a single analysis should be synchronized with one another. The timing signal output by a GPS module provides a time counter (8) and a time value bus and the required synchronization.

Digital Storage 11 provides storage of data included detected data.

Transmitter 26 reports results to a central processing.

Figures 5, 12B:
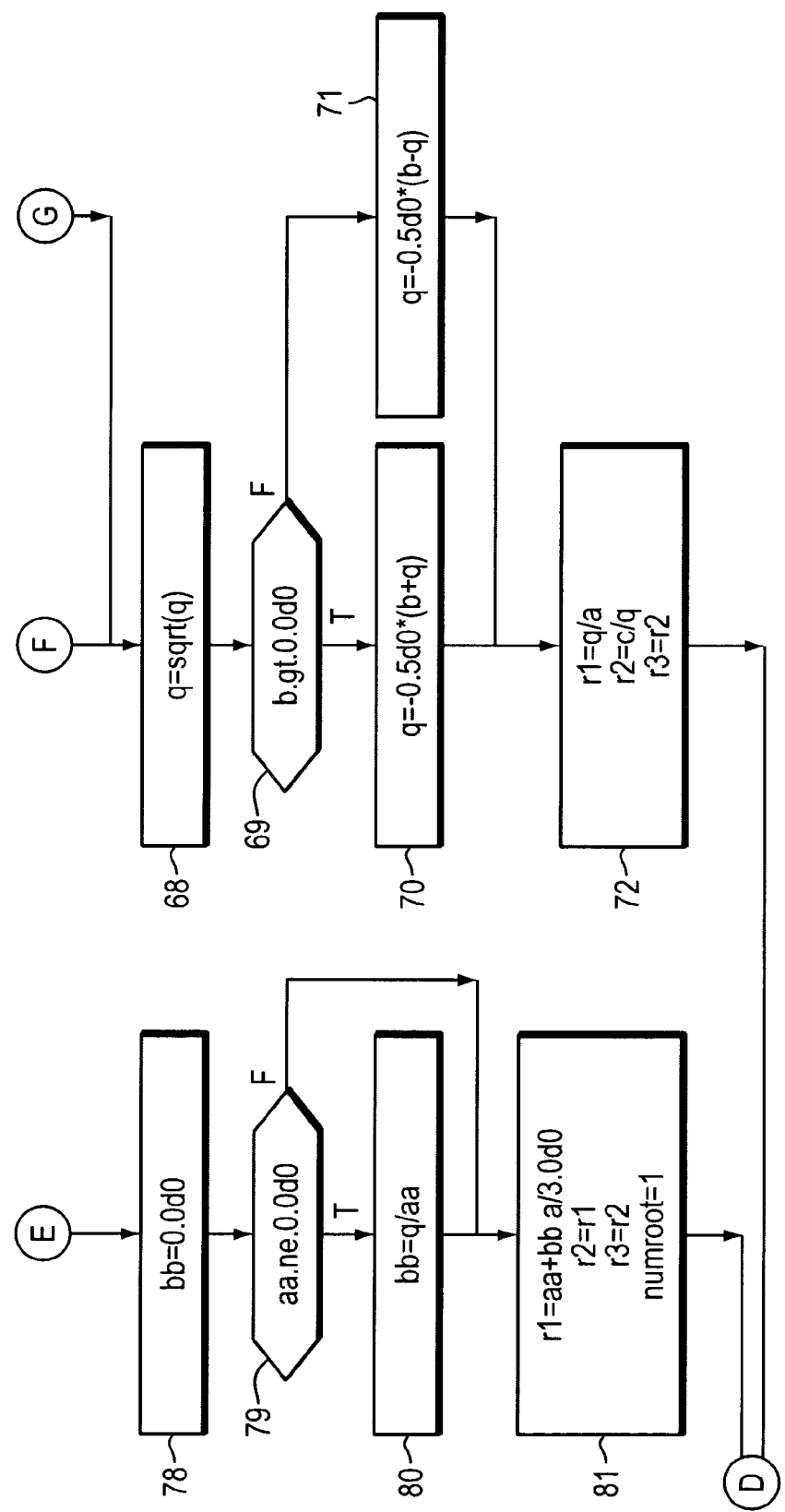
Figures 1, 12C:
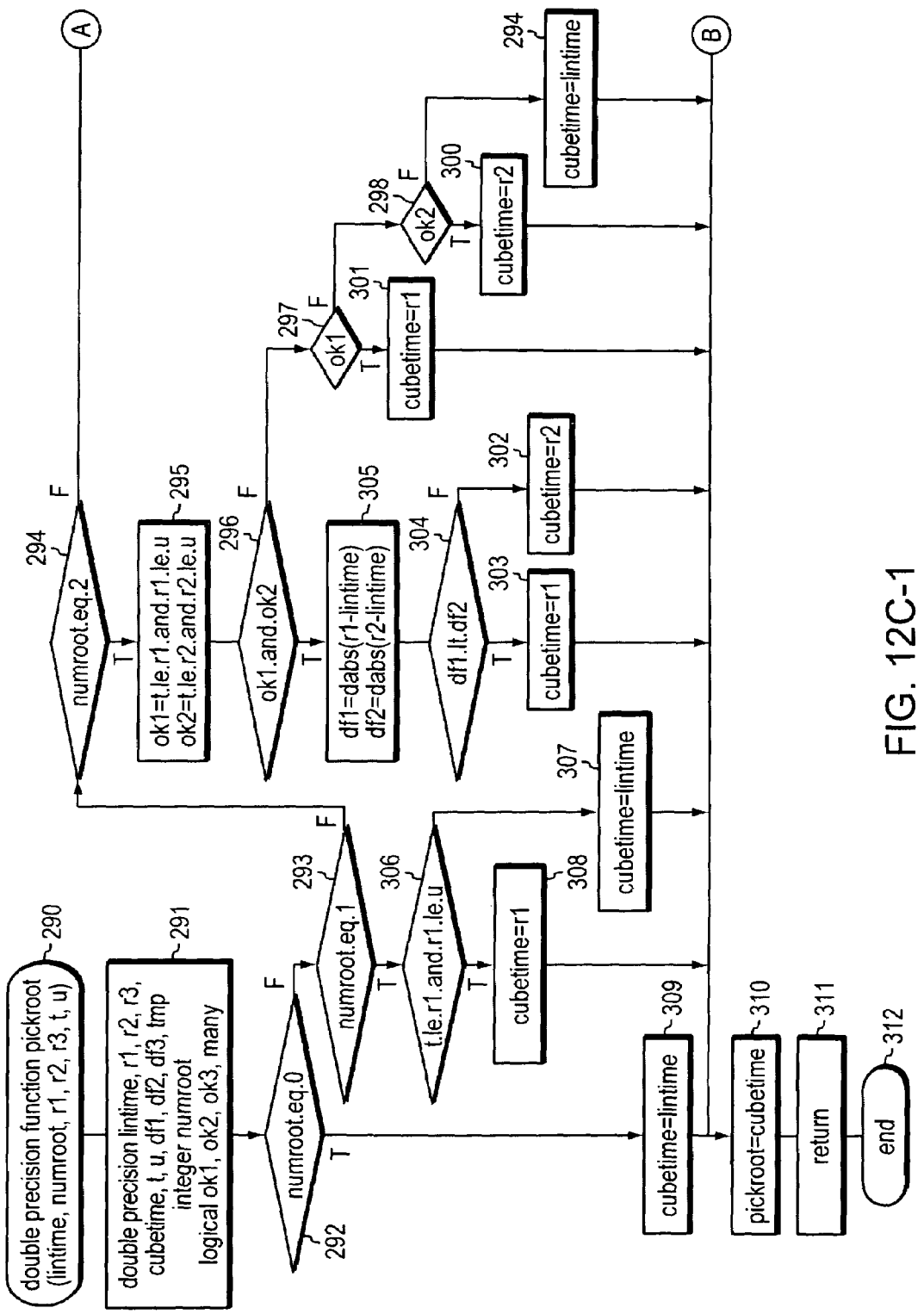
Figures 2, 12C:
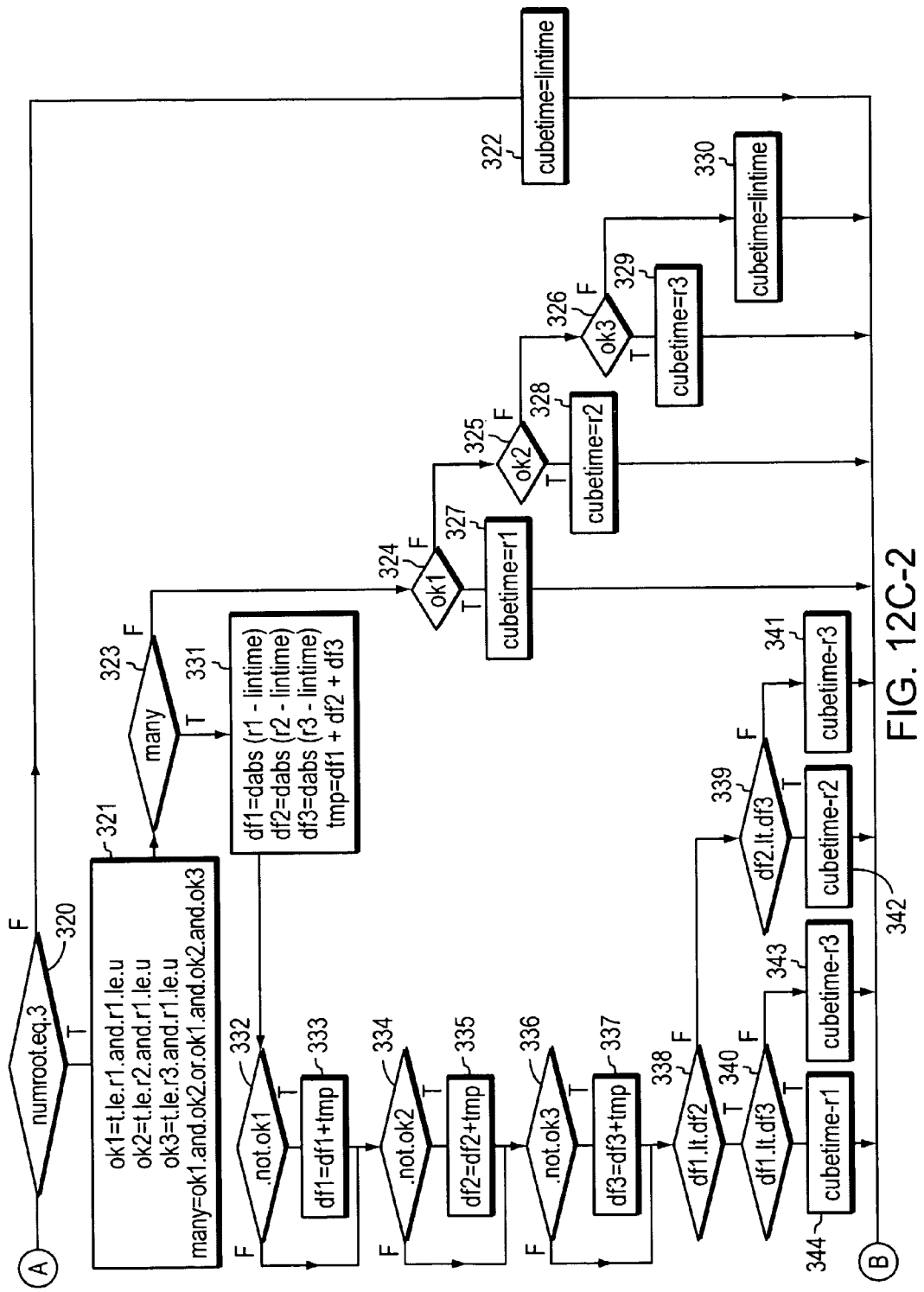
Figure 12D:
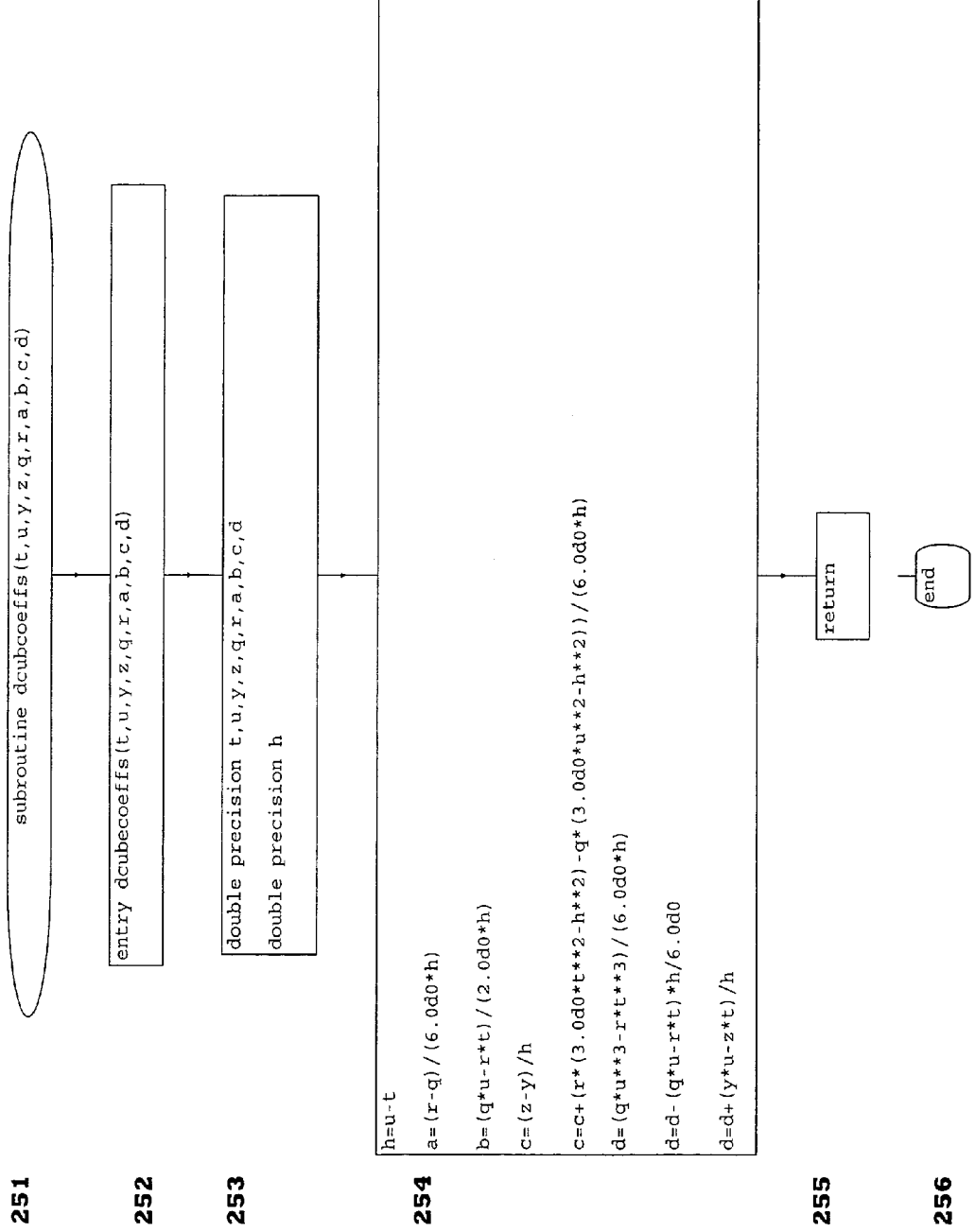
FIG. 12D Software Detector Subroutine cubecoeffs Flow Chart.

FIG. 5 is the block diagram for a single channel, single frequency, single transducer field device which can move while operating and for which the frequency and bandwidth can be changed during operation.

32 bit Frequency data latch 7. Preferably filter start frequency and filter stop frequency are latched, each being recorded as a 16 bit number. Alternatively, filter center frequency and bandwidth could be used as frequency range parameters.

Latched frequency range at time of phase event bus 8. This bus strobes with the phase event data bus (6), and has a common strobe line generated by (5).

32 bit position data latch 9. Preferably two Cartesian coordinate values in the plane are latched, each being recorded as a 16 bit number. Polar coordinates could also be used as position parameters. Position data can be derived from GPS or by other means.

Latched position at time of phase event bus 10. This bus strobes with the phase event data bus (6), and has a common strobe line generated by (5).

A digital time counter is used to provide a multi-bit time value bus 12. In this Field Device, a 32 bit time counter is used. Time counters at all the field detectors that provide data for a single analysis must be synchronized with one another. The timing signal output by a GPS module provides a time counter (12) and a time value bus and the required synchronization.

FIG. 6 is the block diagram for a multiple channel field device which can move while operating and for which the frequencies and bandwidths can be changed on the fly for any and all channels.

Event trigger signal 13 for the first channel latches and detector.

Second Band-pass filter, 14b. Minimal phase filters are preferred. Any type filter is acceptable when all field devices that provide data for a single analysis have matched filters with matched phase responses.

Second Amplifier & level-shifter, 15b. This amplifies and converts signal levels to TTL compatible 0-5 v. A comparator with the compare level at zero volts (0V) is acceptable.

Second time of phase event detector 16 with a 32 bit bus is shown. A wider/narrower bus, as appropriate, is acceptable. Any of the detectors described in FIGS. 8-11, with appropriate bus width, can be used.

Second latched time of phase event bus 17. The phase events latched will be those detected by the detector (16). A Data-Ready strobe is provided to trigger the storage and transmission circuitry (22, 27).

Second 32 bit Frequency data latch 18. Preferably filter start frequency and filter stop frequency are latched, each being recorded as a 16 bit number. Alternatively, filter center frequency and bandwidth could be used as frequency range parameters.

Second Latched frequency range at time of phase event bus 19. This bus strobes with the phase event data bus (17), and has a common strobe line generated by (16).

Second 32 bit position data latch 20. Preferably two Cartesian coordinate values in the plane are latched, each being recorded as a 16 bit number. Polar coordinates could also be used as position parameters. Position data can be derived from GPS or by other means.

Second Latched position at time of phase event bus 21. This bus strobes with the phase event data bus (17), and has a common strobe line generated by (16).

Second digital Storage block 22.

Event trigger signal for the Second channel latches and detector 23.

Transmitter1 26 to report channel 1 results back to the central processing. While separate transmitters for the separate channels are preferred, it would also be possible to multiplex channels for transmission by a single transmitter.

Transmitter 2 27 to report channel 2 results back to the central processing. While separate transmitters for the separate channels are preferred, it would also be possible to multiplex channels for transmission by a single transmitter.

FIG. 7 is the block diagram for a multiple input, multiple channel multiple frequency field device which can move while operating and for which the frequencies and bandwidths can be changed during operation for any or all channels.

Second channel antenna 24 or other transducer (e.g., directional or non-directional antennae, hydrophones, geophones, piezoelectrics, ferroelectrics, magnetic actuators, and microphones). All the Field Devices that provide data for a single analysis must have matched transducers with matching frequency/phase responses over the operating frequency ranges. The easiest way to achieve this is to deploy Field Devices with the same model and transducer specification. Non-directional or directional transducers can be used.

Second channel Pre-amplifier and amplifiers 25, boost signals to levels sufficient to avoid noise pickup during signal processing.

Phase Event Detector and Digitizer Detection and Digitizer Circuit Hardware

Any one phase event type may be chosen for detection. Detection is a non-linear process and can convert or mix signals which are normally considered independent. For example, amplitude noise may be converted to phase noise during detection. For this reason, upward and downward zero crossings are preferred phase event types. Minimum and maximum amplitude are useful for the near field. As shown in FIGS. 8 and 9, the preferred detector embodiment is for detecting a single phase event per wave cycle. FIG. 8 is an upward zero crossing phase event detector and digitizer and FIG. 9 shows a downward zero crossing phase detector and digitizer. Two Alternative Embodiments are presented. FIG. 10 shows detection of two phase events per wave cycle, both upward and downward zero crossings. That embodiment detects and digitizes two phase events per wave cycle and supports computation of two directions of arrival estimates per wave cycle. Some seismic signals are under one Hertz, often ranging down to tens of milliHz. At 0.1 Hz, detection of one phase event per cycle or one data sample every 10 second may not be sufficient for later data analysis. A second alternate embodiment is shown in FIG. 11, a detector, digitizer for four phase events per wave cycle: upward and downward zero crossings and maximum and minimum amplitude. Amplitude is often of interest and may be useful when estimating direction of arrival for traveling waves from near-field sources.

FIG. 8 depicts an embodiment of detector and digitizer for one phase event per wave cycle which detects upward zero crossings. The components of this embodiment are described in 51-62 and the signals are further described in 76-80:

51) Input connection to the detector. The input signal (76) enters here.

52) A Schmitt-trigger input NAND, such as a 74HC132 or 74LS132 or 74HCT132, is used to convert the input signal's edge transitions to the opposite sign, the use of a Schmitt-trigger input device avoids false multiple triggering for slowly rising or noise inputs.

53) A second gate, U2b, from the four-gate Schmitt-trigger input NAND is used to invert the input signal again to restore original polarity. This detector detects rising edges of the amplified, filtered and limited signal which correspond to upward zero crossings of the original wave signal.

54) A digital time counter, outputs a multi-bit time value bus (55). In this embodiment, (54) is a 32 bit time counter, but wider or narrower buses may be used as appropriate. Time counters at all the field detectors that provide data for a single analysis must be synchronized with one another. The timing signal output by a GPS module provides a time counter (54) and a time value bus (55) and the required synchronization.

55) The 32 bit time counter bus is used to provide data into the inputs of 32 D-Flip-Flops. The time counter bus is broken out into individual bit lines, (78), which are used to drive the D inputs of the D-Flip-Flops.

56) The 32 bit event time output bus carries latched-time values from the outputs of the D-Flip-Flops. Signals are asynchronous and output (56) requires a means of signaling the availability of data to the circuitry that follows. One additional bit (79) is provided for use as a data-ready strobe, but more may be appropriate in certain applications. A Data-Ready strobe pulse indicates a new value is available at the output. The event time output bus is broken out into individual bit lines, (80), which are driven by the Q outputs of the D-Flip-Flops.

57) The first six bits of the upward zero crossing register of 32 bits are implemented as a six bit wide D-Flip-Flop, U4. This circuit is copied over repeatedly to provide enough bits to latch the multi-bit time counter bus (55). These bits are the LSBs, Least Significant Bits, of the multibit value. Together with (58) this stands for all the D-Flip-Flops in the register. A 74HC174 or 74LS174 or 74HCT174 can be used. These bits are latched from the time counter bus (55) when the original input signal has an upward zero crossing.

58) The last six bits of the upward zero crossing register of 32 bits is implemented as a six bit wide D-Flip-Flop, U3. This circuit is copied over repeatedly to provide enough bits to latch the multi-bit time counter bus (55). These bits are the MSBs, Most Significant Bits, of the multibit value. Together with (57) this stands for all the D-Flip-Flops in the register. A 74HC174 or 74LS174 or 74HCT174 can be used. These bits are latched from the time counter bus (55) when the original input signal has an upward zero crossing.

59) This is a 123 monostable multivibrator, a.k.a., one-shot, U1a, which generates Data-Ready pulses. The input to the one-shot is the B-input, which responds to rising edges and matches the D-Flip-Flops, which are rising edge triggered. The one-shot will trigger from the same events which trigger the flip-flops. A 74HC123 or 74LS123 or 74HCT123 can be used. The Data-Ready pulse duration is set by the RC time constant of R1 (60) and C1 (61).

60) This is the resistor, R1, which provides timing for the one-shot, (59), as part of an RC time constant. The R1 value together with the suggested value for the capacitor, (61), provides nominal 100 nS timing. This is sufficient for most signals such as for seismic, low RF, many IF and all audio signals. For faster signals, a shorter time constant can be used.

61) This is the capacitor, C1, which provides timing for the one-shot, (59), as part of an RC time constant with the resistor, (60).

62) The Q output of the one-shot, (59), provides the Data-Ready signal, which is made available both by itself, and as an extra bit on the output bus, (56).

76) The required form of the input signal is amplified, band-pass filtered, and amplitude-limited, and converted to a TTL compatible level: 0 to +5V.

77) The form of the signal at this point is twice-negated, so that upward zero crossings of the original wave signal appear as upward or rising edge events at the inputs of the D-flip-flops.

78) Individual bit lines of the time counter bus (55).

79) The form of the Data-Ready signal, pulses high for a short period to indicate the availability of a new phase event's data value.

80) Individual bit lines of the event time output bus (56).

FIG. 9 depicts an embodiment of a detector and digitizer for one phase event per wave cycle which detects downward zero crossings. The components of this embodiment are described in 51-62 and the signals are further described in 76-80:

51) Input connection to the detector. The input signal (76) enters here.

52) A Schmitt-trigger input NAND, such as a 74HC132 or 74LS132 or 74HCT132, is used to convert the input signal's edge transitions to the opposite sign, so that downward zero crossings of the original input signal will appear as upward edge events at the inputs of the D-flip-flops. The use of a Schmitt-trigger input device avoids false multiple triggering for slowly rising or noise inputs.

54) A digital time counter, outputs a multi-bit time value bus (55). In this embodiment, (54) is a 32 bit time counter, but wider or narrower buses may be used as appropriate. Time counters at all the field detectors that provide data for a single analysis must be synchronized with one another. The timing signal output by a GPS module provides a time counter (54) and a time value bus (55) and the required synchronization.

55) The 32 bit time counter bus is used to provide data into the inputs of 32 D-Flip-Flops. The time counter bus is broken out into individual bit lines, (78), which are used to drive the D inputs of the D-Flip-Flops.

56) The 32 bit event time output bus carries latched time values from the outputs of the D-Flip-Flops. Signals are asynchronous and output (56) requires a means of signaling the availability of data to the circuitry that follows. One additional bit (79) is provided for use as a data-ready strobe, but more may be appropriate in certain applications. A Data-Ready strobe pulse indicates a new value is available at the output. The event time output bus is broken out into individual bit lines, (80), which are driven by the Q outputs of the D-Flip-Flops.

57) The first six bits of the upward zero crossing register of 32 bits are implemented as a six bit wide D-Flip-Flop, U4. This circuit is copied over repeatedly to provide enough bits to latch the multi-bit time counter bus (55). These bits are the LSBs, Least Significant Bits, of the multibit value. Together with (58) this stands for all the D-Flip-Flops in the register. A 74HC174 or 74LS174 or 74HCT174 can be used. These bits are latched from the time counter bus (55) when the original input signal has an upward zero crossing.

58) The last six bits of the upward zero crossing register of 32 bits is implemented as a six bit wide D-Flip-Flop, U3. This circuit is copied over repeatedly to provide enough bits to latch the multi-bit time counter bus (55). These bits are the MSBs, Most Significant Bits, of the multibit value. Together with (57) this stands for all the D-Flip-Flops in the register. A 74HC174 or 74LS174 or 74HCT174 can be used. These bits are latched from the time counter bus (55) when the original input signal has an upward zero crossing.

59) This is a 123 monostable multivibrator, a.k.a., one-shot, U1a, which generates Data-Ready pulses. The input to the one-shot is the B-input, which responds to rising edges and matches the D-Flip-Flops, which are rising edge triggered. The one-shot will trigger from the same events which trigger the flip-flops. A 74HC123 or 74LS123 or 74HCT123 can be used. The Data-Ready pulse duration is set by the RC time constant of R1 (60) and C1 (61).

60) This is the resistor, R1, which provides timing for the one-shot, (59), as part of an RC time constant. The R1 value together with the suggested value for the capacitor, (61), provides a nominal 100 nS timing. This is sufficient for most signals such as for seismic, low RF, many IF and all audio signals. For faster signals, a shorter time constant can be used.

61) This is the capacitor, C1, which provides timing for the one-shot, (59), as part of an RC time constant with the resistor, (60).

62) The Q output of the one-shot, (59), provides the Data-Ready signal, which is made available both by itself, and as an extra bit on the output bus, (56).

76) The required form of the input signal is amplified, band-pass filtered, and amplitude-limited, and converted to a TTL compatible level: 0 to +5V.

77) The form of the signal at this point is twice-negated, so that upward zero crossings of the original wave signal appear as upward or rising edge events at the inputs of the D-flip-flops.

78) Individual bit lines of the time counter bus (55).

79) The form of the Data-Ready signal, pulses high for a short period to indicate the availability of a new phase event's data value.

80) Individual bit lines of the event time output bus (56).

An alternative embodiment is shown in FIG. 10, which depicts a detector and digitizer for two phase events per wave cycle. This embodiment detects and digitizes two phase events per wave cycle, upward and downward zero crossings, and supports computation of two direction of arrival estimates per wave cycle. Some seismic signals are under one Hertz, often ranging down to tens of milliHz. At 0.1 Hz, detection of one phase event per cycle or one data sample every 10 second may not be sufficient for later data analysis.

The components of this alternate embodiment are described in 51-69 and the signals are further described in 76-80:

51) Input connection to the detector. The input signal (76) enters here.

52) A Schmitt-trigger input NAND, such as a 74HC132 or 74LS132 or 74HCT132, is used to convert the input signal's edge transitions to the opposite sign, the use of a Schmitt-trigger input device avoids false multiple triggering for slowly rising or noise inputs.

53) A second gate, U2b, from the four-gate Schmitt-trigger input NAND is used to invert the input signal again to restore original polarity. This detector will detect rising edges of the amplified, filtered and limited signal which correspond to upward zero crossings of the original wave signal.

54) A digital time counter, outputs a multi-bit time value bus (55). In this embodiment, (54) is a 32 bit time counter, but wider or narrower buses may be used as appropriate. Time counters at all the field detectors that provide data for a single analysis must be synchronized with one another. The timing signal output by a GPS module provides a time counter (54) and a time value bus (55) and the required synchronization.

55) The 32 bit time counter bus is used to provide data into the inputs of 32 D-Flip-Flops. The time counter bus is broken out into individual bit lines, (78), which are used to drive the D inputs of the D-Flip-Flops.

56) The 32 bit event time output bus carries latched time values from the outputs of the D-Flip-Flops. Signals are asynchronous and output (56) requires a means of signaling the availability of data to the circuitry that follows. One additional bit (79) is provided for use as a data-ready strobe, but more may be appropriate in certain applications. A Data-Ready strobe pulse indicates a new value is available at the output. The event time output bus is broken out into individual bit lines, (80), which are driven by the Q outputs of the D-Flip-Flops.

57) The first six bits of the upward zero crossing register of 32 bits are implemented as a six bit wide D-Flip-Flop, U4. This circuit is copied over repeatedly to provide enough bits to latch the multi-bit time counter bus (55). These bits are the LSBs, Least Significant Bits, of the multibit value. Together with (58) this stands for all the D-Flip-Flops in the register. A 74HC174 or 74LS174 or 74HCT174 can be used. These bits are latched from the time counter bus (55) when the original input signal has an upward zero crossing.

58) The last six bits of the upward zero crossing register of 32 bits is implemented as a six bit wide D-Flip-Flop, U3. This circuit is copied over repeatedly to provide enough bits to latch the multi-bit time counter bus (55). These bits are the MSBs, Most Significant Bits, of the multibit value. Together with (57) this stands for all the D-Flip-Flops in the register. A 74HC174 or 74LS174 or 74HCT174 can be used. These bits are latched from the time counter bus (55) when the original input signal has an upward zero crossing.

59) This is a 123 monostable multivibrator, a.k.a., one-shot, U1a, which generates Data-Ready pulses. The input to the one-shot is the B-input, which responds to rising edges and matches the D-Flip-Flops, which are rising edge triggered. The one-shot will trigger from the same events which trigger the flip-flops. A 74HC123 or 74LS123 or 74HCT123 can be used. The Data-Ready pulse duration is set by the RC time constant of R1 (60) and C1 (61).

60) This is the resistor, R1, which provides timing for the one-shot, (59), as part of an RC time constant. The R1 value together with the suggested value for the capacitor, (61), provides a nominal 100 nS timing. This is sufficient for most signals such as for seismic, low RF, many IF and all audio signals. For faster signals, a shorter time constant would be used.

61) This is the capacitor, C1, which provides timing for the one-shot, (59), as part of an RC time constant with the resistor, (60).

62) The Q output of the one-shot, (59), provides the Data-Ready signal, which is made available both by itself, and as an extra bit on the output bus, (56).

63) This is a 123 monostable multivibrator, a.k.a., one-shot, U1a, which generates Data-Ready-up pulses. The input to the one-shot is the B-input, which responds to rising edges and matches the D-Flip-Flops, which are rising edge triggered. The one-shot will trigger from the same events which trigger the flip-flops. A 74HC123 or 74LS123 or 74HCT123 can be used. The Data-Ready-up pulse duration is set by the RC time constant of R1 (14) and C1 (68).

64) This is the resistor, R2, which provides timing for the one-shot, (63), as part of an RC time constant. This value together with the suggested value for the capacitor, (68), provides a nominal 100 nS timing. This is sufficient for most signals such as for seismic, low RF, many IF and all audio signals. For faster signals, a shorter time constant can be used.

65) The 32 bit up event time output bus, which carries latched time values from the Q outputs of the D-Flip-Flops (66) and (67) for upward zero crossings. Signals are asynchronous and the output (65) requires a means of signaling the availability of data to the circuitry that follows. A Data-Ready-Up strobe pulse (81) indicates a new upward zero crossing value is available at the output. The up event time output bus is broken out into individual bit lines, (82), which are driven by the Q outputs of the D-Flip-Flops (66) and (67).

66) The first six bits of the upward zero crossing register of 32 bits implemented as a six bit wide D-Flip-Flop, U6. This circuit is copied over repeatedly to provide enough bits to latch the multi-bit time counter bus. These bits are the LSBs, Least Significant Bits, of the multibit value. Together with (67) this stands for all the D-Flip-Flops in the register. A 74HC174 or 74LS174 or 74HCT174 can be used. These bits are latched from the time counter (54) when the original input signal has an upward zero crossing.

67) The last bits of the upward zero crossing register of 32 bits implemented as a six bit wide D-Flip-Flop, U5. This circuit is copied over repeatedly to provide enough bits to latch the multi-bit time counter bus (55). These bits are the MSBs, Most Significant Bits, of the multibit value. Together with (66) this stands for all the D-Flip-Flops in the register. A 74HC174 or 74LS174 or 74HCT174 can be used. These bits are latched from the time counter bus (55) when the original input signal has an upward zero crossing.

68) This is the capacitor, C2, which provides timing for the one-shot, (63), as part of an RC time constant with the resistor, (64).

69) The Q output of the one-shot, (63), provides the Data-Ready-Up signal, which is made available both by itself, and as an extra bit on the output bus, (65). 70-75) Are not present in FIG. 10.

76) The required form of the input signal is amplified, band-pass filtered, and amplitude-limited, and converted to a TTL compatible level: 0 to +5V.

77a) The form of the signal at this point is negated, so that downward zero crossings of the original wave signal appear as upward or rising edge events at the inputs of the D-flip-flops, (57, 58).

77b) The form of the signal at this point is twice-negated, so that upward zero crossings of the original wave signal appear as upward or rising edge events at the inputs of the D-flip-flops (66, 67).

78) Individual bit lines of the time counter bus (55).

79) The form of the Data-Ready signal, pulses high for a short period to indicate the availability of a new phase event's data value.

80) Individual bit lines of the event time output bus (56).

81) The Data-Ready-Up signal, this pulses high for a short period to indicate the availability of a new upward zero crossing phase event's time data value.

82) Individual bit lines of the upward zero crossing events' time output bus (65).

Another alternate embodiment is shown in FIG. 11. Amplitude is often of interest and may be useful when estimating direction of arrival for traveling waves from near-field sources. The detector/digitizer depicted in FIG. 11 detects two zero crossings per wave cycle, upward and downward, and also detects the peak amplitudes of each part-cycle between successive zero crossing.

The components of this alternate embodiment are described below.

51) Input connection to the detector. The input signal (76) enters here.

52) A Schmitt-trigger input NAND, such as a 74HC132 or 74LS132 or 74HCT132, is used to convert the input signal's edge transitions to the opposite sign, the use of a Schmitt-trigger input device avoids false multiple triggering for slowly rising or noise inputs.

53) A second gate, U2b, from the four-gate Schmitt-trigger input NAND is used to invert the input signal again to restore original polarity. This detector will detect rising edges of the amplified, filtered and limited signal which correspond to upward zero crossings of the original wave signal.

54) A digital time counter, outputs a multi-bit time value bus (55). In this embodiment, (54) is a 32 bit time counter, but wider or narrower buses may be used as appropriate. Time counters at all the field detectors that provide data for a single analysis must be synchronized with one another. The timing signal output by a GPS module provides a time counter (54) and a time value bus (55) and the required synchronization.

55) The 32 bit time counter bus is used to provide data into the inputs of 32 D-Flip-Flops. The time counter bus is broken out into individual bit lines, (78), which are used to drive the D inputs of the D-Flip-Flops.

56) The 32 bit event time output bus carries latched time values from the outputs of the D-Flip-Flops. Signals are asynchronous and output (56) requires a means of signaling the availability of data to the circuitry that follows. One additional bit (79) is provided for use as a data-ready strobe, but more may be appropriate in certain applications. A Data-Ready strobe pulse indicates a new value is available at the output. The event time output bus is broken out into individual bit lines, (80), which are driven by the Q outputs of the D-Flip-Flops.

57) The first six bits of the upward zero crossing register of 32 bits are implemented as a six bit wide D-Flip-Flop, U4. This circuit is copied over repeatedly to provide enough bits to latch the multi-bit time counter bus (55). These bits are the LSBs, Least Significant Bits, of the multibit value. Together with (58) this stands for all the D-Flip-Flops in the register. A 74HC174 or 74LS174 or 74HCT174 can be used. These bits are latched from the time counter bus (55) when the original input signal has an upward zero crossing.

58) The last six bits of the upward zero crossing register of 32 bits is implemented as a six bit wide D-Flip-Flop, U3. This circuit is copied over repeatedly to provide enough bits to latch the multi-bit time counter bus (55). These bits are the MSBs, Most Significant Bits, of the multibit value. Together with (57) this stands for all the D-Flip-Flops in the register. A 74HC174 or 74LS174 or 74HCT174 can be used. These bits are latched from the time counter bus (55) when the original input signal has an upward zero crossing.

59) This is a 123 monostable multivibrator, a.k.a., one-shot, U1a, which generates Data-Ready pulses. The input to the one-shot is the B-input, which responds to rising edges and matches the D-Flip-Flops, which are rising edge triggered. The one-shot will trigger from the same events which trigger the flip-flops. A 74HC123 or 74LS123 or 74HCT123 can be used. The Data-Ready pulse duration is set by the RC time constant of R1 (60) and C1 (61).

60) This is the resistor, R1, which provides timing for the one-shot, (59), as part of an RC time constant. The R1 value together with the suggested value for the capacitor, (61), provides a nominal 100 nS timing. This is sufficient for most signals such as for seismic, low RF, many IF and all audio signals. For faster signals, a shorter time constant can be used.

61) This is the capacitor, C1, which provides timing for the one-shot, (59), as part of an RC time constant with the resistor, (60).

62) The Q output of the one-shot, (59), provides the Data-Ready signal, which is made available both by itself, and as an extra bit on the output bus, (56).

63) This is a 123 monostable multivibrator, a.k.a., one-shot, U1a, which generates Data-Ready-up pulses. The input to the one-shot is the B-input, which responds to rising edges and matches the D-Flip-Flops, which are rising edge triggered. The one-shot will trigger from the same events which trigger the flip-flops. A 74HC123 or 74LS123 or 74HCT123 can be used. The Data-Ready-up pulse duration is set by the RC time constant of R1 (14) and C1 (68).

64) This is the resistor, R2, which provides timing for the one-shot, (63), as part of an RC time constant. This value together with the suggested value for the capacitor, (68), provides a nominal 100 nS timing. This is sufficient for most signals such as for seismic, low RF, many IF and all audio signals. For faster signals, a shorter time constant would be used.

65) The 32 bit up event time output bus, which carries latched time values from the Q outputs of the D-Flip-Flops (66) and (67) for upward zero crossings. Signals are asynchronous and the output (65) requires a means of signaling the availability of data to the circuitry that follows. A Data-Ready-Up strobe pulse (81) indicates a new upward zero crossing value is available at the output. The up event time output bus is broken out into individual bit lines, (82), which are driven by the Q outputs of the D-Flip-Flops (66) and (67).

66) The first six bits of the upward zero crossing register of 32 bits implemented as a six bit wide D-Flip-Flop, U6. This circuit is copied over repeatedly to provide enough bits to latch the multi-bit time counter bus. These bits are the LSBs, Least Significant Bits, of the multibit value. Together with (67) this stands for all the D-Flip-Flops in the register. A 74HC174 or 74LS174 or 74HCT174 can be used. These bits are latched from the time counter (54) when the original input signal has an upward zero crossing.

67) The last bits of the upward zero crossing register of 32 bits implemented as a six bit wide D-Flip-Flop, U5. This circuit is copied over repeatedly to provide enough bits to latch the multi-bit time counter bus (55). These bits are the MSBs, Most Significant Bits, of the multibit value. Together with (66) this stands for all the D-Flip-Flops in the register. A 74HC174 or 74LS174 or 74HCT174 can be used. These bits are latched from the time counter bus (55) when the original input signal has an upward zero crossing.

68) This is the capacitor, C2, which provides timing for the one-shot, (63), as part of an RC time constant with the resistor, (64).

69) The Q output of the one-shot, (63), provides the Data-Ready-Up signal, which is made available both by itself, and as an extra bit on the output bus, (65).

70) This is a clearable precision-rectifier and peak detector which is used to detect the peak amplitude of the wave half-cycle preceding the downward zero crossing event. Peak amplitude is captured irrespective of sign. Sign can be fully determined since the amplitude prior to a downward zero crossing must be positive.

71) Analog to digital converter used to convert the detected peak amplitude of the wave half-cycle preceding the downward zero crossing event.

72) This is a clearable precision-rectifier and peak detector which is used to detect the peak amplitude of the wave half-cycle preceding the upward zero crossing event. Peak amplitude is captured irrespective of sign. Sign can be fully determined since the amplitude prior to an upward zero crossing must be negative.

73) Analog to digital converter which is used to convert the detected peak amplitude of the wave half-cycle preceding the upward zero crossing event.

74) This is the latched digitized value of the peak amplitude for the wave half-cycle immediately preceding the downward zero crossing event.

75) This is the latched digitized value of the peak amplitude for the wave half-cycle immediately preceding the upward zero crossing event.

76) The required form of the input signal is amplified, band-pass filtered, and but not amplitude-limited nor converted to a TTL compatible level.

77a) The form of the signal at this point is negated, so that downward zero crossings of the original wave signal appear as upward or rising edge events at the inputs of the D-flip-flops, (57, 58).

77b) The form of the signal at this point is twice-negated, so that upward zero crossings of the original wave signal appear as upward or rising edge events at the inputs of the D-flip-flops (66, 67).

78) Individual bit lines of the time counter bus (55).

79) The form of the Data-Ready signal, pulses high for a short period to indicate the availability of a new phase event's data value.

80) Individual bit lines of the event time output bus (56).

81) The Data-Ready-Up signal, this pulses high for a short period to indicate the availability of a new upward zero crossing phase event's time data value.

82) Individual bit lines of the upward zero crossing events' time output bus (65).

83) U11 is an amplifier and limiter function. This can be implemented by using a comparator with the compare level being zero volts (0V) to amplify the input signal and convert it to TTL levels for detection of zero crossing events.

84) The limited and converted TTL compatible signal (84) reflects the zero crossing of the original signal (76). Upward zero-crossings in the original signal (76) have been converted to rising-edge transitions in (84), downward zero-crossings in the original signal (76) have been converted to falling-edge transitions (84).

Software Detector

An embodiment of a Software Detector prepares whole wave frequency limited (band passed) digitized data from conventional sensors for input to be processed by the DOA algorithm embodiment described further herein. As shown in FIG. 12, three types of interpolation (6 and 4 point cubic spline and 2 point linear) are used to detect, for example, upward zero crossing phase events.

The following describes an embodiment of a working Fortran program that embodies a single phase event detector, in software. Digitized whole wave data, band-pass filtered, is input and event times for detected events are output. The flowchart is shown as FIG. 12A. The subroutines used are shown in FIGS. 12B through 12F. Cubic spline interpolation using three data points on each side of the zero crossing, six points total, is the preferred embodiment for fitting a function to use to find the exact time of the zero crossing. Four point cubic spline and two point linear interpolations are used in support, to aid in the selection of the correct root of the 6-point cubic fit and as backup when root finding for the 6-point cubic fit fails. The cubic spline and cubic root finding are standard, following the treatment in Numerical Recipes, First Edition. This is an example for using one kind of phase event, an upward zero crossing, but any phase event could be used.

201) Program Upward is a Fortran Program
202) Declare all floats as double precision for accuracy
203) Set logical variables to select the type of function used to compute the time of the zero crossing.
204) Begin Do Loop to iterate over each sensor data stream
205) Create file name for each sensor data stream
206) Open data file for the nth sensor
207) Do Loop to iterate over all data points in data file and Read all data points into an internal array
208) Loop Counter bookkeeping
209) Read next data point or if last point, exit
210) Loop Termination
211) Exit if 209 is last data point
212) Counter Bookkeeping, Close file
213) Create Output file
214) Prepare To Process Data, Open Output, Initialize
215) Do Loop to Compute Times of Zero Crossing
216) Test to determine if prior point is below zero and present point is above zero. If false, proceed at 220

217) Variables with (time, amplitude) for six points Compute one time of zero crossing using linear function with prior and present points 218) Compute the time of the zero crossing with cubic 218 a) Call Subroutine dcube4 to compute four point cubic spline fit coefficients 218 b) Call Subroutine dcubecoeff to convert cubic spline coefficients to standard algebraic polynomial form for intervals between prior and present points, i.e., the interval containing the zero crossing.

218 c) Call Subroutine dcubesolv to solve the cubic for the interval containing the zero crossing 218 d) Call Function Pickroot to select the meaningful root 218 e) C4 Time has the time value of the zero crossing If no meaningful root then C4 Time=Linear Fit from 217

218 f) Call Subroutine dcube6 to compute six point cubic spline fit coefficients 218g) Call Subroutine dcubecoeff to convert cubic spline coefficients to standard algebraic polynomial form for interval between prior and present points, i.e., the interval containing the zero crossing.

218 h) Call Subroutine dcubesolv to solve the cubic for the interval containing the zero crossing 218 j) Call Function Pickroot to select the meaningful root 218 k) C6 Time has the time value of the zero crossing If no meaningful root then C6 Time=C4 Time from 218e 218 m) Increment the count of detected zero crossings 219) Write One time of detected upward zero crossing (per one phase event per one wave cycle)

(216 false)

220) Present point becomes prior point and Below is updated.

221) Continue statement—for Loop over data values for one sensor

222) Close output file

223) Continue statement—for Loop over Sensors

224) Stop statement

225) Format Statements

226) End statement

Figure 12E:
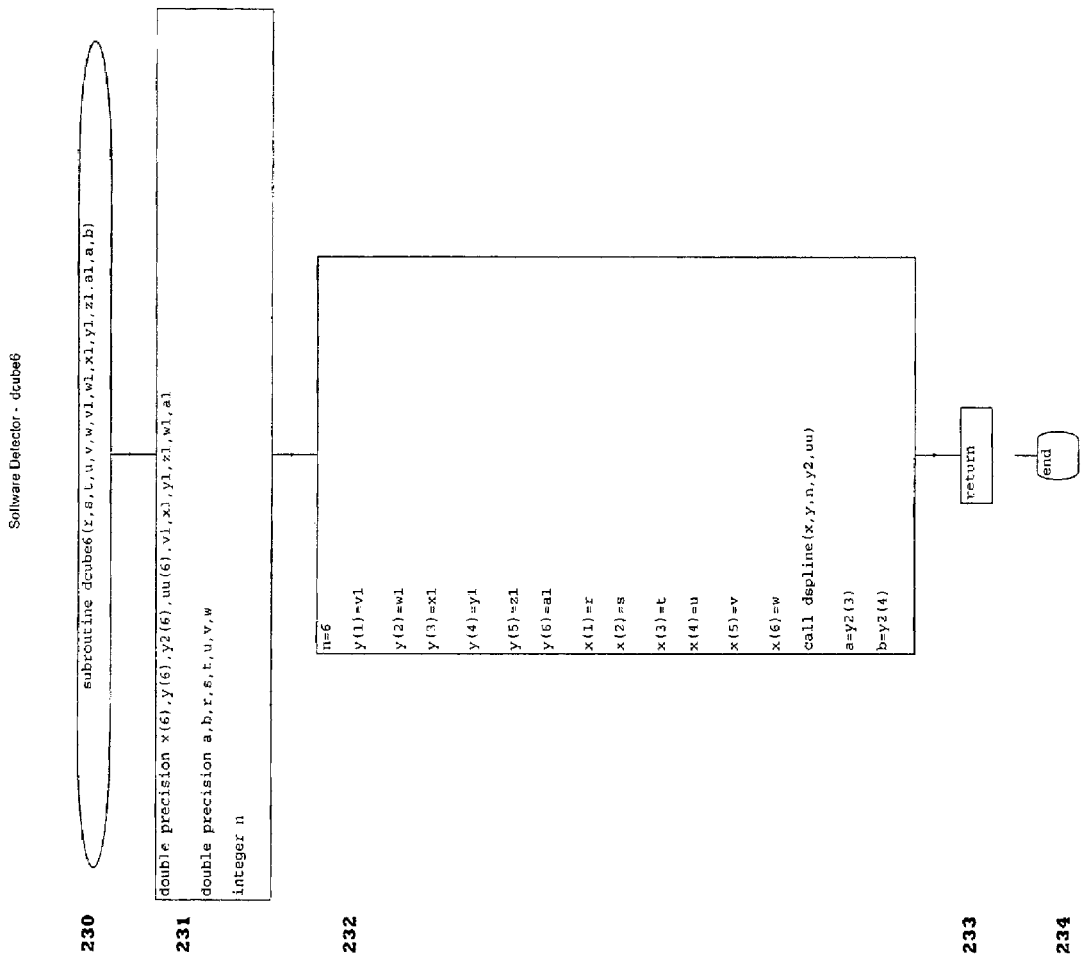
FIG. 12E Software Detector Subroutine cube6 Flow Chart.

FIG. 12E shows the flowchart for subroutine dcube6, which is described below. This routine takes the time and amplitude values for 6 data points and puts the information into the form needed by the Numerical recipes spline fit coefficient calculating routine, and then calls that. This routine then returns the values found for one of the intervals between the six original data points. The two values found for the interval containing the zero crossing are returned.

230) Subroutine dcube6 takes the times and amplitudes of six sampled points from the main program (upward)

231) Declarations

Figure 12F:
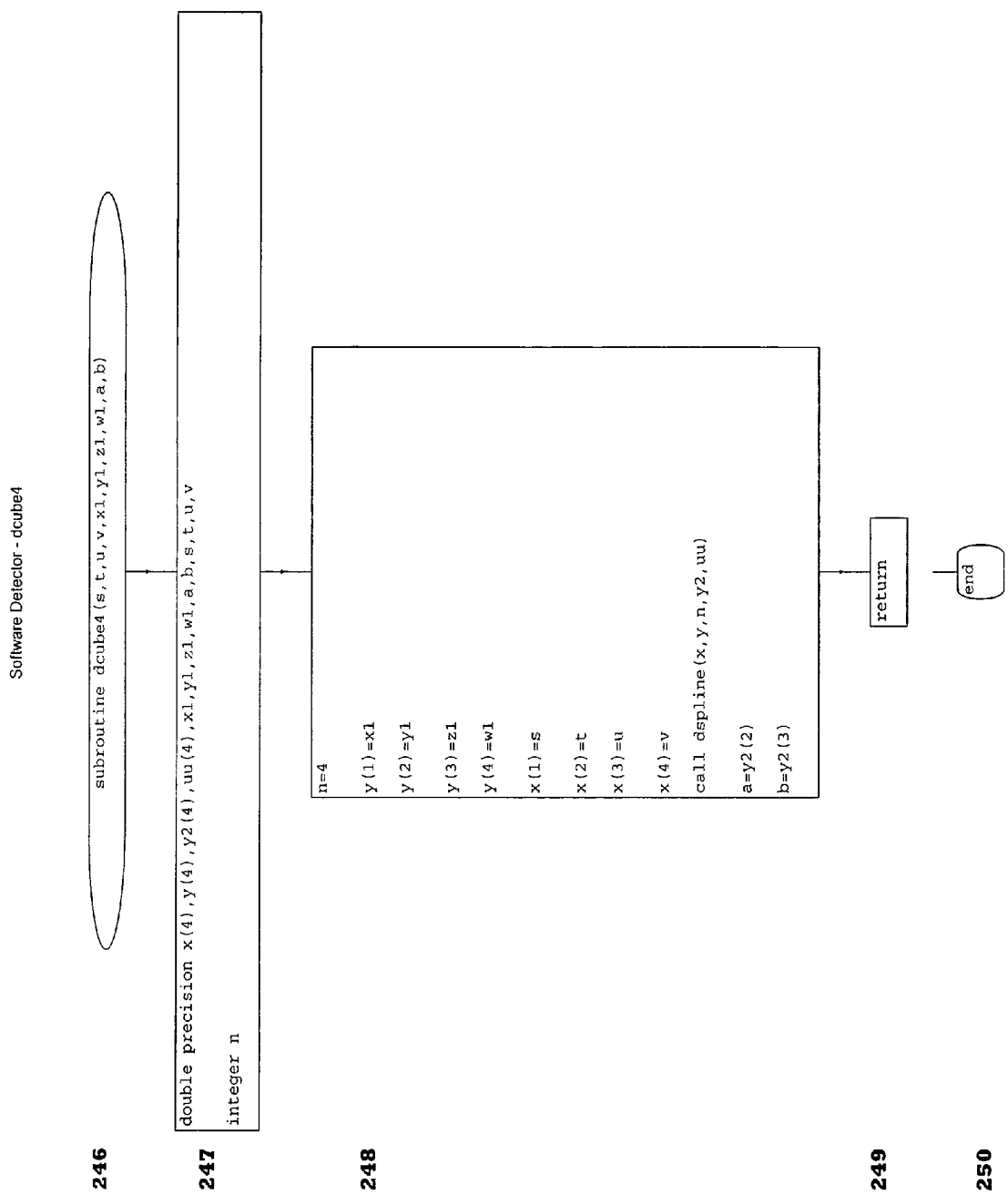
FIG. 12F Software Detector Subroutine dcube4 Flow Chart.

232) Put the points into an internal array and pass that array, the number of points, i.e., 6, an output array, y2, and a temp/work array, uu, to the dspline routine (*dspline is a double precision implementation of the cubic spline fitting routine from Numerical Recipes, First Edition). After dspline returns, put the values from the cubic spline fit for the interval containing the zero crossing into a,b to return to the caller 233) return statement 234) end statement FIG. 12F shows the flowchart for subroutine dcube4, which is described below. This routine takes the time and amplitude values for 4 data points and puts the information into the form needed by the Numerical recipes spline fit coefficient calculating routine, and then calls that. This routine then returns the values found for one of the intervals between the four original data points. The two values found for the interval containing the zero crossing are returned.

246-250 Subroutine dcube4 is the same as dcube 6 except that only four points are fed to the cubic spline fit

FIG. 12D

251) Subroutine dcubecoeffs takes the coefficient values from the cubic spline fit and converts to standard polynomial coefficient form 252) alternate entry name for this subroutine 253) declares 254) convert the cubic for the interval containing the zero crossing from the form used for cubic splines to algebraic polynomial form:

$$Ax3+Bx2+Cx1+Dx0=Ax3+Bx2+Cx+D$$

255) Return statement

256) End statement

FIG. 12B

257) Subroutine dcubesoln takes the coefficient values from the cubic in standard polynomial coefficient form and solves for the roots. Input is the four polynomial coefficients, output is the number of real roots and values for real roots. (Complex Roots are not Computed.)

258-284 Standard cubic root finder following the treatment shown in Numerical Recipes, First Edition.

FIG. 12C

290) Function PickRoot—returns the most meaningful selection from among multiple roots found by dcubesoln. Input is an alternate root value, from either linear interpolation or a prior cubic solution, and the number and values of real cubic roots.

291) Declares

292) If no real roots found, then (309) use the alternative value 309) return alternative root value as root value 310) use root value as output variable 311) return statement 312) end statement (292) false—one or more real roots exit 293) test for exactly one real root (293) true, test (306)

306) is root in the interval containing the zero crossing?

(306 true) use the root 308) use root as root value, pass to 310

(306 false) use alternate 307) use alternate as root value, pass to 310

(293) false 294) test for exactly two real roots (294 true)

295) set two logical variables—are the roots in the interval?

296) are both roots in the interval?

(296 true) check both roots 305) compute how close each root is to alternate 304) test which root is closer to alternate 303) if first root closer pick it, pass to 310

302) if second root closer pick it, pass to 310

(296 false)

297) is first root in interval?

(297 true) pick it 301) pick first root, pass to 310

(297 false)

298) is second root in interval?

(298 true) pick it 300) pick second root, pass to 310

(298 false)—neither root in interval, so use alternate 299) pick alternate, pass to 310

(294) false 320) test for exactly three real roots 321-344 check three roots as above and choose one or alternate

Direction of Arrival Algorithm

Figures 4, 13:
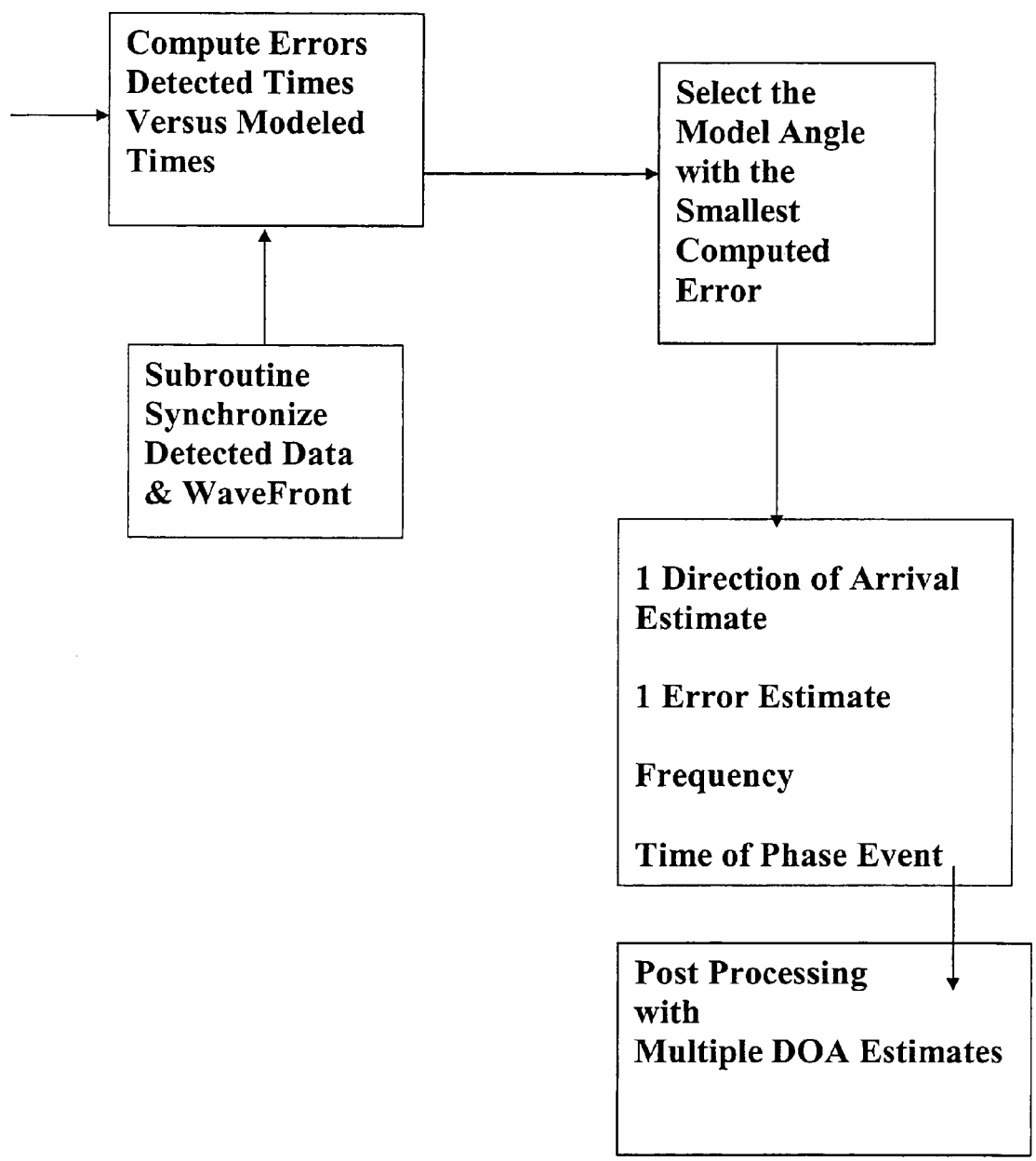
Figures 1, 13A:
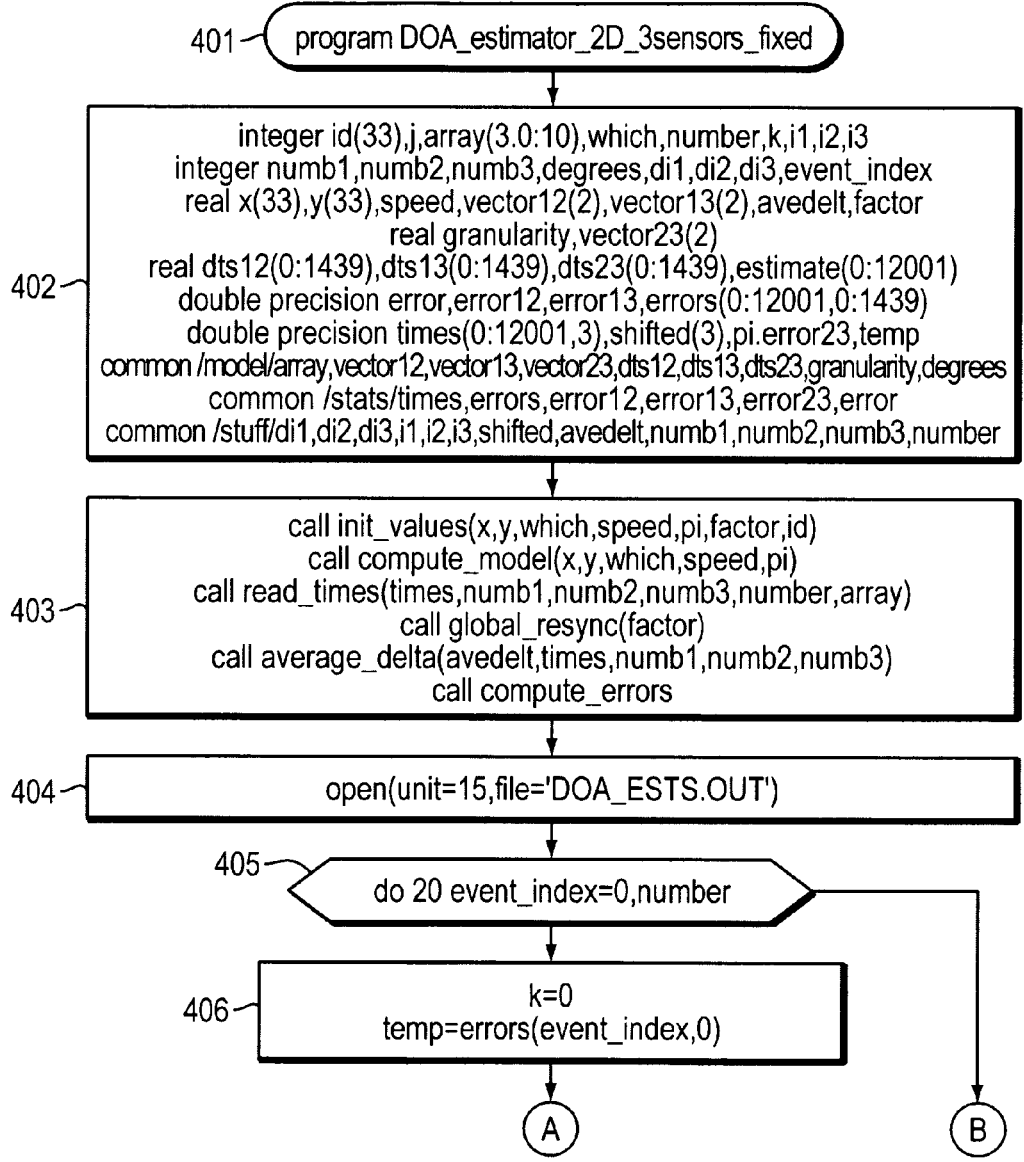
Figures 2, 13A:
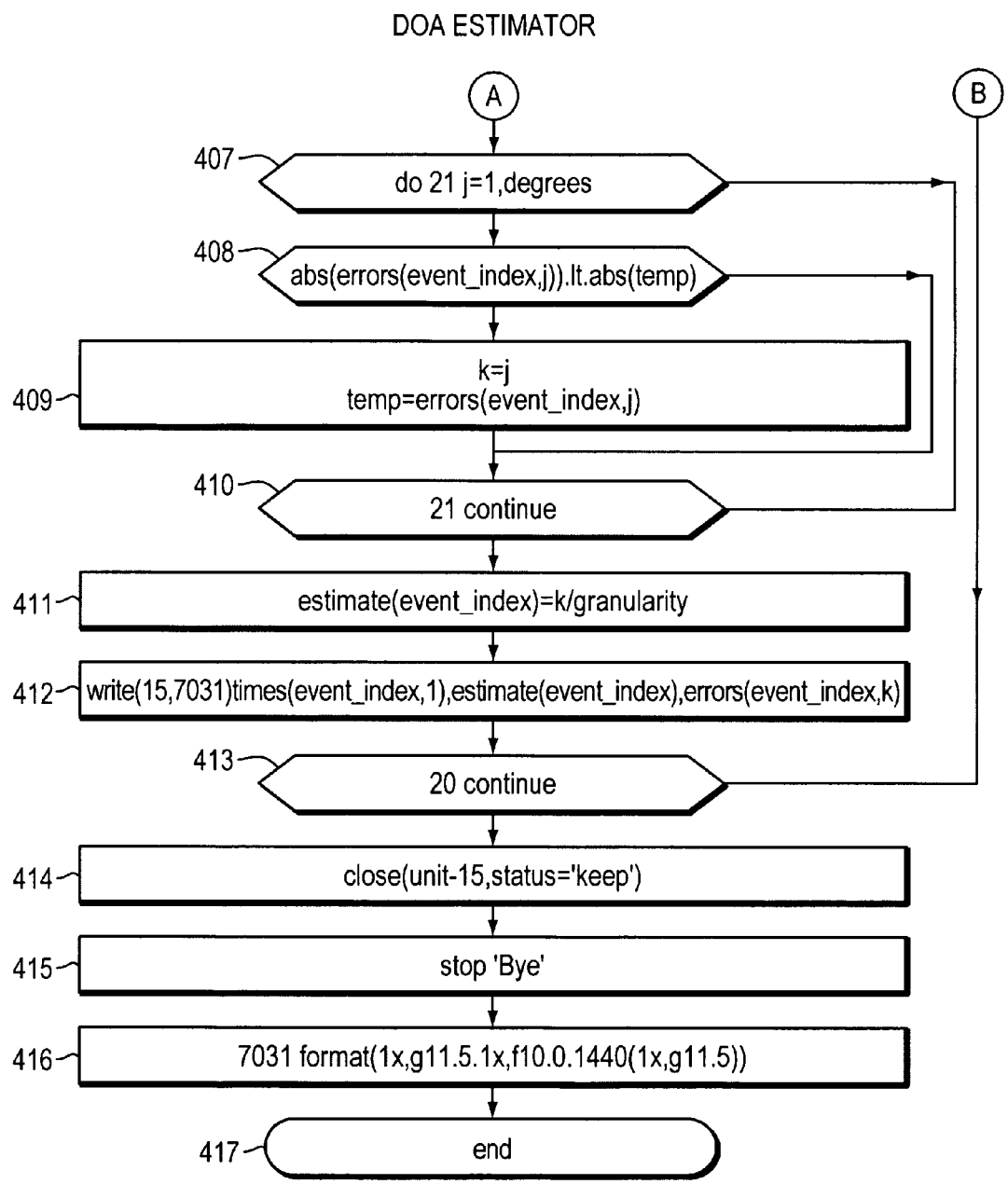
Figure 13B:
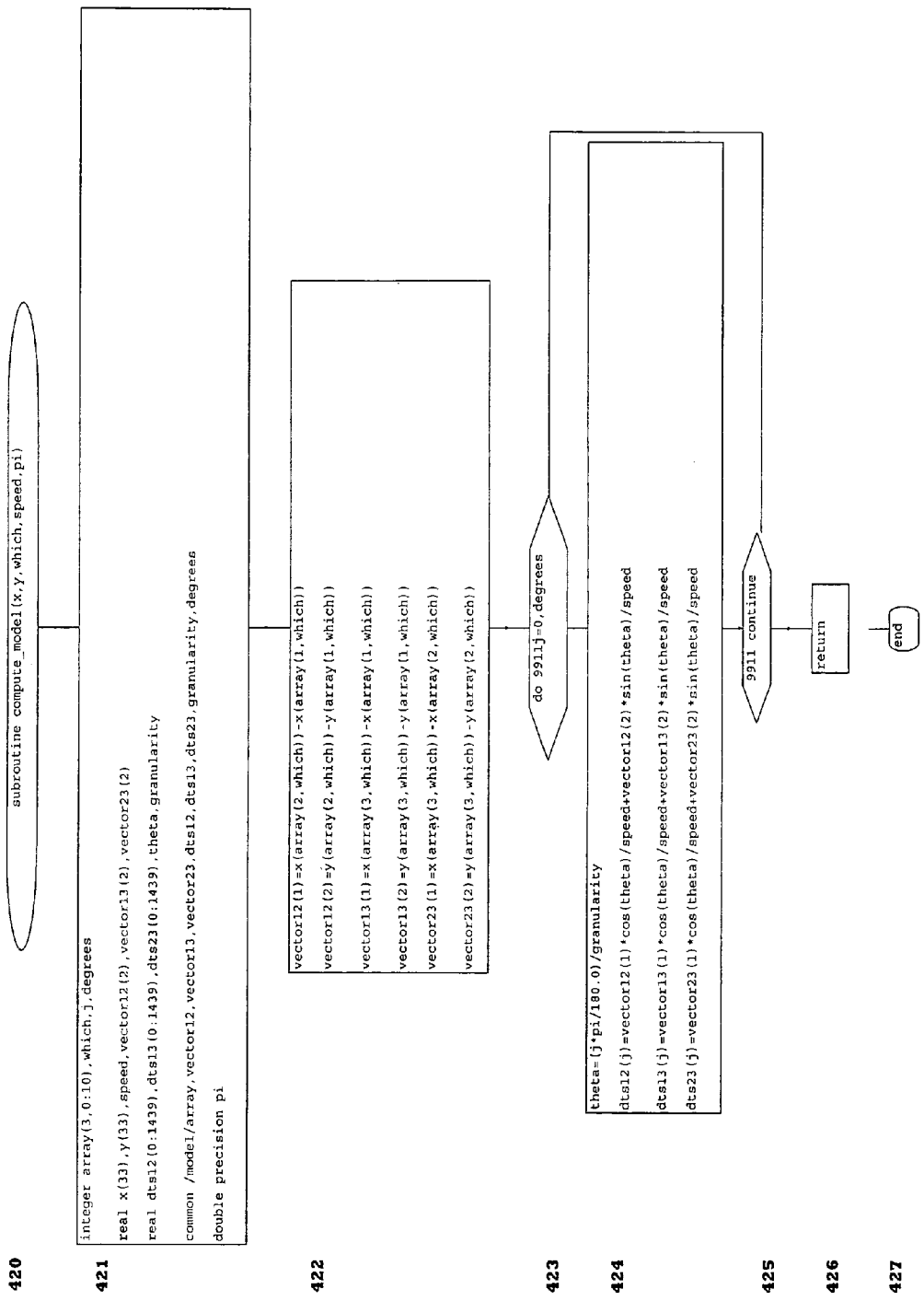
FIG. 13B DOA Subroutine Compute_Model Flow Chart.
Figures 1, 13C:
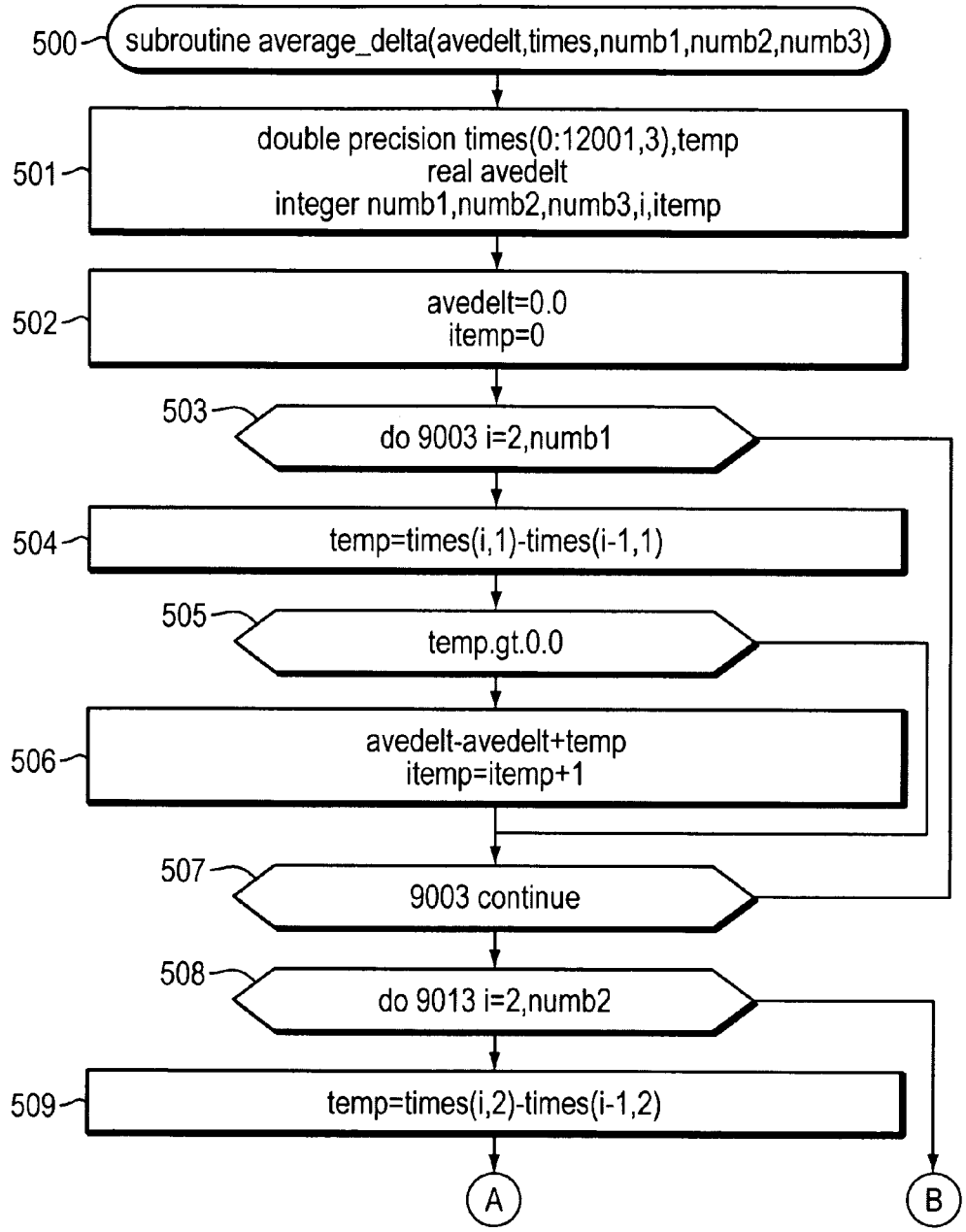
Figures 2, 13C:
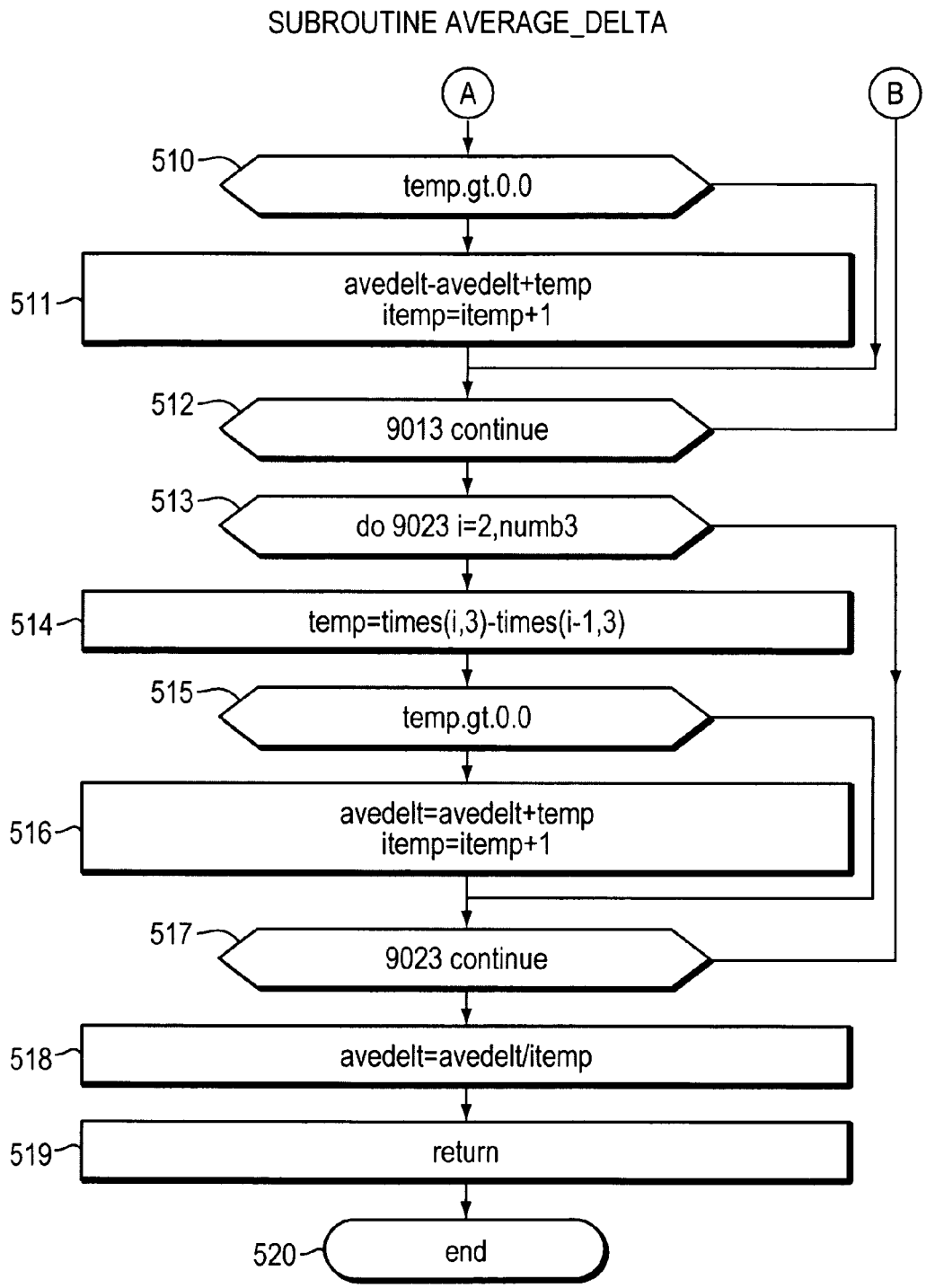
Figures 1, 13D:
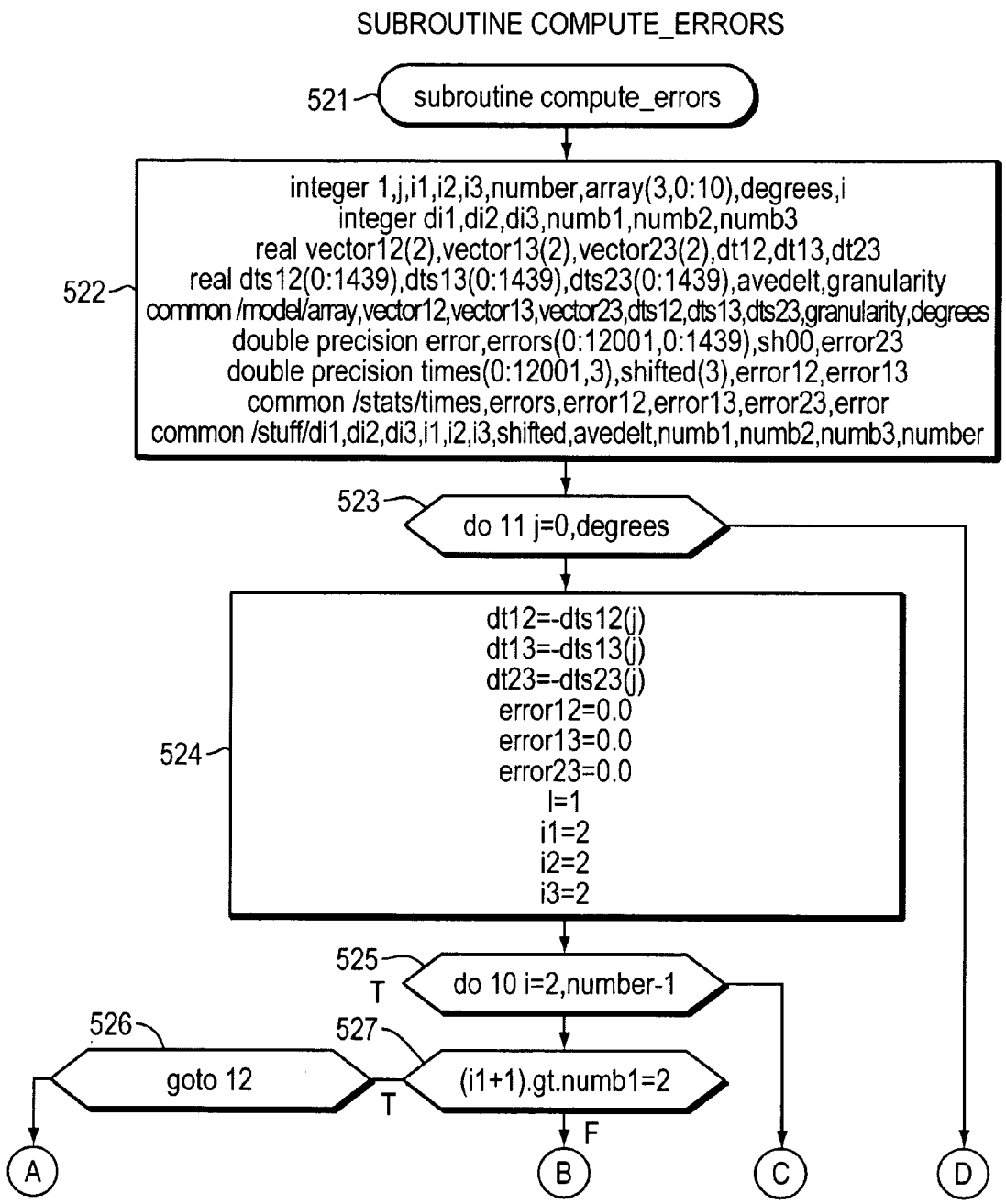
Figures 2, 13D:
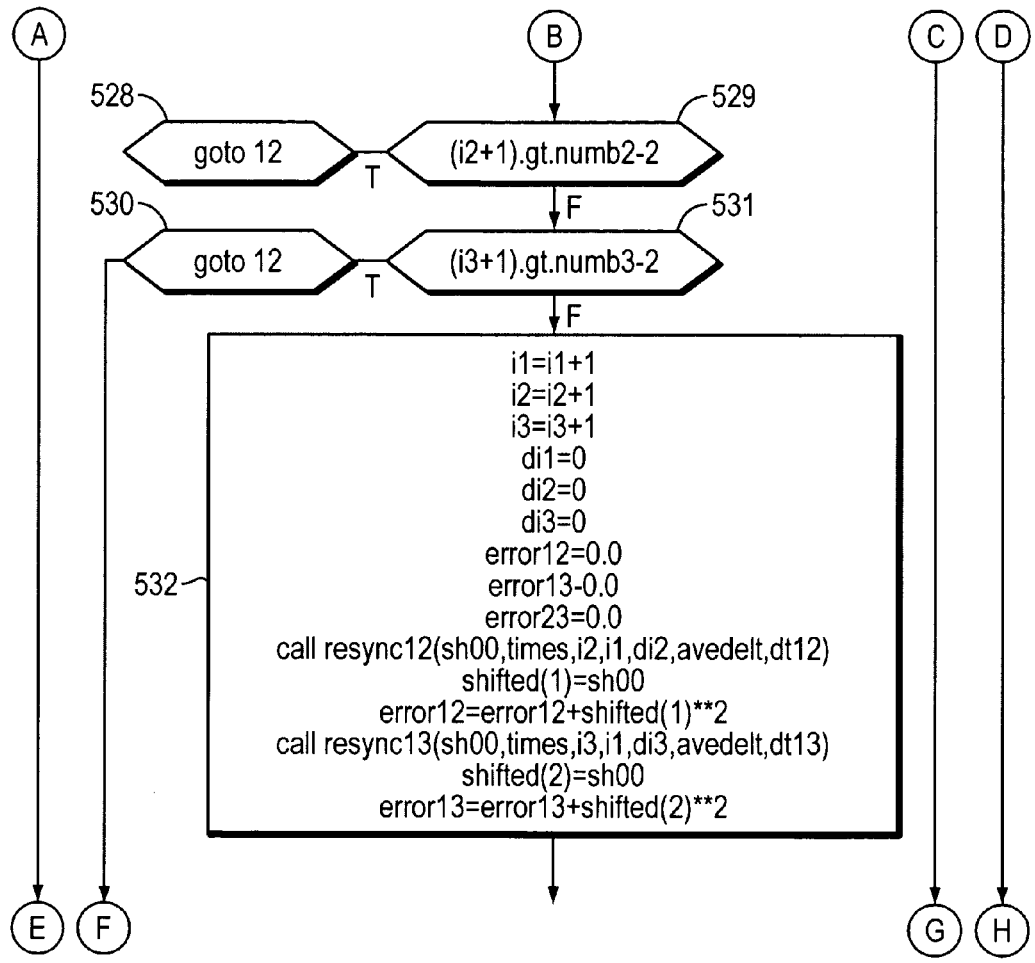
Figures 3, 13D:
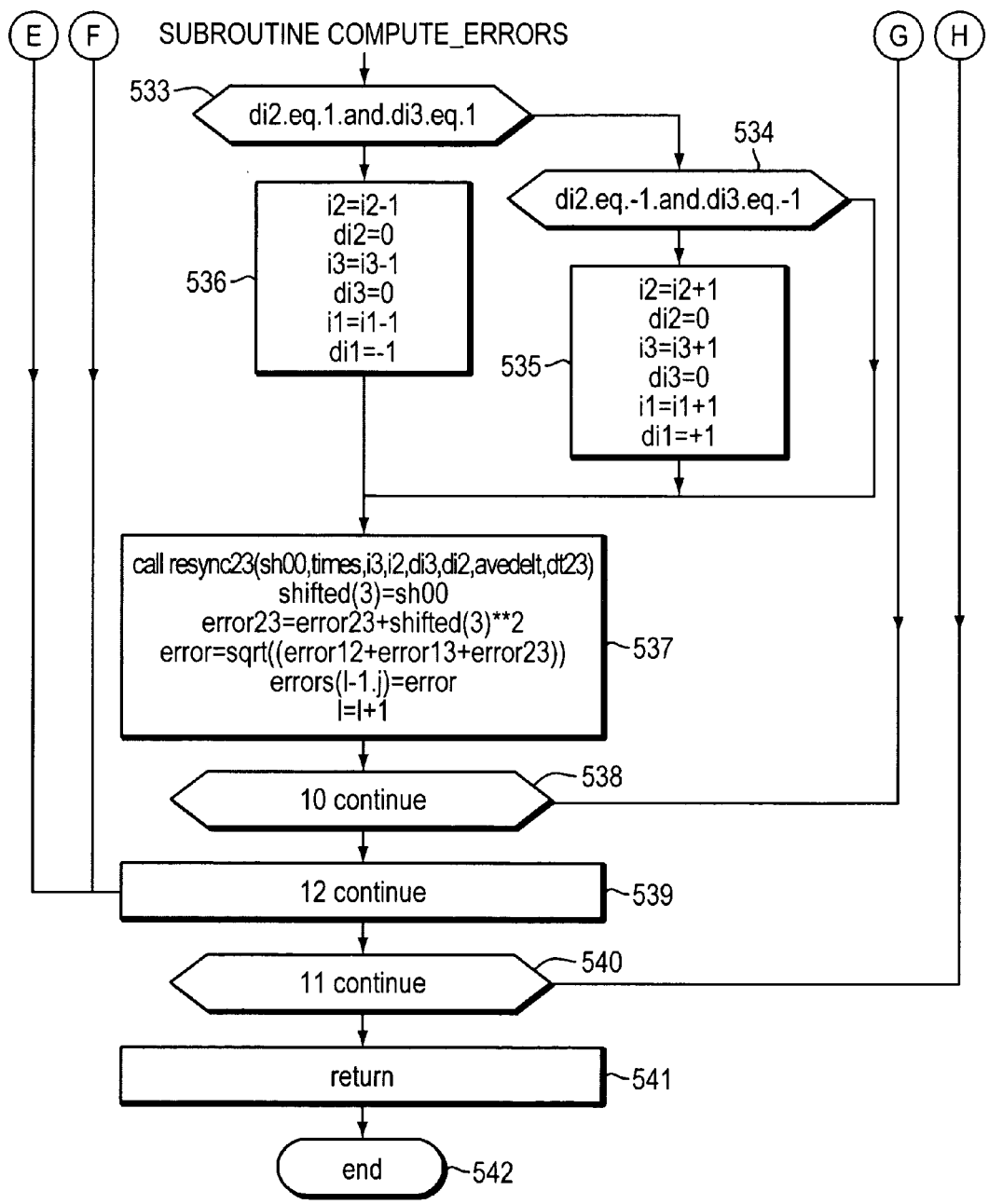
Figures 1, 14:
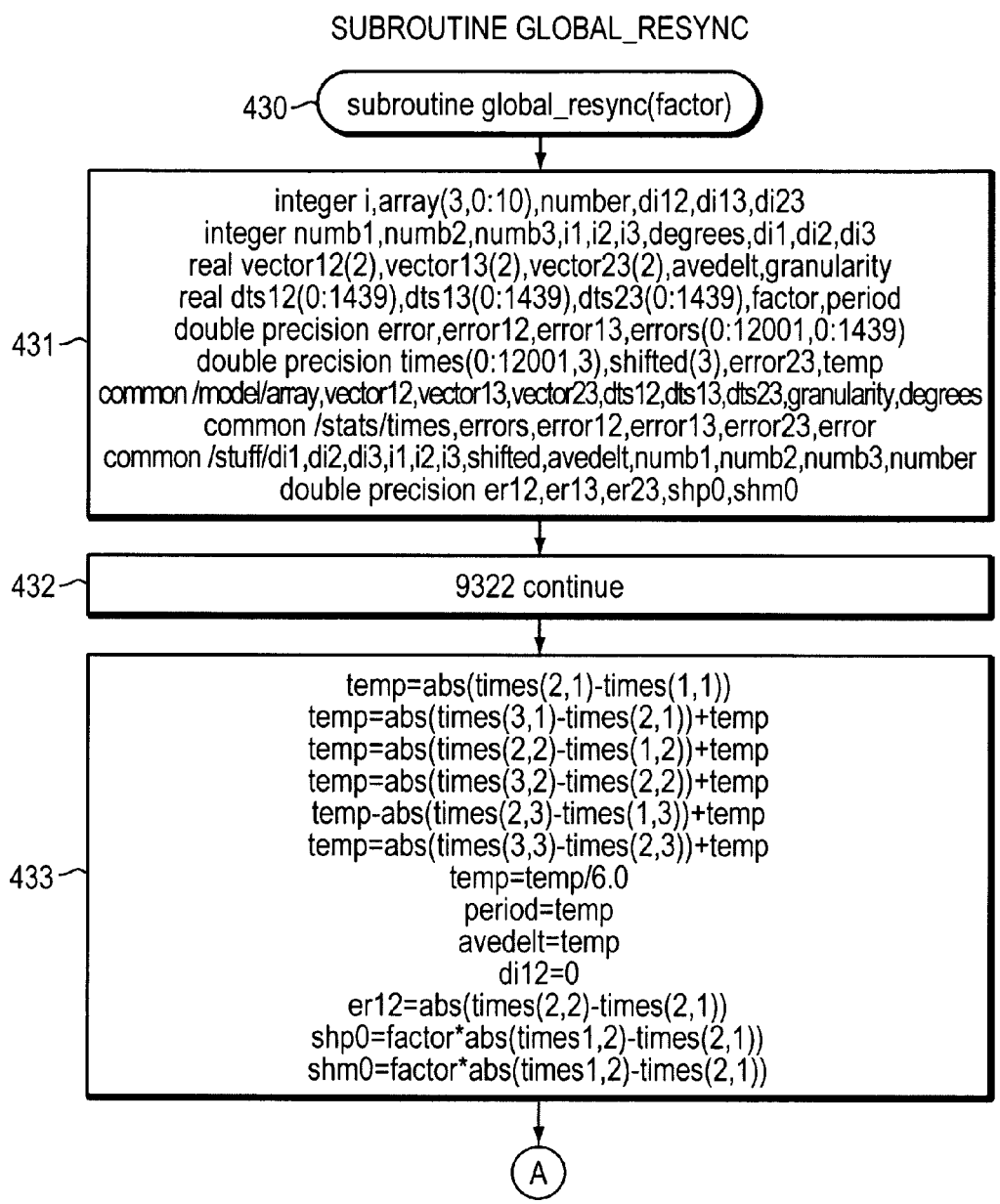
Figures 2, 14:
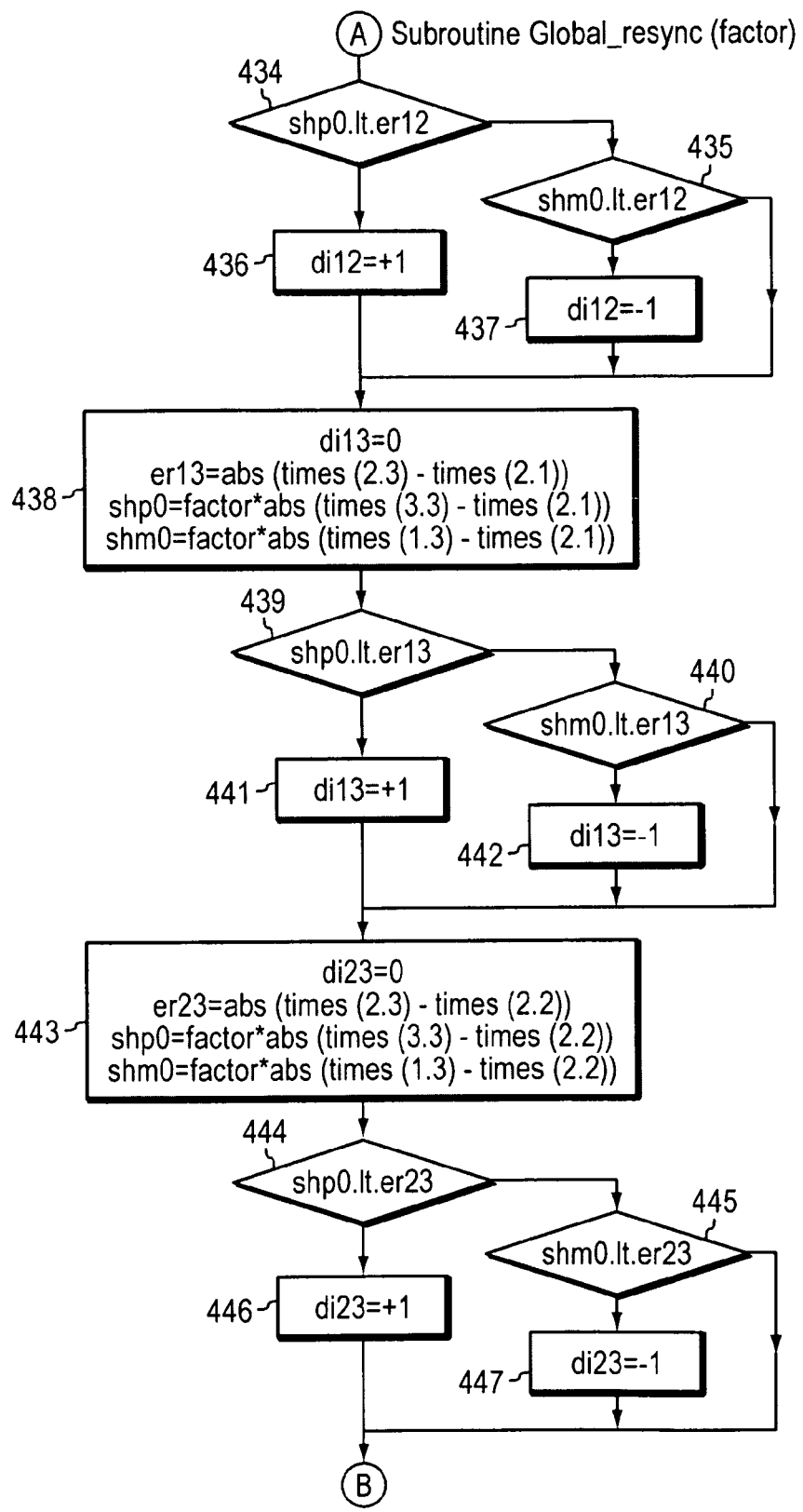
Figures 3, 14:
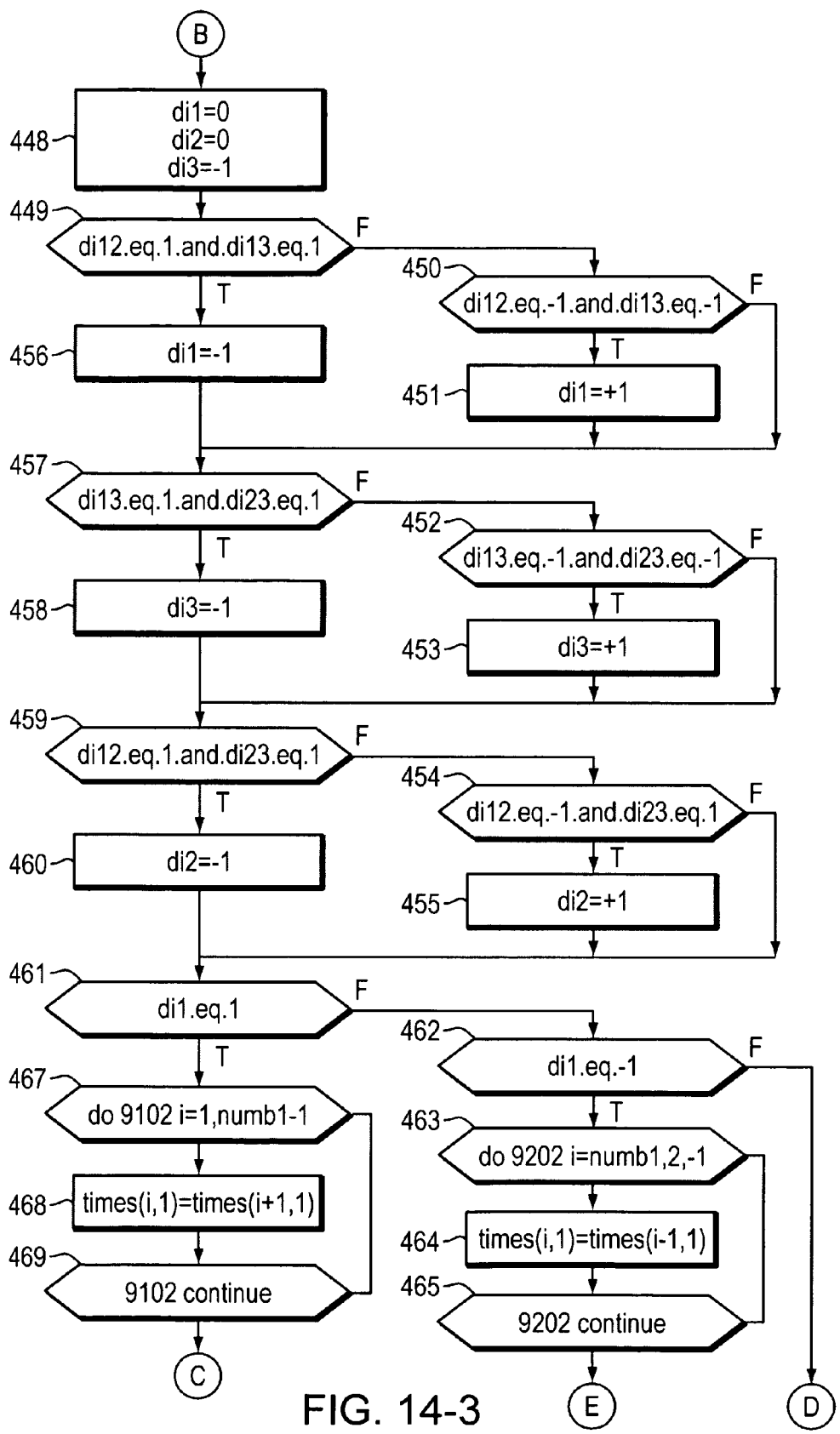
Figures 4, 14:
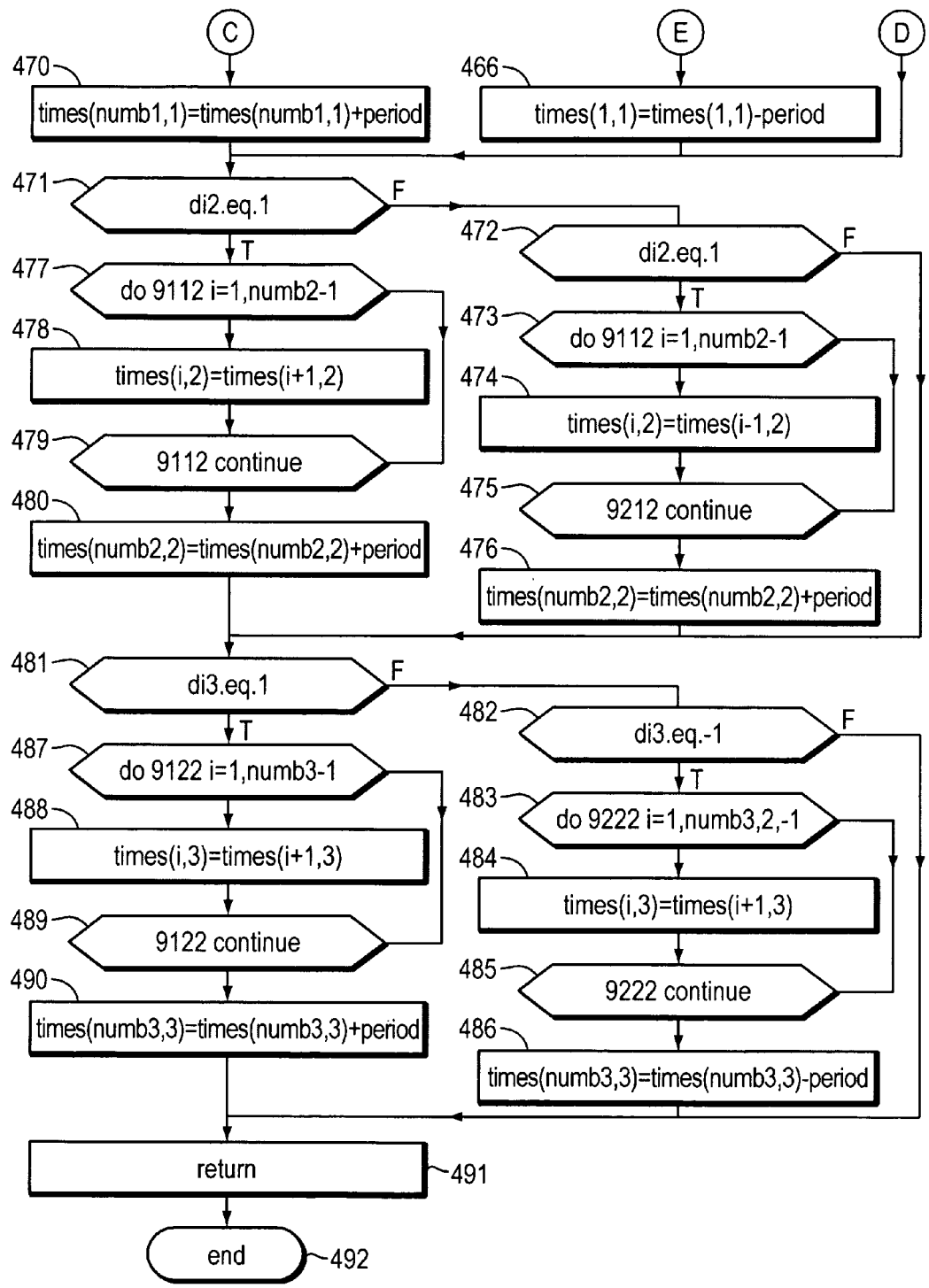
Figure 15A:
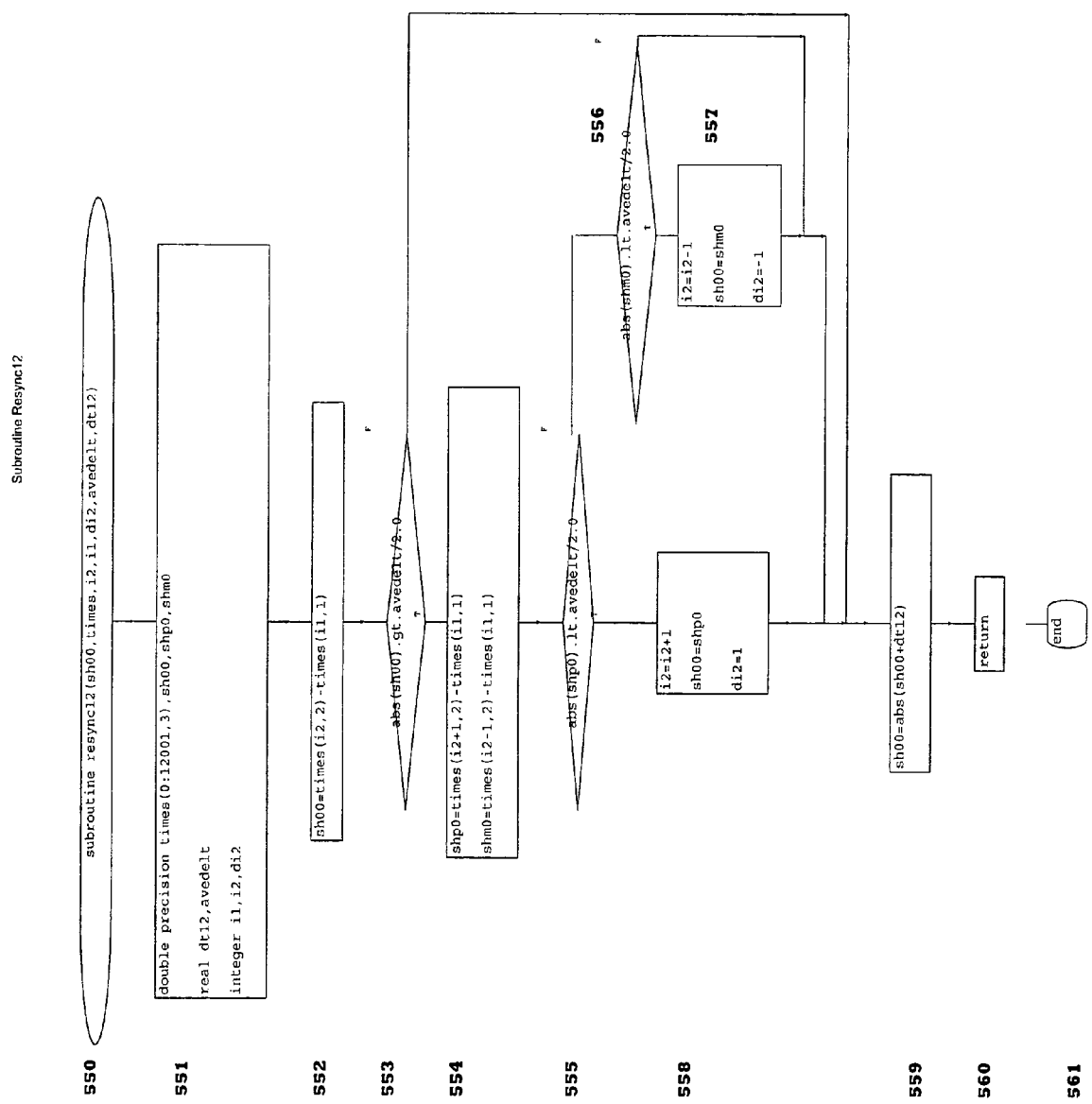
FIGS. 15A-15C illustrate a Local Synchronization Flow Chart.
Figure 15B:
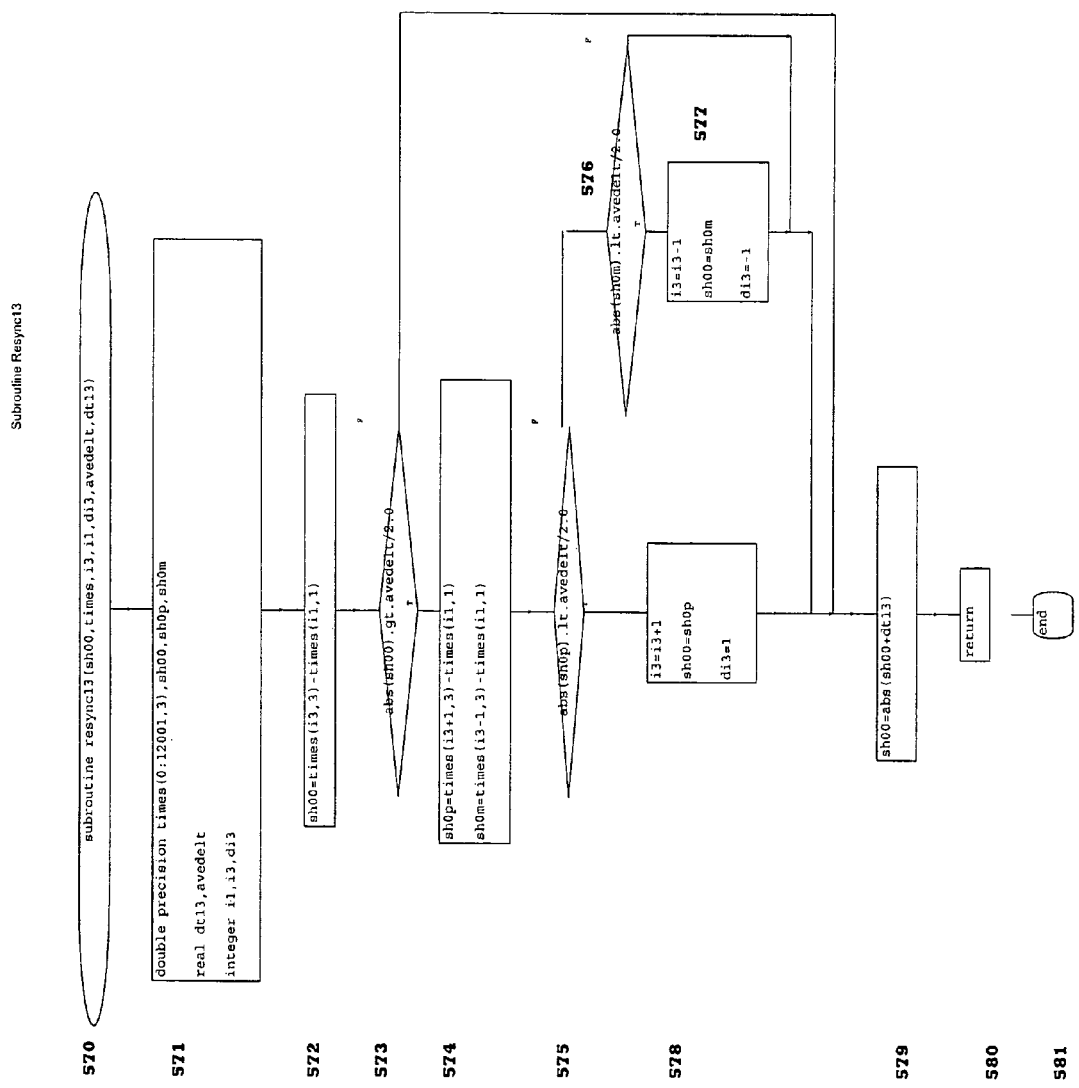
Figure 15C:
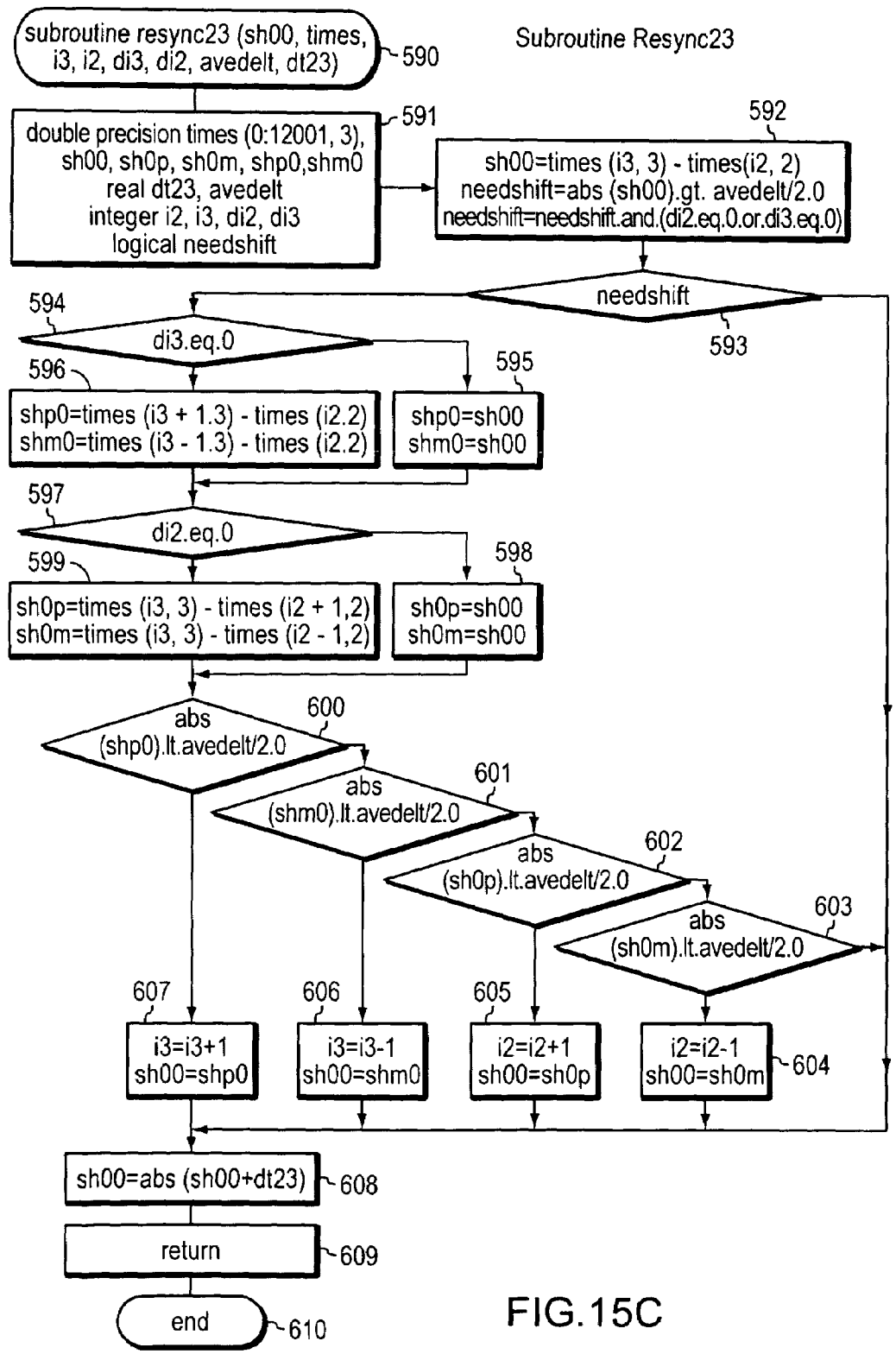

A Direction of Arrival (DOA) algorithm embodiment is described in the context of a Fortran programs flow charted in FIGS. 13A-D, 14, and 15A-C. Primary inputs are the times of phase events and the field device position at the time the event is detected and the number of angles the traveling wave model computes. Outputs are at least one direction of arrival estimate, an error estimate, the time of the phase event and frequency range per detected phase event or wave cycle. As embodied, DOA estimation begins with field device deployed geometry, as shown in FIG. 13-1 Direction of Arrival Block Diagram where field devices positions at the time of phase event detection, are duplicated in the algorithm model. Field device detection hardware can be configured with a variety of features, in particular, several phase events may be detected by one field device. One traveling wave phase event crossing a set of three stationary field devices produces one set (three) of phase event detections, which the DOA Algorithm then turns into one direction of arrival estimate. If two kinds of phase events, e.g., upward and downward zero crossings or one type of phase event detected at two frequencies, are detected at the field devices for each cycle of the wave, then two or more DOA estimates may be produced. The embodiment presented is for a two dimensional plane with three stationary field devices, and one type of phase event. FIG. 13-2 Direction of Arrival Block Diagram depicts an example embodiment of separately manipulating detected and modeled phase event times and computation of pairwise time differences. FIG. 13-3, which continues the Direction of Arrival Block Diagram and depicts the two data sets which are used to compute error residuals between detected and modeled time differences. Pairwise error residuals are combined using Root Mean Squared (RMS). The DOA estimated angle is derived from the smallest RMS error. FIG. 13-4 is a traditional summary block diagram of the Direction of Arrival Algorithm and its relationship to example output and post processing. The DOA Algorithm can be extended for three space, more field devices and more types of phase events using the same pairwise approach. The DOA Algorithm also can be applied to a system having only two field devices.

The main program "DOA_Estimator_2D_3 sensors_fixed" calls various subroutines. First called is init_values, which initializes variables and reads in the positions of the field devices. Next called is Compute Model (FIG. 13B) to compute the times a modeled wave travels between pairs of field positions, that are geometrically same as the deployed field devices; then subroutine Read_Times reads in detected event times from storage or the field. Subroutine Global_Resync (FIGS. 14-1,2,3,4) does an initial synchronization for all columns of detected data. Subroutine Call Average Delta (FIG. 13C-1,2) determines wave period (frequency) from the detected data. Subroutine Compute_Errors (FIG. 13D-1, 2, 3) computes the differences between modeled phase event times and the detected phase event times for two or more positions, and then finds the least difference value. The least difference value is associated with one model angle. That model angle is the "best fit" Direction of Arrival estimate output by the Algorithm. Within Compute_errors are calls to subroutines for local resynchronization (FIGS. 15A, 15B and 15C) to adjust detected data columns on an event by event basis.

In this embodiment three field devices detect the same phase event, an upward zero crossing. If the devices are deployed according to the guidelines, physics predicts they will all detect the same wave front, even if it is a composite wave. Three field devices yield three sets of digital data which are entered into a three column array. One row will have only three times, one phase event time from each detector. "Resync" subroutines: resync12 and resync13, which are identical in form, and resync23, which is slightly more complicated adjust the columns to synchronize data, on a row by row basis, to ensure, each row has three detected times from the same wave front.

For field devices which meet the deployment guidelines, in particular the half wavelength constraint between nearest neighbors, the pairwise detected times of one wave cycle can differ no more than half a period between nearest neighbors. This understanding of physics is used to test data from one field device for synchronization with data from another field device and to resynchronize the two data sets as needed. Resync12 adjusts column one and two. Resync13 adjusts column one and three and resync23 adjusts column two and three and adjusts for all three columns.

The use of statistical "best fit", e.g., least-squares, approaches to estimate parameters from measured data is employed both for the power of the approach and the quality of the estimates. Along with each DOA estimate output, an error value is computed which is indicative of the quality of the estimate.

Typically, similar detection data from a single group of field devices yields similar degrees of fit with models and thus similar error values. When error values change abruptly or transiently, this is often an indication of improving or worsening quality of results. Even without external validation of estimates, it is often possible to flag estimates which are poor based on relative increased error values, when compared to either recent values or historical trends. Error estimates can be used to eliminate "questionable" DOA estimates, providing improved quality of the results. Having copious results enables post processing that eliminates some even many questionable estimates without reducing direction finding capability.

401) Program "DOA_Estimator_2D_3 sensors_Fixed"
402) Declare Variables
403) Call Subroutines
403a) Call init_values
403b) Call Compute_Model
403c) Call Read_Times (detected data)
403d) Call Global_Resynch
403e) Call Average_Delta
403f) Call Compute_Errors
404) Open Output File
405) Do Loop Index of Detected Events
406) Initialize compare Variables
407) Do Loop to find the smallest error computed by 493e and output the model wave angle of arrival as the "Best Fit" Estimate of the actual Direction of arrival
408) Compare Error of the Current angle with the best guess (least error), so far
(408 True)
409) Replace best guess so far with current modeled angle and error value.
(408 False)-410
410) Continue loop
411) convert index into degrees
412) Write time this one phase event, this DOA estimate Modeled error (estimate of goodness)
413) Next detected phase event
414) Close output file
415) Stop statement
416) Formats
417) End statement Subroutine Init_values
420) Subroutine Compute_Model
421) Declares
422) compute vectors between pairs of field devices
423) Do Loop over angle
424a) compute angle from index based on granularity of model
424b) dts12 for this angle computed from plane wave propagation model
424b) dts13 for this angle computed from plane wave propagation model
424c) dts23 for this angle computed from plane wave propagation model
425) Loop Continue
426) Return statement
427) End statement
Subroutine Average Delta
500) Subroutine Average_delta
501) Declares
502) initialization
503) Do Loop over field device #1 events
504) compute time difference, present event minus prior
505) test if real difference
(505 true)
506a) accumulate computed time difference
506b) increment counter
(505 false)
507) continue
508) Do Loop over field device #2 events
509) compute time difference, present event minus prior
510) test if real difference
(510 true)
511a) accumulate computed time difference
511b) increment counter
(510 false)
512) continue
513) Do Loop over field device #3 events
514) compute time difference, present event minus prior
515) test if real difference
(515 true)
516a) accumulate computed time difference
516b) increment counter
(510 false)
517) continue
518) avedelt=accumulated avedelt/itemp (counter)
519) return
520) end
521) Subroutine Compute_Errors (FIGS. 13D-1, 2, 3)
522) Declarations
523) Do Loop over model angle
524) initialize for looping over detected phase events
525) Do Loop over detected phase events
527) Test if first field device events are at end
(527 True)
526) goto 12—exit loop over detected phase events
(527 False)
529) Test if second field device events are at end
(529 True)
528) goto 12—exit loop over detected phase events
(529 False)
531) Test if second field device events are at end
(531 True)
530) goto 12—exit loop over detected phase events
(531 False)
532a-i) prepare to check synchronization 1,2 and 1,3
532j) Call resync12
532k) get synced error for 1,2 versus model
532l) square and put into error12
532m) Call resync13
532n) get synced error for 1,3 versus model
532o) square and put into error13
533) Test for doubled syncs in +1 direction
(533 False—534)
534) Test for doubled syncs in −1 direction
(534 True—535)
535) back out doubled −1 syncs and adjust field device 1 index instead
(533 True—536)
536) back out doubled +1 syncs and adjust field device 1 index instead
(534 False—537)
537a) Call Resync23
537b) get synced error for 2,3 versus model
537c) square and put into error23
537d) error value(event, angle) gets sum of squares of pairwise errors
537e) increment event counter
538) Loop continue—event loop
539) Exit from event loop target—Continue statement
540) Loop continue—angle loop
541) Return statement
542) End statement
430) Subroutine Global_Resync (FIG. 14-1,2,3,4)
431) Declarations
432) continue
433a-j) compute first estimate for avedelt
433k-n) prepare for 1,2 sync test
434) 1,2 resync needed in +1 direction test
(434 false)
435) 1,2 resync needed in −1 direction test
(434 true)
436) di12=+1
(435 true)
437) di12=−1
(435 false)
438) prepare for 1,3 sync test
439) 1,2 resync needed in +1 direction test
(439 false)
440) 1,2 resync needed in −1 direction test
(439 true)
436) di13=+1
(440 true)
437) di13=−1
(440 false)
443) prepare for 1,3 sync test
444) 1,2 resync needed in +1 direction test
(444 false)
445) 1,2 resync needed in −1 direction test
(444 true)
446) di13=+1
(445 true)
447) di13=−1
(445 false)
448) prepare to resolve pairwise sync test results
449) are both di12, di13=+1?
(449 true)
456) di1=−1
(449 false)
450) are both di12, di13=−1?
(450 true)
451) di1=+1
(450 false)
457) are both di13, di23=+1?

(457 true)
458) di3=−1
(457 false)
452) are both di13, di23=−1?
(452 true)
453) di3=+1
(452 false)
459) are di12, di23=+1,−1?
(459 true)
460) di2=−1
(459 false)
454) are di12, di23=−1,+1?
(454 true)
455) di2=+1
(454 false)
461) di1=+1?
(461 true)
467) do loop over field device #1 data
468) move data up one index position
469) loop continue
470) adjust vacated last position
(461 false)
462) di1=−1?
(462 true)
463) do loop over field device #1 data
464) move data down one index position
465) loop continue
466) adjust vacated first position
(462 false)
471) di2=+1?
(471 true)
477) do loop over field device #2 data
478) move data up one index position
479) loop continue
480) adjust vacated last position
(471 false)
472) di2=−1?
(472 true)
473) do loop over field device #2 data
474) move data down one index position
475) loop continue
476) adjust vacated first position
(472 false)
481) di3=+1?
(481 true)
487) do loop over field device #3 data
488) move data up one index position
489) loop continue
490) adjust vacated last position
(481 false)
482) di3=−1?
(482 true)
483) do loop over field device #3 data
484) move data down one index position
485) loop continue
486) adjust vacated first position
(482 false)
491) return statement
492) end statement
550) Subroutine Resync12 (FIG. 15A)
551) Declarations
552) compute time difference for event being considered between field device #1's detected time and field device #2's detected time
553) test if this fails the half period constraint
(553 true)

554) calculate two alternatives, shp0 and shm0, which are one index higher and lower for the field device #2 data set
555) does shp0 meet the half period constraint?
(555 false)
556) does shm0 meet the half period constraint?
(556 true)
557) decrement index for field device #2, adjust sh00
(555 true)
558) increment index for field device #2, adjust sh00
(556 false)
(553 false)
559) combine resynced time difference with modeled time difference
560) return statement
561) end statement
570) Subroutine Resync13 (FIG. 15B)
571) Declarations
572) compute time difference for event being considered between field device #1's detected time and field device #3's detected time
573) test if this fails the half period constraint
(573 true)
574) calculate two alternatives, sh0p and sh0m, which are one index higher and lower for the field device #3 data set
575) does sh0p meet the half period constraint?
(575 false)
576) does sh0m meet the half period constraint?
(576 true)
577) decrement index for field device #3, adjust sh00
(575 true)
578) increment index for field device #3, adjust sh00
(576 false)
(573 false)
579) combine resynced time difference with modeled time difference
580) return statement
581) end statement
590) Subroutine Resync23 (FIG. 15C)
591) Declarations
592) compute time difference for event being considered between field device #2's detected time and field device #3's detected time, set logical variable needshift if this value fails the half period test, update needshift to be false if neither index 2 or index 3 unadjusted (to avoid double adjusting)
593) test the logical variable needshift
(593 true)
594) is index 3 available for adjustment
(594 true)
596) compute adjusted time differences, shp0 and shm0, continue at 597
(594 false)
595) set "adjusted" time difference shp0 and shm0 equal to unadjusted time difference
597) is index 2 available for adjustment
(597 true)
599) compute adjusted time differences, sh0p and sh0m, continue at 600
(597 false)
598) set "adjusted" time difference sh0p and sh0m equal to unadjusted time difference
600) test shp0, does it meet half period condition?
(600 true)
607) sh00=shp0, increment index for field device #3, continue at 608
(600 false)
601) test shm0, does it meet half period condition?
(601 true)

606) sh00=shm0, decrement index for field device #3, continue at 608
(601 false)
602) test sh0p, does it meet half period condition?
(602 true)
605) sh00=sh0p, increment index for field device #2, continue at 608
(602 false)
603) test sh0m, does it meet half period condition?
(603 true)
604) sh00=sh0m, increment index for field device #2, continue at 608
(602 false)
(593 false)
608) combine resynced time difference with modeled time difference
609) return statement
610) end statement Post Processing The direction of arrival finding method has two key features that enable significant improvement of DOA estimates during post-processing. Each DOA estimate is accompanied by a modeling-error value which provides a measure of the "goodness" of that DOA estimate. Each kind of phase wave front of the traveling wave provides one set (from three separate field devices) of phase event times per cycle, each set of which yields one DOA estimate. Output which represents a physical and meaningful instant is both copious and disaggregated, and is suited to data cleaning methods, for example, robust and non-parametric statistics.

Figure 16:
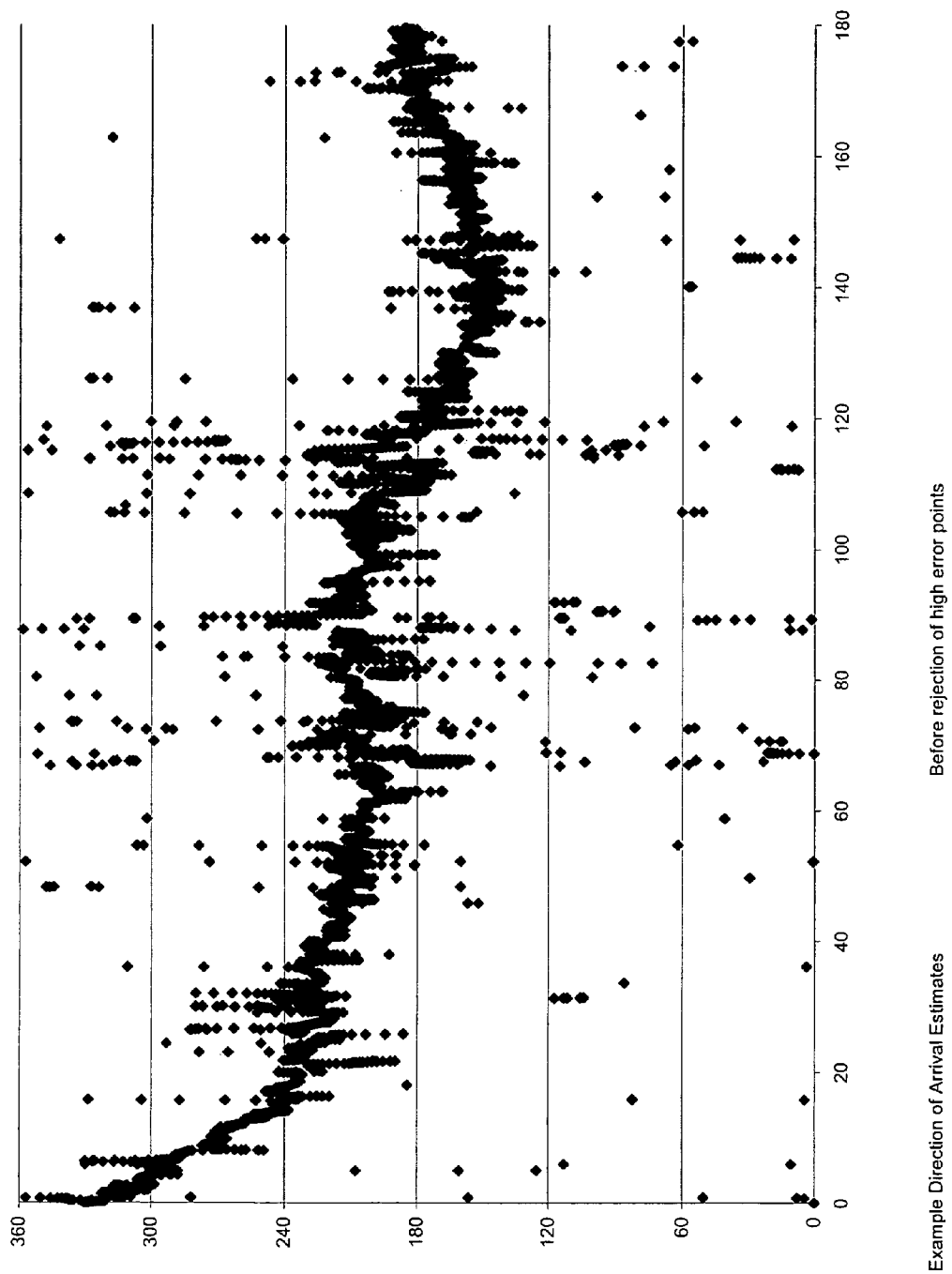
FIG. 16 illustrates DOA Estimates: Passive Tracking of a Heavy Moving Vehicle.
Figure 17:
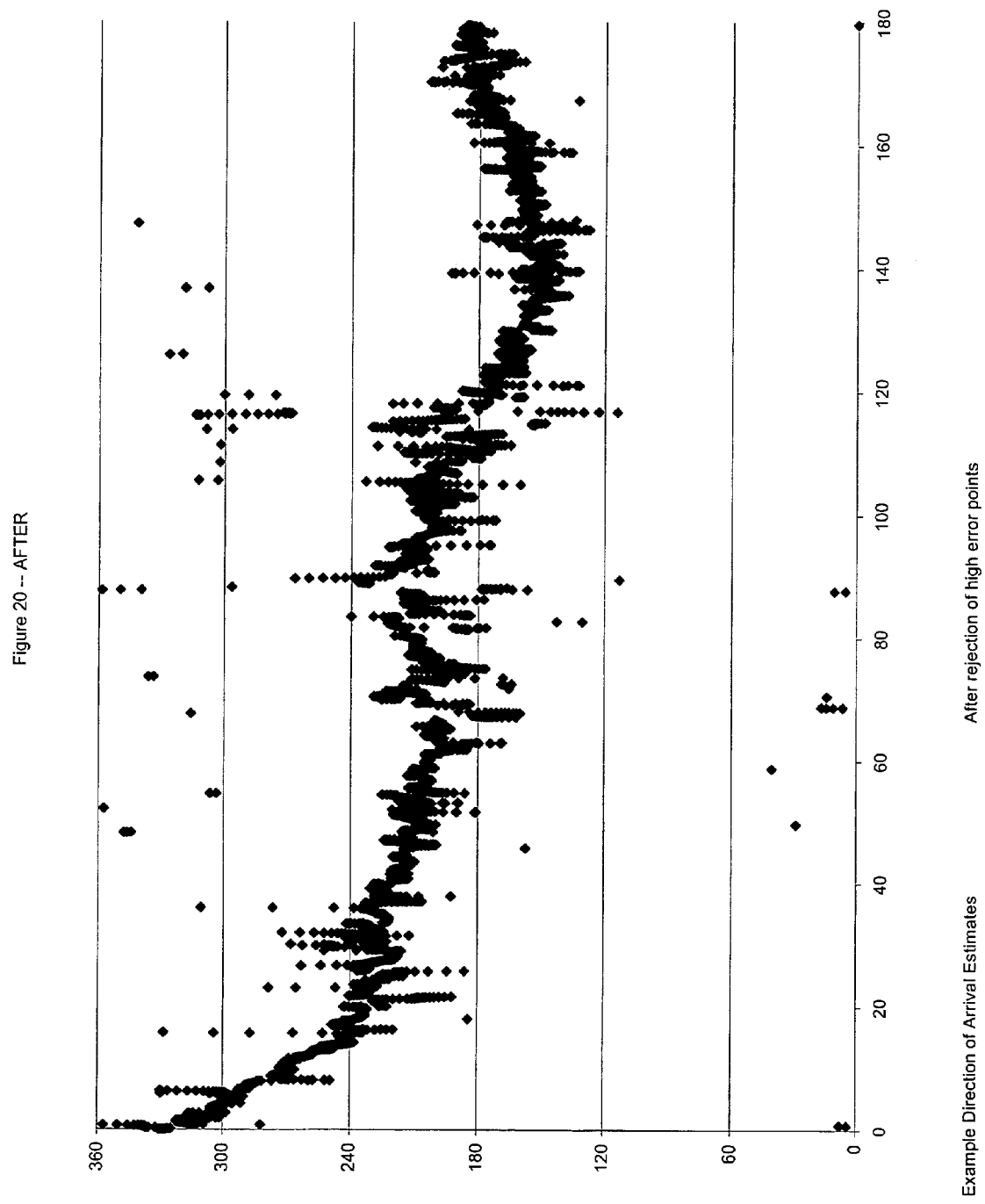
FIG. 17 illustrates DOA Estimates with Post Processing: Passive Tracking of a Heavy Moving Vehicle.

When error values change abruptly or transiently, the change may be used as an indication of variable results. Evaluating DOA estimates based on relative changes in error values and eliminating poor estimates improves the overall quality. This process of data cleansing is well suited to improving results from weak or noisy signals. The process eliminates DOA estimates with error values above a certain level. The two figures illustrate wild point elimination by data cleansing error based rejection. FIG. 16 is a plot of DOA Estimates by Passive Tracking of a Heavy Moving Vehicle. Notice increased wild points near the middle of the plot where the target moved behind a hill. FIG. 17 is a plot of DOA Estimates with Post Processing to eliminate points with error values larger than 0.003162 (i.e., 10.0-2.5). Wild points still remain, but their number is lower and the trend (target tracking) is more clearly visible. The cutoff value was chosen by considering the histogram of error values.

Range

In order to fully locate a target both direction and range are needed. The deployment of multiple sensor groups may be exploited for geometric range finding by triangulation. With two sets of field device groups at differing locations, the ASA construction can be used to determine the location of a target. The two sensor groups form two corners of a triangle, their separation defines the known side of that triangle. With a DOA estimate at each of those two sensor groups the two angles needed are defined. Reduction in uncertainty may be achieved by using more than two groups. Each additional group adds another vector pointing to the target.

Distinguishing Multiple Sources

When DOA estimates do not cluster in one single cluster, have higher model error values than expected for the signal level or have a high fraction of wild points, these conditions could indicate that one or more of the detecting field devices may be receiving signals from multiple sources. Waves arriving at one Field Device/sensor from multiple sources are detected as one composite signal. This phenomena and resulting incorrect DOA estimates cannot be avoided. For example field devices embodied in FIG. 6 Moving Field Device System Block Diagram Multi-Channel Multi-Frequency Single Transducer or FIG. 7 Moving Field Device System Block Diagram Multi-Channel Multi-Frequency Multi-Transducer enable frequency diversity for distinguishing among multiple sources.

Two Source Model Versus a One Source Model

In the DOA Algorithm, a two source model or multi-source model can be substituted for the one source model. A two source model uses two parameters for each model angle, one for each source. A multi-source model with as few as five or seven sources, in some cases may fail due to excessive computational demands, and/or because too many sets of parameters yield identical or nearly identical "best" fits.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
   at least two detector devices, each detector device for independently detecting a time of a zero crossing of a wave signal to provide zero crossing time information; and
   a processor configured to receive the zero crossing time information from each detector device and to estimate a direction of arrival of the wave signal based on the zero crossing time information and detector device position information.

2. The system of claim 1 wherein the detector devices are arranged in an irregular geometry.

3. The system of claim 1 wherein the detector devices are arranged in a regular geometry.

4. The system of claim 1 wherein the wave signal includes modulated waveforms.

5. The system of claim 1 wherein the wave signal includes unmodulated waveforms.

6. The system of claim 1 wherein each detector device has a fixed position.

7. The system of claim 1 wherein at least one detector device has a non-fixed position.

8. The system of claim 1 wherein each detector device further is configured to detect the frequency of the wave signal and the position of the detector device and the processor further is configured to estimate the direction of arrival based on the zero crossing time information and the detected position of the detector devices.

9. The system of claim 1 wherein each detector device comprises:
   a transducer for detecting the wave signal;
   a bandpass filter coupled to the output of the transducer for filtering the detected wave signal; and
   a detector coupled to the output of the bandpass filter for detecting the zero crossing from the filtered wave signal.

10. The system of claim 9 wherein the detector comprises:
    a time counter for outputting a time value; and
    D-type flip-flop circuitry coupled to receive the filtered wave signal and to latch the time value at the occurrence of the zero crossing.

11. The system of claim 9 wherein each detector device further comprises:
    a second bandpass filter coupled to the output of the transducer for filtering the detected wave signal, the frequency passband of the first and second bandpass filters differing from each other; and a second detector coupled to the output of the second bandpass filter for detecting a second zero crossing.

12. The system of claim 9 wherein each detector device further comprises:
a second transducer for detecting the wave signal;
a second bandpass filter coupled to the output of the second transducer for filtering the detected wave signal; and
a second detector coupled to the output of the second bandpass filter for detecting a second zero crossing.

13. The system of claim 12 wherein the frequency passband of the first bandpass filter is selected to include a first frequency corresponding to a first wave signal and the frequency passband of the second bandpass filter is selected to include a second frequency corresponding to a second wave signal.

14. The system of claim 1 wherein the detector device detects one zero crossing per cycle of the wave signal.

15. The system of claim 1 wherein the zero crossing is an upward zero crossing.

16. The system of claim 1 wherein the zero crossing is a downward zero crossing.

17. The system of claim 1 wherein the detector device detects two zero crossings per cycle of the wave signal.

18. The system of claim 17 wherein the detector device detects an upward zero crossing and a downward zero crossing.

19. The system of claim 1 wherein the processor further is configured to:
estimate the direction of arrival by computing a wave propagation model;
compute error estimates between the computed model and the zero crossing time information and detector device position information; and
derive the direction of arrival from a best fit comparison of the error estimates.

20. A detector device comprising:
a transducer for detecting a wave signal;
a bandpass filter coupled to the output of the transducer for filtering the detected wave signal; and
a detector coupled to the output of the bandpass filter for detecting a time of a zero crossing from the filtered wave signal to provide zero crossing time information.

21. The detector device of claim 20 wherein the detector comprises:
a time counter for outputting a time value; and
D-type flip-flop circuitry coupled to receive the filtered wave signal and to latch the time value at the occurrence of the zero crossing.

22. A method comprising:
detecting a time of a zero crossing of a wave signal independently at two or more positions to provide zero crossing time information; and
estimating a direction of arrival of the wave signal based on the zero crossing time information and position information.

23. The method of claim 22 wherein detecting includes:
detecting the wave signal;
filtering the detected wave signal; and
detecting the zero crossing from the filtered wave signal.

24. A system comprising:
means for detecting a time of a zero crossing of a signal independently at two or more positions to provide zero crossing time information; and
means for estimating a direction of arrival of the wave signal based on the zero crossing time information and position information.

25. The detector device of claim 20 wherein the detector comprises:
a time counter for outputting a time value;
a navigation device for outputting a position value;
D-type flip-flop circuitry coupled to receive the filtered wave signal and to latch the time value at the occurrence of the zero crossing; and
second D-type flip-flop circuitry coupled to receive the filtered wave signal and to latch a position value at the occurrence of the zero crossing.

26. The detector device of claim 20 wherein the detector comprises:
a time counter for outputting a time value;
D-type flip-flop circuitry coupled to receive the filtered wave signal and to latch a time value at the occurrence of an upward zero crossing;
a negative peak detector coupled to receive the filtered wave signal and to detect a negative peak amplitude;
second D-type flip-flop circuitry coupled to receive the filtered wave signal and to latch a time value at the occurrence of a downward zero crossing; and
a positive peak detector coupled to receive the filtered wave signal and to detect a positive peak amplitude.

* * * * *